US010437808B2

(12) United States Patent
Peters et al.

(10) Patent No.: US 10,437,808 B2
(45) Date of Patent: Oct. 8, 2019

(54) RAM DAEMONS

(75) Inventors: Keith Peters, San Francisco, CA (US); Bryn Robert Dole, Sunnyvale, CA (US); Michael Markson, San Francisco, CA (US); Robert Michael Saliba, San Francisco, CA (US); Rich Skrenta, San Carlos, CA (US); Robert N. Truel, San Carlos, CA (US); Gregory B. Lindahl, Sunnyvale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 362 days.

(21) Appl. No.: 13/328,682

(22) Filed: Dec. 16, 2011

(65) Prior Publication Data

US 2012/0210047 A1     Aug. 16, 2012

Related U.S. Application Data

(63) Continuation of application No. PCT/US2010/039395, filed on Jun. 21, 2010.
(Continued)

(51) Int. Cl.
*G06F 16/27* (2019.01)
*G06F 16/22* (2019.01)
(Continued)

(52) U.S. Cl.
CPC ...... *G06F 16/2282* (2019.01); *G06F 16/2228* (2019.01); *G06F 16/2462* (2019.01);
(Continued)

(58) Field of Classification Search
CPC .... G06F 3/067; G06F 12/0813; G06F 15/167; G06F 9/5016; G06F 9/52; G06F 17/30575–30584
(Continued)

(56) References Cited

U.S. PATENT DOCUMENTS

| 4,972,349 A | 11/1990 | Kleinberger |
| 5,696,961 A | 12/1997 | Briscoe |

(Continued)

FOREIGN PATENT DOCUMENTS

| CN | 1517914 A | 8/2004 |
| CN | 101388044 A | 3/2009 |

(Continued)

OTHER PUBLICATIONS

Sybase Adaptive Server Enterprise 15.0.3 Cluster Edition User Guide published Jun. 2009. Labelled A020.*
(Continued)

*Primary Examiner* — Edward J Dudek, Jr.
*Assistant Examiner* — Andrew Russell
(74) *Attorney, Agent, or Firm* — Zilka-Kotab, P.C.

(57) ABSTRACT

A method of managing a database system using a swarm database system that communicates a request to read data to at least a subset of nodes. Checking the identifier by each respective node in the subset of nodes to determine if the requested read data is stored in the node. Providing the read data to the first node if the respective node in the subset includes read data.

16 Claims, 41 Drawing Sheets

Related U.S. Application Data

(60) Provisional application No. 61/218,889, filed on Jun. 19, 2009.

(51) Int. Cl.
*G06F 16/28* (2019.01)
*G06F 16/951* (2019.01)
*G06F 16/2458* (2019.01)
*G06F 16/2455* (2019.01)

(52) U.S. Cl.
CPC ...... *G06F 16/24554* (2019.01); *G06F 16/273* (2019.01); *G06F 16/285* (2019.01); *G06F 16/951* (2019.01)

(58) Field of Classification Search
USPC ........................................................ 711/148
See application file for complete search history.

(56) References Cited

U.S. PATENT DOCUMENTS

| | | |
|---|---|---|
| 5,835,757 A * | 11/1998 | Oulid-Aissa ...... G06F 17/30575 |
| 6,578,039 B1 | 6/2003 | Kawamura |
| 7,257,570 B2 | 8/2007 | Riise et al. |
| 7,467,166 B2 | 12/2008 | White |
| 7,502,779 B2 | 3/2009 | Brockway et al. |
| 7,562,122 B2 | 7/2009 | Oliver et al. |
| 7,685,109 B1 | 3/2010 | Ransil et al. |
| 7,698,331 B2 | 4/2010 | Carson et al. |
| 7,966,337 B2 | 6/2011 | Blackman et al. |
| 7,996,397 B2 | 8/2011 | Borkovsky et al. |
| 8,041,730 B1 | 10/2011 | Upstill et al. |
| 8,078,825 B2 | 12/2011 | Oreland et al. |
| 8,103,662 B2 | 1/2012 | Eagan et al. |
| 8,135,728 B2 | 3/2012 | Yih et al. |
| 8,150,800 B2 | 4/2012 | Webman et al. |
| 8,150,870 B1 | 4/2012 | Peddy et al. |
| 8,666,991 B2 | 3/2014 | Peters et al. |
| 8,918,365 B2 | 12/2014 | Skrenta et al. |
| 2002/0133720 A1 | 9/2002 | Sherman et al. |
| 2003/0050980 A1* | 3/2003 | Dutta ............... G06F 17/30206 709/205 |
| 2003/0212649 A1 | 11/2003 | Denesuk et al. |
| 2004/0133573 A1 | 7/2004 | Miloushev et al. |
| 2004/0153481 A1 | 8/2004 | Talluri |
| 2004/0249795 A1 | 12/2004 | Brockway et al. |
| 2005/0071390 A1 | 3/2005 | Midgley et al. |
| 2005/0076097 A1 | 4/2005 | Sullivan et al. |
| 2005/0091204 A1 | 4/2005 | Melman |
| 2005/0165775 A1 | 7/2005 | Harjanto |
| 2005/0220023 A1 | 10/2005 | Kodialam et al. |
| 2005/0228780 A1 | 10/2005 | Diab et al. |
| 2006/0026147 A1 | 2/2006 | Cone et al. |
| 2006/0095458 A1* | 5/2006 | Siu .......................... G06F 21/10 |
| 2006/0123070 A1 | 6/2006 | Hickson |
| 2006/0184718 A1 | 8/2006 | Sinclair et al. |
| 2006/0235889 A1 | 10/2006 | Rousseau et al. |
| 2006/0259728 A1 | 11/2006 | Chandrasekaran et al. |
| 2006/0277157 A1 | 12/2006 | Seidl et al. |
| 2006/0277228 A1 | 12/2006 | Kusunose |
| 2007/0033354 A1 | 2/2007 | Burrows et al. |
| 2007/0214321 A1 | 9/2007 | Shannon et al. |
| 2008/0016055 A1 | 1/2008 | Riise et al. |
| 2008/0065644 A1* | 3/2008 | Pasupuleti ........ G06F 17/30551 |
| 2008/0104185 A1 | 5/2008 | Oliver et al. |
| 2008/0140937 A1 | 6/2008 | Nalawade et al. |
| 2008/0249877 A1 | 10/2008 | Cao |
| 2008/0307189 A1* | 12/2008 | Mityagin .......... G06F 17/30011 711/173 |
| 2009/0006347 A1 | 1/2009 | Trollope |
| 2009/0037367 A1 | 2/2009 | Wein |
| 2009/0070337 A1* | 3/2009 | Romem ............ G06F 17/30575 |
| 2009/0089560 A1 | 4/2009 | Liu et al. |
| 2009/0092124 A1 | 4/2009 | Singhal et al. |
| 2009/0113160 A1 | 4/2009 | Ferraro |
| 2009/0271283 A1 | 10/2009 | Fosnacht et al. |
| 2010/0070486 A1 | 3/2010 | Punaganti Venkata et al. |
| 2010/0082566 A1 | 4/2010 | Wang et al. |
| 2010/0082582 A1 | 4/2010 | Gao et al. |
| 2010/0082585 A1 | 4/2010 | Barsook et al. |
| 2010/0094854 A1 | 4/2010 | Rouhani-Kalleh |
| 2010/0121955 A1 | 5/2010 | Doganaksoy et al. |
| 2010/0153371 A1 | 6/2010 | Singh |
| 2010/0228711 A1 | 9/2010 | Li et al. |

FOREIGN PATENT DOCUMENTS

| | | |
|---|---|---|
| EP | 1 180 890 A2 | 2/2002 |
| WO | WO 97/04391 A1 | 2/1997 |

OTHER PUBLICATIONS

Sybase Adaptive Server Enterprise 15.0.3 Cluster Edition User Guide published Jun. 2009.*
PCT International Search Report of PCT/US10/39395; dated Oct. 6, 2010.
PCT Written Opinion of the International Searching Authority of PCT/US10/39395; dated Oct. 6, 2010.
PCT International Preliminary Report on Patentability of PCT/US10/39395; dated Dec. 20, 2011.
Microsoft, "How to compact PST and OST files to eliminate deleted item space in Outlook"; 2004; http://support.microsoft.com/kb/289987; pp. 1-3.
Extended European Search Report of EP 13180596.2 dated Oct. 8, 2013.
Nancy Blechman et al.: "GoogleGuide Making Searching even easier", Google Guide cheat sheet, dated Sep. 8, 2008, Retrieved from the internet: url:http://web.archive.org/web/20090206093219/http://www.googleguide.com/print/adv_op_r.
Partial European Search Report of EP 13180595.4 dated Oct. 9, 2013.
Marianne Durand et al.: "Loglog Counting of Large Cardinalities (Extended Abstract)", vol. 2832, 2003, pp. 605-617, XP2335034.
First Chinese Office Action of CN 201080037040.3 dated Nov. 15, 2013 (in English and in Chinese).
Extended European Search Report of EP 13180595.4 dated Feb. 27, 2014.
Extended European Search Report of EP 10790334.6 dated Apr. 9, 2014.
Second Chinese Office Action of CN 201080037040.3 dated Jun. 5, 2014 (in English and in Chinese).
Office Action from Chinese Application No. 201310357201.2, dated Feb. 22, 2016.
Wang, Y., "Practical Retrieval of Internet Information," Silver Collar Project, Press of Higher Education, Dec. 2008, pp. 32-44 & 53-56 (English translation only 41 pages).
Cai et al., "Fast and Accurate Traffic Matrix Measurement Using Adaptive Cardinality Counting," Proceeding of the 2005 ACM SIGCOMMWorkshop on Mining Network Data, pp. 205-206.
Flajolet et al., "Probabilistic Counting Algorithms for Data Base Applications," Journal of Computer and System Sciences, vol. 31, Issue 2, 1985, pp. 182-209.
Durand et al., "Loglog Counting of Large Cardinalities," European Symposium on Algorithms, Apr. 1, 2013, pp. 1-14.
European Office Communication and Examination Report from European Application No. 13180595.4, dated Jan. 29, 2016.

* cited by examiner

*All Rows, Bucket B1* — 620a

| Prefix = 0<br><br>Bucket B2<br>620b | Prefix = 1<br><br>Bucket B3<br>620c |

FIG. 6B

*All Rows, Bucket B1* — 620a

| Prefix = 00<br><br>Bucket B4<br>620d | Prefix = 10<br><br>Bucket B6<br>620f |
| Prefix = 01<br><br>Bucket B5<br>620e | Prefix = 11<br><br>Bucket B7<br>620g |

FIG. 6C

TopN  1603

| Name | Rank | Extra |
|---|---|---|
| cnn.com/story03 | 1275512373 | none |
| nbc.com/story06 | 1275511413 | none |
| fox.com/url015 | 127550795 | none |
| ... | ... | ... |

FIG. 16A

RAM DAEMONS

CROSS-REFERENCE TO RELATED APPLICATIONS

This patent application claims priority from and is related to International application no. PCT/US10/39395 filed on Jun. 21, 2010, which claims priority from U.S. provisional application No. 61/218,889 filed on Jun. 19, 2009, which is hereby incorporated by reference in its entirety. This application is additionally related to U.S. application Ser. No. 13/328,464 filed on Dec. 16, 2011 entitled "Combinators"; U.S. application Ser. No. 13/328,500 filed on Dec. 16, 2011 entitled "Slashtags"; U.S. application Ser. No. 13/328,547 filed on Dec. 16, 2011 entitled "Combinators to Build a Search Engine"; U.S. application Ser. No. 13/328,600 filed on Dec. 16, 2011 entitled "Dedicating Disks to Reading or Writing"; U.S. application Ser. No. 13/328,648 filed on Dec. 16, 2011 entitled "Hierarchical Diff Files"; and U.S. application Ser. No. 13/328,750 filed on Dec. 16, 2011 entitled "Trash Daemon".

TECHNICAL FIELD

This application relates to the field of digital computing or data processing, which includes data structures and database/file access and management for, in particular, propagating, searching and retrieving data in a distributed database system.

BACKGROUND

Distributed database systems can be used to store and access large-scale data in networked infrastructures such as large clusters, distributed computing systems, Intranet, Internet and other informational retrieval systems. Distributed database systems include storage and processing devices that are typically managed and controlled by a central database management system. The central database management system may be stored in multiple computers located in the same physical location, or may be dispersed over a network of interconnected computers.

A distributed database system controlled by a centralized database management system is limited for a number of reasons. The fact that a central master controls management functions leads to temporary unavailability if the master fails, even if the master is fault-tolerant. Also, problems such as network partitions often cause unavailability in at least part of the cluster. Finally, algorithms used for fault-tolerance of the master, such as Paxos, often take a significant time to recover from failures, during which the system is partly or fully unavailable. Having a central master can also hurt scalability.

In large-scale distributed systems, system devices frequently fail or lose network connectivity due to anomalies such as network disconnection and power failures. Ensuring continuous system availability in the face of these frequent failures is extremely important to providing good low-latency behavior.

Another problem in distributed database systems is the difficulty of supporting high write rates. Even something as simple as counting the number of hits on a website with many webservers is considered a difficult problem today. Logfile analysis is often not done in real-time, because it is too expensive to do so. Statistics such as the number of unique clients to access a website are very expensive to generate.

There are many problems today in distributed databases as applied in particular to answering search queries. Search engines provide a powerful tool for locating documents in a large database of documents, such as the documents on the World Wide Web (WWW) or the documents stored on the computers of an Intranet. The documents are located in response to a search query submitted by a user. A search query may consist of one or more search terms. What is needed are innovative techniques for extracting relevant information from databases efficiently and more intelligently. The ability to query a search engine more intelligently than just typing in a few search terms would be a big advance over today's search engines. The display of the results of a query could also use improvement.

SUMMARY

This disclosure relates to a method of managing a database system. The method comprises at the database system having one or more nodes comprising one or more processors and memory. The memory of the one or more nodes storing one or more programs to be executed by the one or more processors, receiving an N number of requests from one or more nodes of the database system, combining the N number of requests before initiating operations to attend to the N number of requests, reducing the number of operations to attend to the N number of requests, and executing the reduced number of operations to attend to the N number of requests.

In the method, the database system includes a search engine. The search engine includes a decentralized swarm system that utilizes one or more swarm algorithms.

The method further comprises the N number of requests may include N number of add requests to add to a value in a row stored in the database system, the combining the N number of requests before initiating operations to attend to the N number of requests includes combining the N number of add requests to the value in the row stored in the database system, and the executing the reduced number of operations includes executing the operation of adding to the value in the row stored in the database system for the N number of add requests in less than N transactions.

This disclosure also relates to a method of using one or more combinators in managing a database system. The method comprises at the database system having one or more nodes comprising one or more processors and memory, the memory of the one or more nodes storing one or more programs to be executed by the one or more processors, wherein the one or more programs includes a set combinator. Receiving a set of values corresponding to an N number of processes from one or more nodes of the database system, combining the N number of processes before initiating set operations to set the values into a table stored in a database storage of the database system, reducing the number of set operations to set the values of the N number of processes, and executing the reduced number of set operations.

This disclosure further relates to a method of operating a search engine. The method comprises at search engine that utilizes a swarm database system, wherein the search engine includes one or more processors and memory, storing one or more programs to be executed by the one or more processors, and the one or more programs including one or more combinators. In addition, receiving an N number of service tasks, combining the N number of service tasks before initiating operations to attend to the N number of service tasks, reducing the number of operations to attend to the N number of service tasks, and executing the reduced number of operations to attend to the N number of service tasks.

The method further comprises receiving an N number of service tasks include receiving a search query from a search engine user.

The method also comprises service tasks that may include ranking data items by a ranking combinator, wherein the ranking combinator ranks a plurality of data items, and maintains the top N number of the plurality of data items.

In the method, service tasks may include maintaining one or more log files by one or more combinators, the one or more log files including collecting data on number of webpage hits and generating summary information of webpages.

Further, the method comprises maintaining one or more log files by one or more combinators include one or more append combinators, wherein the one or more append combinators append lines of text to an existing set of lines of text.

In addition, the method comprises maintaining one or more log files by one or more combinators include one or more comb_add combinators, wherein the one or more comb-add combinators is configured to count a number of items and combine the count to existing data.

The method also comprises service tasks that may include detecting email spam using one or more spam combinators, wherein the one or more spam combinators compute a set of signatures based on email headers and content, and check whether the same signatures are present in a large number of emails to a large number of people.

The method further comprises utilizing a logcount combinator, wherein the logcount combinator counts how many of the large number of people have received the same signature, and determines the signature to be spam when a predetermined large count value is met.

In the method, the N number of service tasks may include crawling URLs in a webpage by one or more logcount combinators, wherein the logcount combinators count unique items of a plurality of categories of items.

Finally, the method comprises the plurality of categories of items that may include a subset of a group consisting of levels of geographic locations, GeoIP addresses, class C IP networks of referring domains, anchortext of incoming links, advertisements, shopping web pages, and facets.

This disclosure relates to a method of counting items in a database system. The method comprises at the database system having one or more nodes comprising one or more processors and memory, the memory of the one or more nodes storing one or more programs to be executed by the one or more processors, identifying an M number of items, counting unique items of the M number of items, determining a logcount for the unique items of the M number of items, and storing the logcount for the unique items.

The method further comprises determining a logcount. The method comprises partitioning each of the unique items of the M number of items into a set of N number of parts, wherein each N part includes a subset of the unique items of the M number of items and wherein each subset of unique items is expressed as a bit value. Finding the lowest unset bit in each of the N number of parts for each subset of the M number of items, setting the lowest bit in N intermediate values for each subset of unique items in the set of N parts, averaging the lowest unset bit values of the N intermediate values for each set of N parts, and applying the averaged value as a log value expressed in powers-of-two.

In the method, the N intermediate values are stored in the memory of the database, with the final step of applying the averaged value as a log value expressed in powers-of-two performed.

The method also comprises determining a logcount includes determining an approximate count of a set of unique items to an accuracy equal to approximately plus or minus 50%.

Further, the method comprises determining a logcount. The method may include partitioning each of the unique items of the M number of items into a set of N number of parts, wherein each N part includes a subset of the unique items of the M number of items and wherein each subset of unique items is expressed as a bit value, finding the lowest unset bit in each of the N number of parts for each subset of the m number of items. Choosing which bit to set in the N intermediate values using an arbitrary exponential decay factor, averaging the lowest unset bit values of the N intermediate values for each set of N parts, and applying the average value as a log value expressed with an arbitrary base related to the arbitrary exponential decay factor.

In addition, the method comprises the larger bit values in the N intermediate values are less likely to be set that smaller bit sets. Each N part in the set of N parts includes 32 bits and the total logcount storage needed includes 128 bits. The M number of items may include the URLs of incoming links to a website.

In the method, where the M numbers of items may include the recipients of email with a given signature, used to detect email spam. The M numbers of items may include the Class-C IP networks of senders of email with a given signature, used to detect email spam from bot nets. The M numbers of items may include the geographical locations of web pages which link a webpage and the M number of items may include the IP subnets of the internet servers containing web pages which link a webpage.

This disclosure also relates to a method of using one or more combinators. The method comprises at a search engine, having one or more nodes comprising one or more processors and memory, the memory of the one or more nodes storing one or more programs to be executed by the one or more processors, wherein the one or more programs includes one or more combinators. In addition, receiving a search query, conducting a search in the search engine responsive to the received search query based on one or more predetermined criteria associated with one or more search terms in the search query, wherein each pre-determined criteria is associated with one or more combinators, and combining the one or more predetermined criteria to generate a search result.

The method further comprises the one or more predetermined criteria associated with one or more search terms comprise a subset of the group consisting of ranking of websites in an index based on a quality factor of websites matched to the search query, ranking of websites in an index based on date, ranking of websites in an index based on most recent websites associated with one or more terms of the search query, and ranking of websites in an index based on importance.

The method also comprises conducting a search in the search engine responsive to the received search query includes identifying websites in one or more indices having compressed data.

Further, the method comprises conducting a search in the search engine responsive to the received search query includes identifying websites in one or more indices having data compressed using a table of schemas.

In addition, the method comprises conducting a search in the search engine responsive to the received search query includes identifying websites in one or more indices having data compressed using a table of numbered values.

In the method, the one or more predetermined criteria may include an index combinator associated with each criteria, the index combinator associated with each criteria being configured to combine a first index associated with a first criteria and one or more subsequent indices associated with corresponding criteria.

The method further comprises the index combinator associated with each respective criteria, that may include a plurality of slice combinators configured to fetch data from a plurality of locations in the search engine.

The method also comprises the plurality of locations in the search engine that may include one or more daemon tools of the search engine. The one or more combinators may include a head of full-size compressed entries plus a tail of entries that are a subset of the bits of a full-size compressed entry. The head data is 32-bytes of compressed data, and the tail data is a subset of 4 bytes of a head data entry.

This disclosure further relates to a method of increasing the speed of disk reading and writing operations in a database system. The method comprises at the database system having one or more nodes comprising one or more processors and memory, the memory of the one or more nodes storing one or more programs to be executed by the one or more processors. The data in the database is partitioned into one or more buckets and at least two replicas of each bucket of data are stored in different storage devices of the one or more nodes, determining a subset of storage devices that will be dedicated to writing, while keeping at least on replica of each bucket dedicated to reading, and dedicating at least a substantial portion of the remaining storage devices to reading.

The method further comprises generating a map that identifies which of the one or more buckets of the one or more nodes are available for reading and which of the one or more buckets of the one or more nodes are available for writing, distributing the map to the one or more nodes, and using this map locally within each node to inform each bucket whether it should be reading or writing.

The method also comprises generating a replacement map after every predetermined time period and distributing the replacement map to the one or more nodes.

In the method, the one or more nodes are synchronized by a respective clock, and the replacement map is adopted when the respective clocks of the one or more nodes reaches an N secondary boundary.

Further, the method comprises designating at least one bucket for writing that may include determining buckets for writing based on the elapsed time since the last write event on the respective bucket.

In the method, designating at least one bucket for writing comprises determining a loop ranging from which one or more nodes have been written to least recently to which one or more nodes have been written to most recently, determining which buckets of each of the one or more nodes in the loop need read operations, and if none of the buckets on the respective one or more nodes need read operations, designating the note to operate a set of write operations.

Finally in the method, designating at least one bucket for writing comprises organizing the one or more buckets into a plurality of zones and rotating write only operations through each of the plurality of zones, wherein at least one of the plurality of zones containing one replication of the at least two replications of data is designated read only operations.

In addition, this disclosure relates to a method of managing a database system. The method comprises at the database system having one or more nodes comprising one or more processors and memory, the memory of the one or more nodes storing one or more programs to be executed by the one or more processors. In addition, communicating at a first node in a plurality of nodes, one or more tasks to a second node in the plurality of nodes, wherein neither the first node nor the second node is a master node, and responding to the one or more tasks by the second node.

In the method, the one or more nodes are organized into at least two clusters. The organization into at least two clusters may include virtual organization of the one or more nodes. At least two clusters span different geographic locations and at least two clusters are in the same geographic location.

In addition, the method comprises communicating that may include a local area network, that may include a wide area network, and that may include communicating wirelessly.

This disclosure relates to a method of managing a database system. The method comprises at the database system having one or more nodes comprising one or more processors and memory, the memory of the one or more nodes storing one or more programs to be executed by the one or more processors. In addition, communicating between a subset of the one or more nodes to collectively make decisions for the database system, without direction from a master node, and executing one or more actions in response to the decisions by the subset of the one or more nodes.

The method further comprises communicating between a subset of one or more nodes that may include receiving, at each node, write instructions and responding to read requests as they are received.

The method also comprises communicating between a subset of the one or more nodes that may include communicating a status report between the subset of the one or more nodes to report on a subset of the group consisting of number of files, types of files, availability for receiving new files, and repair items.

Further, the method comprises communicating between a subset of the one or more nodes that may include communicating map information, wherein the map information identifies the location of rows in respective nodes. The map information is communicated after a node has heard from the other nodes in the subset of nodes the location of buckets residing on each node.

The method further comprises adding a new node to the subset of nodes, wherein the new node communicates availability for accepting files and tasks from the other nodes in the subset of node. The new node communicates a zero configuration as a broadcast protocol to the other nodes indicating it is new to the subset of nodes, wherein the zero configuration is not a configuration file.

This disclosure also relates to a method of managing a database system. The method comprises at a swarm database system having one or more nodes comprising one or more processors and memory, the memory of the one or more nodes storing one or more programs to be executed by the one or more processors, replicating data in two or more different buckets. The different buckets may include storage components on respective nodes and wherein no two of the same bucket replicas reside on the same node of the one or more nodes, and communicating servicing information about the replica residing on a respective node to other nodes in the one or more nodes.

The method also comprises replicating data that may include writing a copy of the data on a row of a table located on a node of the one or more nodes.

The method further comprises grouping the one or more nodes into a plurality of physical racks, wherein each physical rack includes a subset of the one or more nodes and wherein a single replica of data resides in one physical rack.

The method also comprising grouping the one or more nodes into a plurality of logical racks, wherein each logical rack includes a subset of the one or more nodes and wherein a single replica of data resides in one logical rack.

The method further comprising grouping the plurality of physical racks into at least two zones, wherein each zone includes a subset of physical racks and wherein a single replica of data resides in a single zone of the at least two zones.

In addition, the method comprises replicating data in at least three different buckets that may include replicating the data in at least three different buckets that are in close proximity of each other.

Further, the method comprises detecting an error on a failed node with a bucket having a replica of data, communicating service information to available nodes with a bucket having a replica of the data other than the failed node, and bypassing the failed node.

The method further comprises invoking a repair daemon, wherein the repair daemon diagnoses the problem on the failed node and determines a repair action to repair the failed node. The repair daemon determines whether to replicate the data on another available node or replace the data on the failed node.

The method also comprises mapping data to the at least three different buckets using a hash function, wherein the hash function generates a plurality of identifiers mapped to a table at each node of the one or more nodes, and locally maintaining and updating the table by each node.

Further in the method, the identifier includes a subset of identifiers in a group consisting of key-value pairs, row keys, location code, name of bucket, and consistent hashing slots. The hash function converts a key of arbitrary size to a binary hash output of a fixed size.

In the method, the one or more nodes may include a plurality of buckets, wherein the plurality of buckets is variably sized. The plurality of buckets being variably sized may include at least a subset of buckets that are nested.

This disclosure further relates to a method of locating a row in a database system. The method comprises at a swarm database system having one or more nodes comprising one or more processors and memory, the memory of the one or more nodes storing one or more programs to be executed by the one or more processors. In addition, hashing a row key of the row, determining a prefix of the hashed row key, identifying a list of buckets containing the row based on the prefix, determining which nodes of the one or more nodes communicated storage of the buckets identified in the list of buckets, and determining at least one bucket having a replica of the row.

In addition, this disclosure relates to a method of processing a request in a database system. The method comprises at a swarm database system having one or more nodes comprising one or more processors and memory, the memory of the one or more nodes storing one or more programs to be executed by the one or more processors and receiving a request from a node in the swarm database system. In addition, hashing a row key to determine whether one or more buckets are available to service the request, wherein the one or more bucket represents an allocation of storage on a respective node of the one or more nodes. Requesting a first node in the one or more nodes having one of the one or more buckets available to service the request, requesting a second node having one of the one or more buckets available to service the request if the first node either cannot service the request or delays responding by a predetermined time period to the request of service, and sending the request to subsequent nodes having one of the one or more buckets available to service the request until the request is serviced by one of the one or more nodes.

In the method, the one or more nodes are grouped in a plurality of subset of nodes. The first node, second node and subsequent nodes are in the same grouping of nodes. Simultaneously requesting the first node, second node and subsequent nodes to service the received request, and the node to respond first services the request.

This disclosure relates to a method of organizing a data in a database system. The method comprises at a swarm database system having one or more nodes comprising one or more processors and memory, the memory of the one or more nodes storing one or more programs to be executed by the one or more processors. In addition, identifying data to store in one or more tables on a bucket, wherein the bucket is a allocation of a partitioned storage in a node of the one or more nodes, assigning to each of the identified data an identifier and a data storage hierarchical level of a plurality of hierarchical levels, and mapping to an index and storing each of the data in accordance with the index and assigned hierarchical level.

In the method, the plurality of hierarchical levels may include a first level indicative of the oldest data in the one or more tables on the bucket, a second level indicative of somewhat newer data in the one or more tables on the bucket, and a third level indicative of the most recent data in the one or more tables on the bucket.

The method also comprises storing each of the data that may include writing data to a row in a table on the bucket of a node of the one or more nodes by a writer daemon and recording a write operation of the writing into a transaction log of the node.

Further in the method, the writer daemon delays the writing operation to a respective bucket to collect additional write operations designated to the same respective bucket. The computer implemented-method further comprising receiving write operations from the writer daemon and combining write tasks of a bucket for a predetermined time period by a bucket daemon. The predetermined time period is determined by the time period for the bucket daemon to collect write operations that meet a predetermined file size.

Further, the method comprises bucket daemon writes the data in the collected write operations to the third hierarchical level; merges the data stored as the third hierarchical level to the second hierarchical level after a first predetermined time period, and merges the data of the second hierarchical level to the first hierarchical level after a second predetermined time period.

The method further comprises designating a merging limit value to one or more tables on the bucket, wherein the merging limit value is indicative of a level of the plurality of hierarchical levels, and limiting the merging of files in accordance with the designated merging limit value by refraining from merging data files in the next level once the merge limit value level is met.

The method also comprising storing a bloom filter for row keys for each hierarchical level and consulting the bloom filter to determine whether a given row key is to be found in a given hierarchical level of storage.

Finally, the method comprises combining write tasks of a bucket further includes metering the combined write tasks to prevent the writing to the storage device from using substantially all the available read/write capacity of the storage device.

This disclosure also relates to a method of managing a database system. The method comprises at a swarm database system having one or more nodes comprising one or more processors and memory, the memory of the one or more nodes storing one or more programs to be executed by the one or more processors. In addition, communicating a request to read data by a first node to at least a subset of nodes in the one or more nodes, checking the identifier by each respective node in the at least the subset of nodes, to determine if the requested read data is stored in the respective node, and providing the read data to the first node if the respective node in the at least a subset of nodes includes the read data.

The method further comprises checking a cache storage associated with each respective node in the at least the subset of nodes before checking other storage allocations of the respective node. Managing one or more read operations by a reader daemon associated with each respective node in the at least subset of nodes. The cache storage is one of a group consisting of RAM, a server storage, Flash storage on a solid-state drive and Flash on a peripheral component interconnect express card. The cache is managed by a cache daemon.

The method also comprises communicating a request to read data that may include a request to get data from a row of hashed keys in a table stored on a bucket of a respective node in at least the subset of nodes, and checking the identifier by each respective node includes hashing a row key as the identifier to determine which one or more buckets in one of the nodes of the subset of nodes contains the requested data.

In addition, the method comprises the read data is stored in the subset of nodes as a plurality of replications of the read data and at least one of the replications is stored in a cache of one of the subset of nodes. The subset of nodes communicates with each other to determine the location of the read data.

Finally in the method, the read data is stored in a plurality of hierarchical levels ranging from most recent to oldest stored data, and wherein communicating the request to read data includes indicating a hierarchical level to seek the read data up to the indicated hierarchical level at each node of the subset of nodes.

This disclosure further relates to a method of managing a database system. The method comprises at a database system having one or more nodes comprising one or more processors and memory, the memory of the one or more nodes storing one or more programs to be executed by the one or more processors, computing a target number of buckets available for servicing requests, wherein a bucket is an allocation of storage on a node of the one or more nodes. Determining whether to reorganize or reallocate buckets and sizes of buckets based on the computed target number of buckets, determining one or more buckets to be unconditionally replicated, replicating the one or more buckets to be unconditionally replicated to one or more target buckets available for servicing requests, and determining one or more nodes or storage devices that are overloaded by having more buckets than the computed target number of buckets.

The method further comprises determining one or more buckets that are in excess, wherein the one or more buckets that are in excess may include extra replications of data and data that is outdated, and dropping the one or more buckets that are in excess. Dropping the one or more buckets that are in excess may include deleting the extra replication of data and data that is outdated. Each of the one or more nodes may include a repair daemon for computing the target number of buckets for each respective node.

Further in the method, the repair daemon is configured to service the respective node of a subset of services in a group consisting of repairing damage from failed hosts, repairing damage from failed disks, repair corrupted buckets, moving buckets from nodes with too many buckets to nodes with too few buckets, and integrating a new node to the swarm database system.

Finally, the method comprises determining one or more buckets to be unconditionally replicated include determining a number of replications of data that fall below a predetermined number of replications of data.

In addition, this disclosure relates to a method of managing a database system. The method comprises at a swarm database system having one or more nodes comprising one or more processors and memory, the memory of the one or more nodes storing one or more programs to be executed by the one or more processors. Determining one or more data files to delete, moving the one or more data files to delete to a trash directory, truncating, by a trash daemon, one or more larger data files to delete to smaller sized file pieces, and deleting the smaller sized file pieces by a local operation system.

This disclosure relates to a method of managing a database system. The method comprises at a swarm database system having one or more nodes comprising one or more processors and memory, the memory of the one or more nodes storing one or more programs to be executed by the one or more processors, dividing one or more tasks for servicing at least two buckets of different nodes in the one or more nodes into two or more shards, and processing the servicing of the at least two buckets on the different nodes in parallel.

The method further comprises the servicing of at least two buckets that may include read operations and write operations. The servicing of at least two buckets includes a read operation that reads through all rows in a table in hash order.

In addition, the method further comprises generating an answer by either setting data in the database system or returning data to a main process.

Finally, the method further comprises using one or more combinators to compute the dividing one or more tasks into two or more shards and processing the servicing of the at least two buckets on the different nodes in parallel.

This disclosure also relates to a method of using one or more combinators in managing a database system. The method comprises at the database system having one or more nodes comprising one or more processors and memory, the memory of the one or more nodes storing one or more programs to be executed by the one or more processors, wherein the one or more programs includes a ranking combinator. Receiving one or more ranking criteria, ranking a plurality of items based on the one or more ranking criteria, wherein the number of the plurality of items is limited by a predetermined N number, and replacing the ranking to update the plurality of items based on a predetermined time period.

The method further comprises the ranking the plurality of items that may include utilizing a logcount combinator to count and update unique items in the ranking of the plurality of items. Each item in the plurality of items is ranked according to a scalar variable name and ranking number. Each item in the plurality of items is further ranked according to an extra data structure used to record additional information about the scalar variable name.

This disclosure further relates to a method of managing a database system. The method comprises at a database system having one or more nodes comprising one or more processors and memory, the memory of the one or more nodes storing one or more programs to be executed by the one or more processors, partitioning a plurality of rows and assigning a unique subset of the plurality of rows to each node in a subset of the one or more nodes, wherein the unique subset of the plurality of rows included unduplicated rows, and locally accessing a subset of unduplicated data from the unique subset of the plurality of rows, without communication to the other nodes in the subset of the one or more nodes.

In addition, this disclosure relates to a method of compressing data in a database system. The method comprises at a database system having one or more nodes comprising one or more processors and memory, the memory of the one or more nodes storing one or more programs to be executed by the one or more processors. Generating a first version of a first compression table of column names and types, generating a second version of a second compression table of column names and types, receiving data to compress and analyzing the received data based on the first compression table and second compression table, selecting a version of the compression table that generates the smallest compressed data size output, and compressing the data in accordance with the selected compression table.

The method further comprises generating a plurality of versions of the compression table having variations in column name and type. Column names may include at least one column name including a number from a numbered short string table configured to further compress short strings in the data, wherein the numbered short string table includes a group of short string data assigned to a unique number value. Column names may include at least one column name utilizing one or more structured column values.

This disclosure relates to a method for requesting a search query to be displayed in a web browser. The method comprises receiving one or more search terms and a slash operator selected from a plurality of slash operators, and generating a search result based on the one or more search terms and the slash operator.

The method further comprises generating the search result comprises providing a search result list that organizes content based on the one or more search terms that are within the category determined by the slash operator. The plurality of slash operators comprises mainstream operators, content operators, facet operators, URL operators, and list operators.

Finally, the method further comprises utilizing pre-intersect common filters when generating the search result.

Finally, this disclosure also relates to a method of managing a database system. The method comprises at a database system having one or more nodes comprising one or more processors and memory, the memory of the one or more nodes storing one or more programs to be executed by the one or more processors. Receiving one or more service tasks involving one or more threaded operations, utilizing one or more finite state machines to implement the threaded operations, wherein the one or more finite state machines are partitioned into N subtasks, and wherein each of the N subtasks are organized by a corresponding set of frames, and executing the one or more threaded operations according to the one or more finite state machines expressed as corresponding set of frames.

In the method, the corresponding set of frames further comprise a pointer positioned at a point where a block is needed until a result is returned to proceed to the next subtask.

BRIEF DESCRIPTION OF THE DRAWINGS

For a better understanding of the embodiments described in this application, reference should be made to the Description of Embodiments below, in conjunction with the following drawings in which like reference numerals refer to corresponding parts throughout the figures.

FIGS. 6A-6C are block diagrams of mapping and allocating buckets in a swarm system in accordance with some embodiments.

FIG. 16A is a diagram of a data structure illustrating a TopN ranking in accordance with some embodiments.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

A. Architectural Overview

Figure 1:
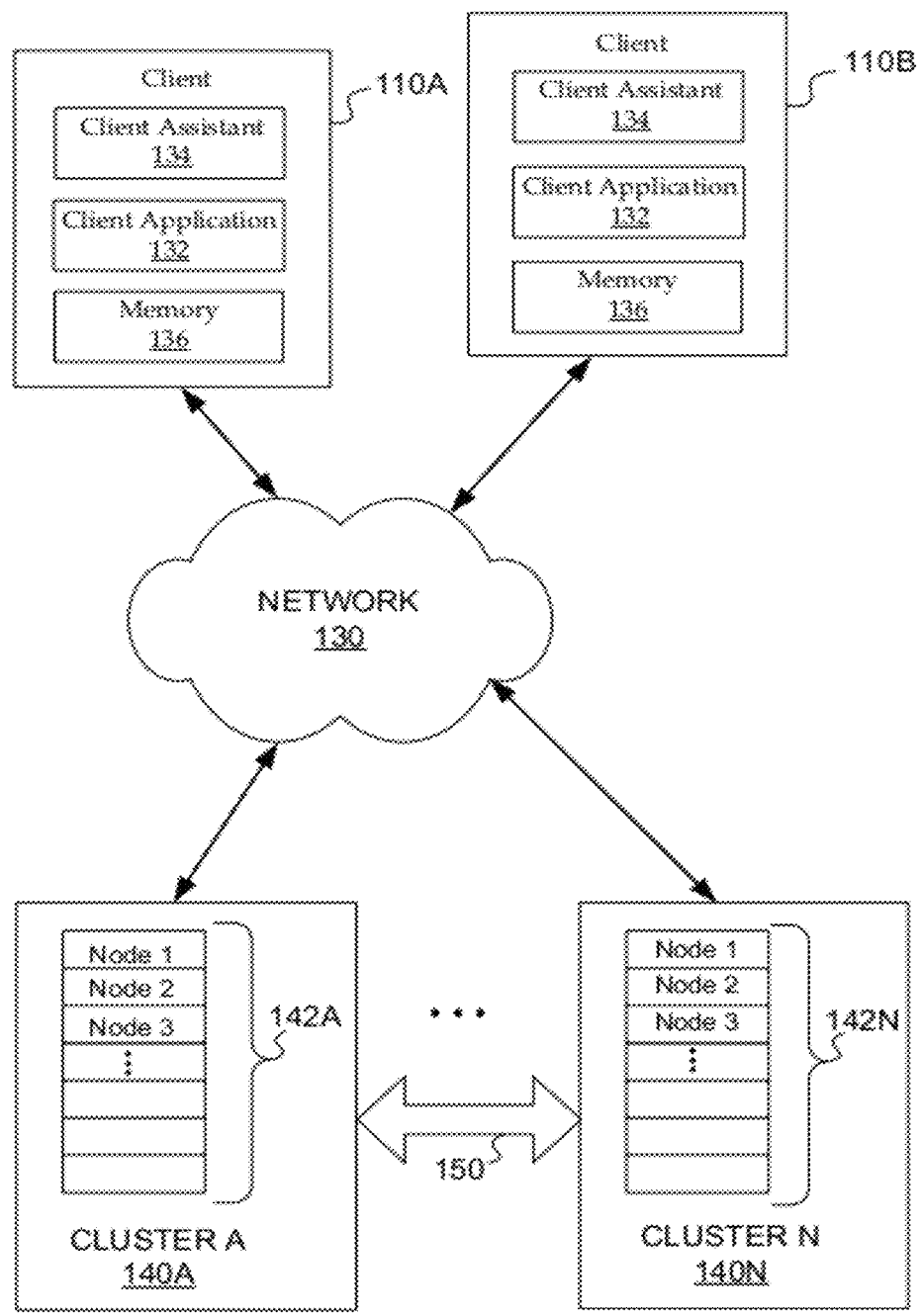
FIG. 1 is a block diagram of a distributed network system in accordance with some embodiments.

FIG. 1 is a block diagram of a distributed network system 100 according to embodiments. One or more clusters 140A-N having multiple nodes (servers) 142A-N and clients 110 are connected to a communication network 130.

A client 110 can be any of a number of devices (e.g., a computer, an internet kiosk, a personal digital assistant, a mobile phone, a gaming device, a desktop computer, tablet, or a laptop computer). The client 110 may include a client application 132, a client assistant 134, and/or client memory 136. The client application 132 can be a software application that permits a user to interact with the client 110 and/or network resources to perform one or more tasks. For example, the client application 132 can be a web browser or other type of application (e.g., a search engine application) that permits a user to search for, browse, and/or use resources (e.g., web pages and web services) located at the nodes 142 in clusters 140A-N. The resources at nodes 142 are accessible to the client 110 via the communication network 130. The client assistant 134 can be a software application that performs one or more tasks related to monitoring or assisting a user's activities with respect to the client application 132 and/or other applications. For instance, the client assistant 134 assists a user at the client 110 with browsing for resources (e.g., files) hosted by websites; processes information items (e.g., search results) generated by nodes 142; and/or monitors the user's activities on search results. In some embodiments, the client assistant 134 is part of the client application 132, available as a plug-in or extension to the client application 132 (provided, for example, from various online sources), while in other embodiments the client assistant 134 is a stand-alone program separate from the client application 132. In some embodiments the client assistant 134 is embedded in one or more web pages or other documents downloaded from one or more servers, such as nodes 142. Client memory 136 can store information such as web pages, search results received from the nodes 142, system information, and/or information about a user.

In some embodiments, each cluster 140 includes multiple nodes 142 for storing, organizing and accessing information, for example information extracted from web pages and the internet. However, information may be any type of data or metadata and includes, but is not limited to, documents, files, tables, logs, media files, digital data, and so on. In some embodiments, nodes 142 are organized by the clusters 140 they belong to, however, in other embodiments, the nodes 142 may be organized and accessed in groups and categories that do not depend on the clusters 140 in which they belong. In some embodiments, nodes 142 in each of the clusters 140A-N are categorized or organized into sub-groupings within each cluster 140. Each cluster 140A-N may be in a single geographic location. However, a single cluster 140A may span multiple geographic locations, or multiple clusters 140A-N may span multiple geographic locations. Therefore, the concept of clusters and nodes may relate to a physical organization of nodes 142 and to an abstract or virtual organization of nodes 142.

In some embodiments, the nodes 142 are self-organized in a decentralized system using swarm algorithm(s). In other embodiments, swarm algorithms are implemented to organize one or more clusters 140 or nodes 142 in a manner such that the nodes 142 interact locally with one another and with their environment. The swarm algorithm(s) allows for nodes 142 to communicate with each other and cooperate with each other via communication link 150 to accomplish various tasks within the database environment and without dependence on a master node.

The communication network 130 can be any wired or wireless local area network (LAN), metropolitan area network, and/or wide area network (WAN), such as an intranet, an extranet, or the Internet, or it may be a combination of such networks. It is sufficient that the communication network 130 provide communication capabilities between clusters 140, nodes 142, and between clusters 140 and clients 110. In some embodiments, the communication network 130 uses the HyperText Transport Protocol (HTTP) to transport information using the Transmission Control Protocol/Internet Protocol (TCP/IP). The HTTP permits client computers to access various documents available via the communication network 130. The various embodiments of the invention, however, are not limited to the use of any particular protocol. The term "document" as used throughout this specification refers to any piece of information or service that is accessible from clusters 140 and can be, for example, a web page, a file of certain format, a database record, an image, a computational object, or other information items.

Figure 2:
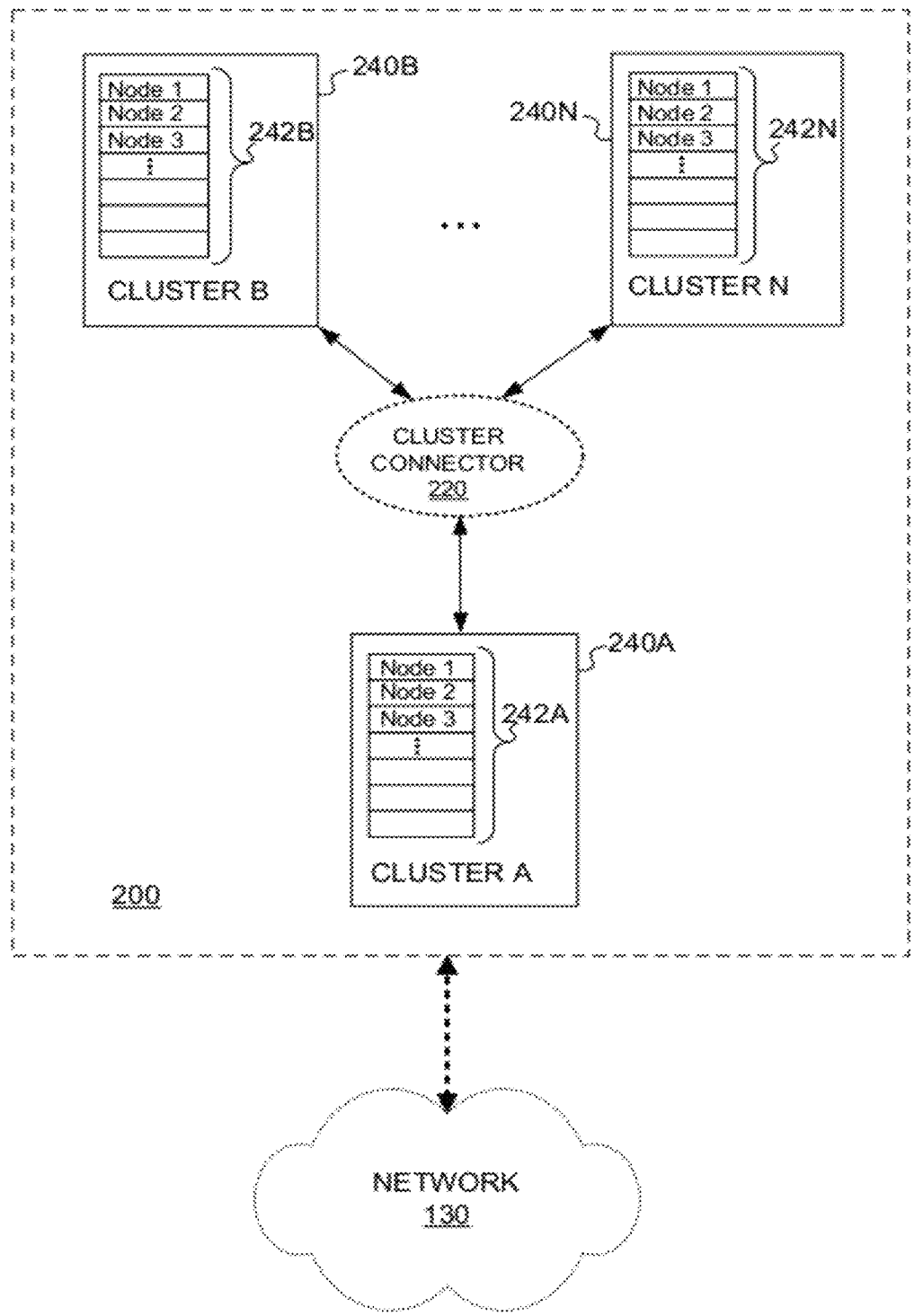
FIG. 2 is a block diagram of a distributed database system having multiple clusters in accordance with some embodiments.

FIG. 2 is a block diagram of a distributed database system 200 that includes multiple clusters 240 in accordance with some embodiments. Similar to clusters 140, each of the clusters 240A-N include a group of nodes 242A-N. In some embodiments, the clusters 240 are coupled to each other by a cluster connector 220, which may be wired or wireless. The cluster connector 220 enables communication capabilities between the clusters 240 in the system 200. The connection established by cluster connector 220 may be an intranet or an extranet, it may enable the local system 200 to be connected to the Internet, intranet or extranet via communication network 130, or it may be configured to allow a combination of such networks. The system 200 may include a few clusters 240A-B or many clusters 240A-N. Clusters 240 may be in a single geographic location or span multiple geographic locations. In other embodiments, a single cluster 240 in the system 200 may span multiple geographic locations. As illustrated by FIGS. 1 and 2, the various embodiments of the invention are not limited to any particular network system.

B. Architectural Level

Swarm Vs. Master

Figure 3A:
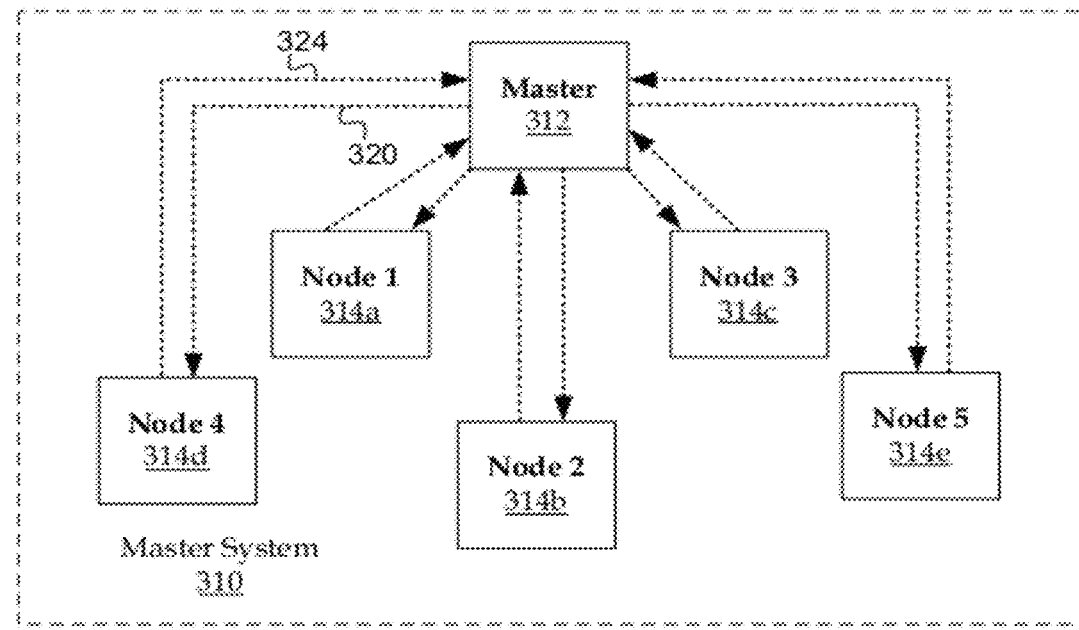
FIG. 3A is a block diagram illustrating a master system in a distributed database system.

FIG. 3A is a block diagram illustrating a master node 310 in a distributed database system (not shown). Most cluster database systems elect a single node 312 (using a system such as Paxos) to be the "master." The master node 312 typically maintains all the files in the database including tables, control/status information, mapping, and current file locations. The master node 312 also controls system-wide activities and manages other nodes 314a-e to communicate instructions, manage replications, request updates, and other managerial tasks. A client (not shown) typically must go through the master node 312 to access data stored in the other nodes 314a-e or to send requests to the other nodes 314a-e. Database operations in the master system 310 are time consuming because each instruction to the nodes 314 must go through the master node 312. For example, in order to send an instruction for a read (or get) operation, time is spent sending the instruction to the servicing node, e.g., Node 4 314d, via communication link 320 after the master node 312 receives the request from a client (not shown). More time is spent while Node 4 314d returns a response to the request via communication link 324 to the master node 312 before the request is provided to the client. Additionally, further delays are caused by node failures during which reads or writes to the database must typically wait until the failures are resolved or resources are reallocated to compensate for failures. Part of the delay includes the time in which the master node 312 determines the location of the failure and communicates instructions to the other nodes 314 to compensate for the failures.

Figure 3B:
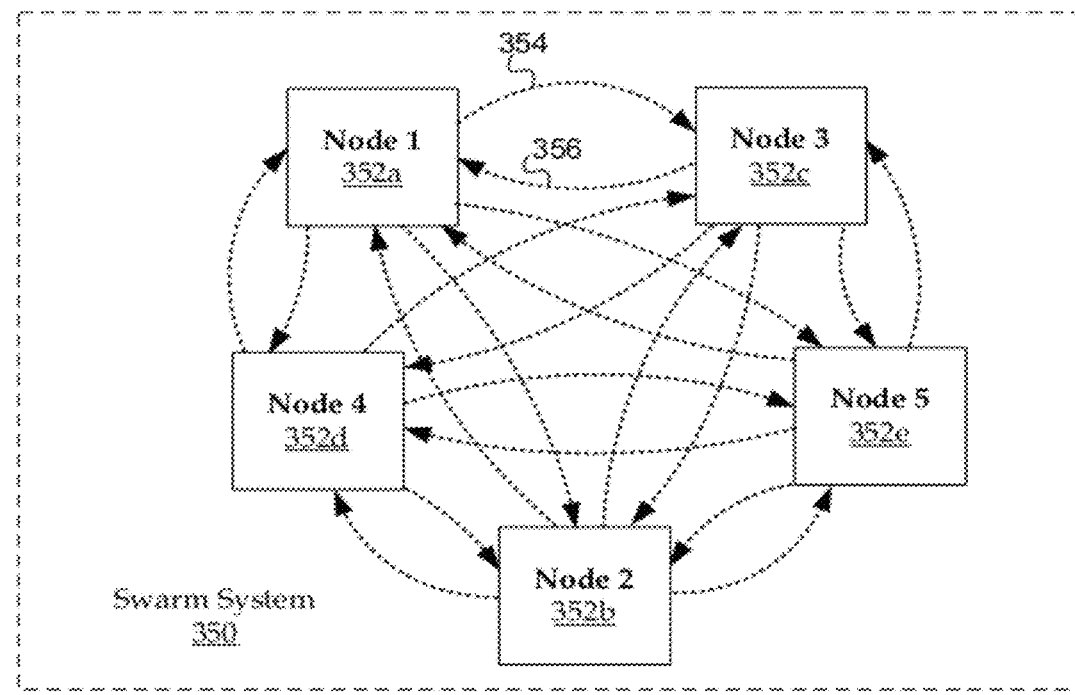
FIG. 3B is a block diagram of a swarm system in a distributed database system in accordance with some embodiments.

FIG. 3B is a block diagram of a swarm system 350 in a distributed database system (not shown) in accordance with some embodiments. In general, a swarm algorithm in the swarm system 350 creates an environment for many nodes 352a-e to cooperate with one another without a master node, such as master node 312. The swarm system 350 is a scalable cluster database in which many of its algorithms are swarm algorithms. The individual nodes 352 in the swarm system 350 make collective decisions without using a master node, such as master node 312 for coordination. A biological example of a swarm environment is a swarm of insects. Instead of relying on guidance or direction from a master or some centralized intelligent being, a swarm of insects is capable of directing each other in manner that optimizes available resources while exploring their environment. Decisions are made collectively, and not individually or by a single member of the group. A colony of ants, for example, uses pheromones to explore their environment and direct each other to resources. Honey bees travel long distances and in multiple directions simultaneously while foraging for food. Analogously, nodes 352 in the swarm system 350 can exhibit sophisticated collective behavior despite limited intelligence and limited coordination of its constituents. The swarm system 350 is highly fault tolerant and highly available, in part due to the lack of a master node, whose failure causes outages in other systems.

The swarm database system 350 implements a "relaxed eventual consistency" approach. This represents some trade-offs from the usual ACID model (Atomicity, Consistency, Isolation, and Duality) of database consistency, in order to provide higher performance. For other databases with "eventual consistency," reading data back immediately after writing often results in a stale answer, or an eventual read of the new data after a delay. However, the swarm database system 350 is "relaxed" in the sense that it will fail to become consistent for a small fraction of data in the database. Despite the small fraction of failure, the swarm system 350 is a high performing data retrieval and management system that also operates autonomous without significant human intervention. The swarm database system 350, with the relaxed eventual consistency, is an appropriate database model for applications such as a search engine.

In some embodiments, each of the nodes 352a-e is configured with similar capacity and functionality such that no single node 352 is dominant over any other node 352. In other embodiments, the nodes 352 may be configured to have varying capacities, but nonetheless, each node 352 in the swarm 350 has equal functionality. In some embodiments, nodes 352 communicate directly with each other via communication links 354, 356. Each node 352 is enabled to communicate to any one of the nodes 352 in the swarm 350. Each node 352 is capable of receiving write instructions and responding to a read request as they are received from, for example, a client (not shown). In some embodiments, the nodes 352 send status reports to each other to report on number of files, type of files, availability for receiving new files, repair items and other conditions relevant to the collective group via communication links 354, 356. Thus, the swarm 350 collectively knows where each of the files are located in order to respond to a read request and what the availability of each of the nodes 352 is to determine which of the nodes 352 can receive a write request.

Swarm Operation: Mapping

In some embodiments, map information, identifying the location of all rows in respective nodes 352 is distributed by a series of one-to-one exchanges of data via communication link 354, 356 with all known nodes 352. The map data exchanged includes the buckets resident on each node 352. After a node 352 has heard from all of the other nodes, the node 352 has a complete map of where to find any row.

Swarm Operation: Add Node

Figure 4:
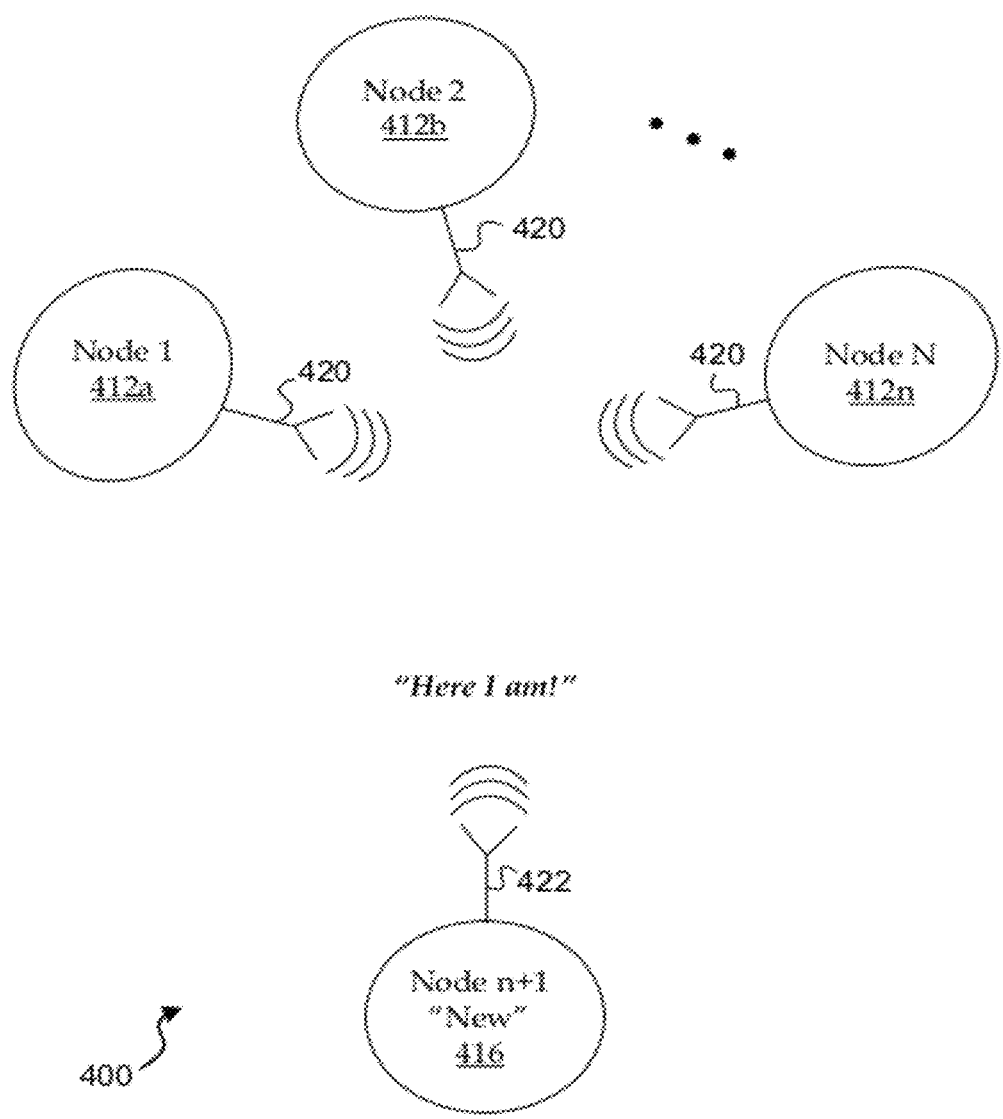
FIG. 4 is a block diagram illustrating the adding of a new node to a cluster of nodes in a swarm system in accordance with some embodiments.

FIG. 4 is a block diagram illustrating the configuration of a new node 416 being added to a cluster of nodes 412 in a swarm community 400 in accordance with some embodiments. In some embodiments, the communication link 150, 354, 356 is a standard Ethernet broadcast, which travels over wired Ethernet in the swarm community 400. In other embodiments, the communication link 150, 354, 356 may be by any wireless communication, such as wireless LAN, other RF communication, or any of the previously mentioned communication means. Nodes 412a-n communicate their respective status information by broadcast 420. Broadcast 420 may follow any number of communication protocols. For example, the broadcast 420 may be a short-range broadcast protocol, which is used to find devices on a local area network system. The various embodiments of the invention, however, are not limited to the use of any particular communication link or any type of protocol.

When new node 416 is added to the swarm community 400, broadcast 420 is used to locate new node 416. New node 416 announces "Here I am!" by broadcast 422, indicating that it has joined the swarm community 400. Nodes 412a-n acknowledges receipt of the announcement by broadcast 420, and new node 416 is ready to accept jobs in the swarm community 400. The broadcast mechanism allows all nodes 412 to discover the new node 416 by the transmission of a single network packet. The broadcast protocol for receiving new nodes added to the community, such as node 416, does not require loading a configuration file listing all nodes to the new node 416. Thus, this broadcast protocol, "zero config," is all that is required to configure any new node added to the community 400. Additionally, the zero config protocol does not require updating or distributing an updated configuration file to all the nodes 412 in the community 400. Thus, the nodes 412, 416 are not subjected to the common mistakes that occur with configuration files, such as errors in coding, delays in uploading, running and maintaining configuration files, and leaving valid nodes unused.

The collective feature of the swarm community 400, thus allows for greater scalability since multiple new nodes, such as node 416, may be added to the community 400 without configuration files and additional coding. The swarm community 400 also allows for homogenous installation when more nodes are added since machines can be integrated into the swarm community 400 with minimal human involvement (e.g., engineers and technicians). The swarm community 400 may also be configured to handle greater fault tolerance, having replication and repair protocols in place as will be described in later sections, to handle node failures. Thus, the nodes 412 in the swarm community 400 can operate more continuously and reliably despite routine failures.

Swarm Operation: Data Replication

Figure 5A:
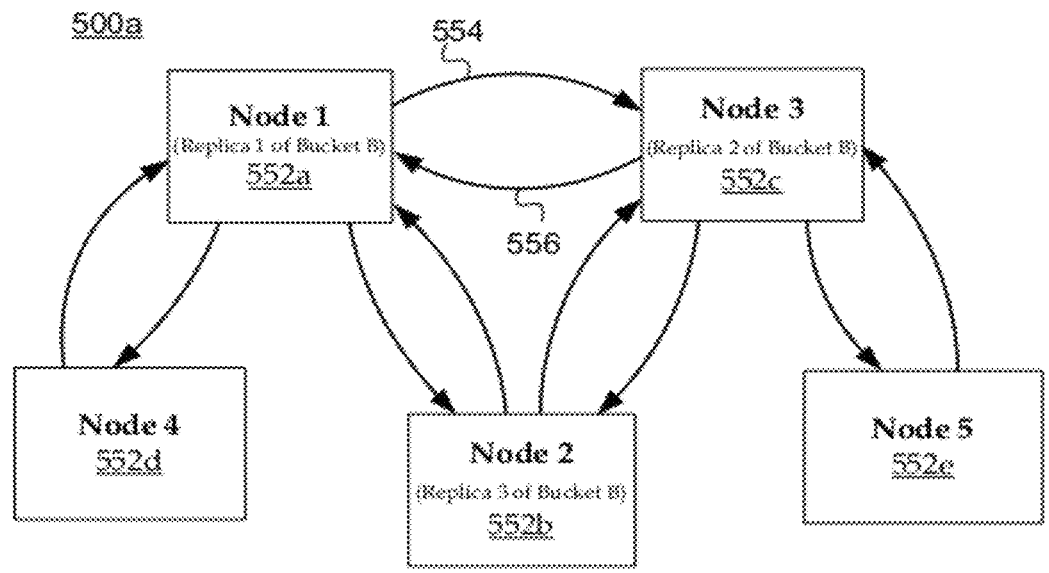
FIGS. 5A and 5B are block diagrams illustrating a swarm system of a distributed database in accordance with some other embodiments.
Figure 5B:
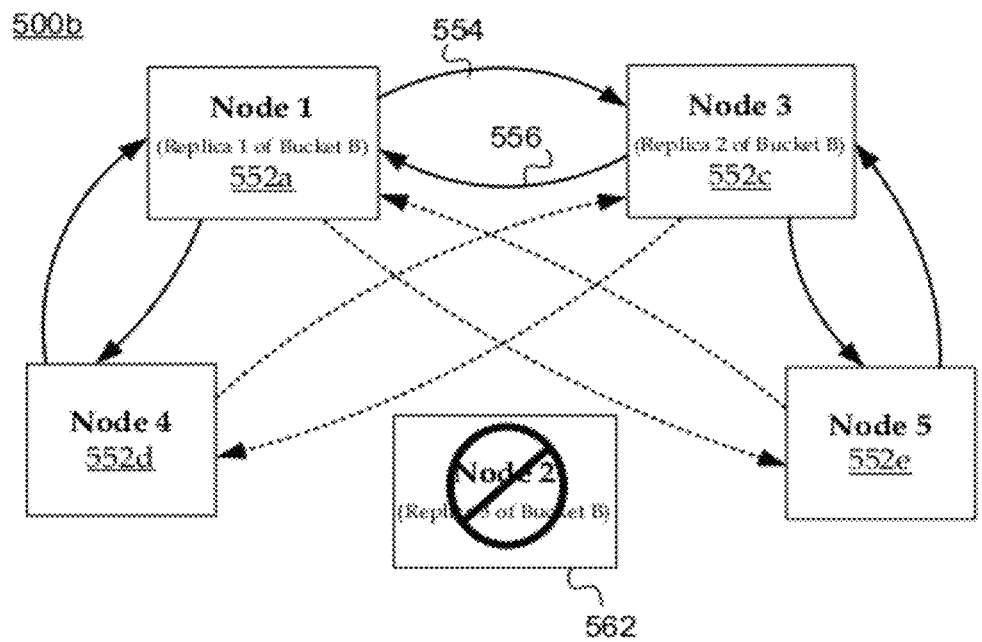

FIGS. 5A and 5B are block diagrams illustrating a swarm system 500 of a distributed database in accordance with some other embodiments. In some embodiments, the swarm system 500 includes a replication protocol to replicate any information (e.g., information received or generated) to at least three different locations, where each of the locations is referred to as a "bucket." Whenever a row of a table is written or updated, it is written or updated into all the appropriate bucket replicas. Each table in the system 500 has a goal of how many replicas it should have. Rows written to these tables are sent to all replicas at the time of writing. This goal can be changed at any time, and a daemon handles making extra copies of the rows if needed. For example, in swarm system 500a, a first data replication R1 is copied to Node 1 552a, a second data replication R2 is copied to Node 3 552c, and a third data replication R3 is copied to Node 2 552b. In some embodiments, the replication of information occurs automatically when the information is received. In other embodiments, the replication of information occurs when certain parameters or conditions are met. In some embodiments, the swarm system 500 has protocols in place or assigned daemons to check and maintain replicas R1-R3 so that valid, useable replications of information are available at all times. It will be appreciated that the nodes 552a-e are capable of communicating directly with each other as shown by communication links 554, 556. Each node 552 is capable of communicating information to any one of the nodes 552 in the swarm 500a and receiving information from any of the nodes 552. However, for simplicity, not all possible communication links are shown. For example, although not shown, Node 1 552a may send and receive information to and from Node 5 552e, and Node 3 552c may send and receive information to and from Node 4 552d.

In some embodiments, each of the nodes 552 are partitioned into storage components or "buckets," and the partitions are mapped by tables that are stored and maintained by each of the nodes 552. In some embodiments, bucket assignments may refer to partitions of the row space for each of the nodes 552. In other embodiments, bucket assignments are conceptual partitions of physical space for multiple nodes 552. The placement of buckets in the swarm system 500 is such that no two of the same bucket replicas reside on the same node 552. As previously indicated, cluster 140, 240 may be a conceptual group of machines generally, but do not always correspond to a physical grouping of nodes 142, 242, 552 (e.g., servers or other storage machines). The buckets (which are replicated three times) are stored on three different nodes 552a, 552b, 552c. The placement is such that each node has at most one replica of a particular bucket. This allows for system administration tasks (such as reboots) to be performed on the nodes 552 one at a time without impacting more than two replicas of any information.

Figure 5C:
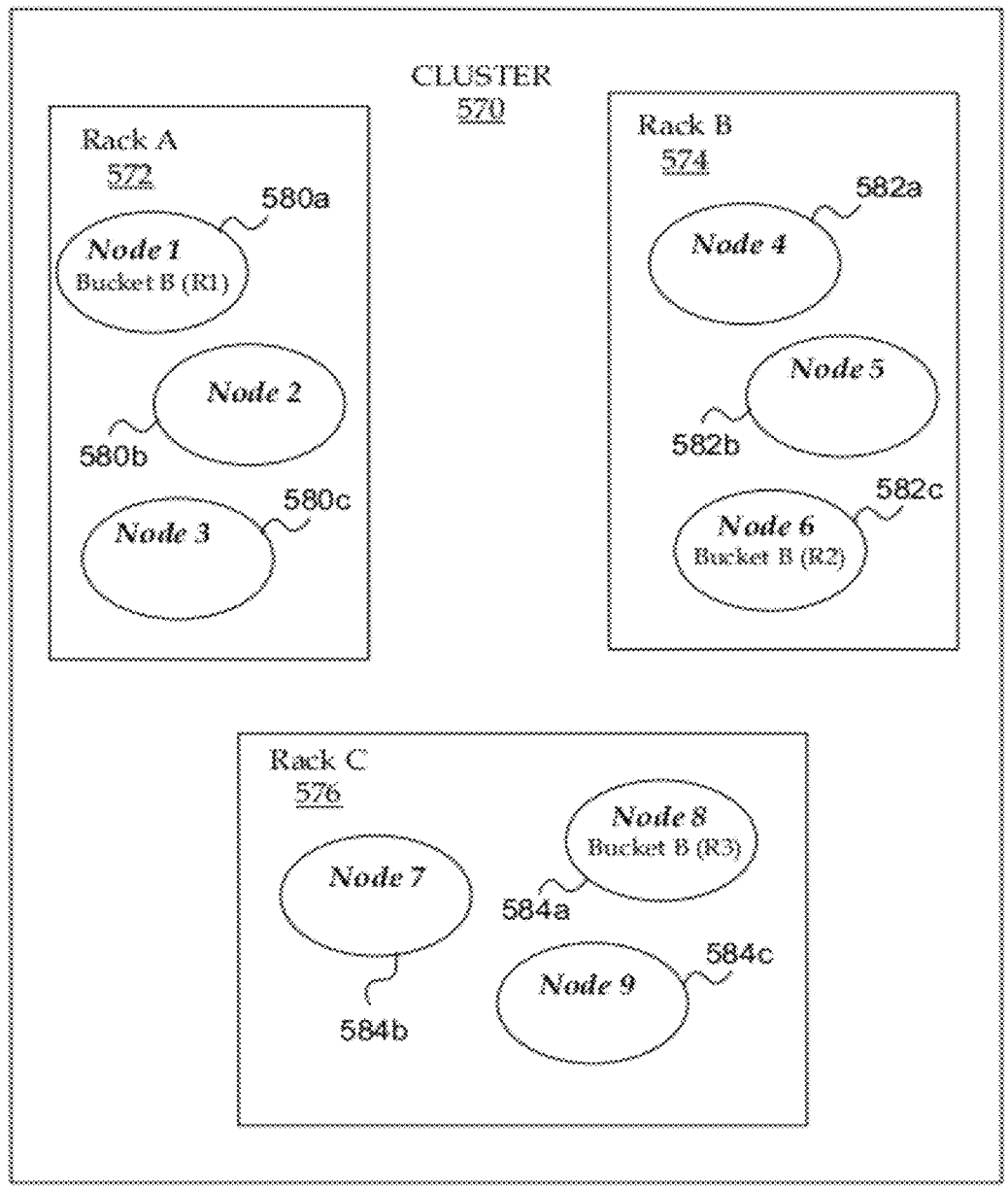
FIG. 5C is a block diagram illustrating racks of nodes in a cluster according to some embodiments.

FIG. 5C is a block diagram illustrating racks 572-576 of nodes 580-584 in a cluster 570 according to some embodiments. In some embodiments, the nodes 580-584 are grouped into groups known as racks 572-576, which may correspond to the physical location of the nodes 580-584 into physical racks, or not (e.g., logical organization of racks, organization of virtual nodes, and so on). Replicas of a bucket, such as Bucket B are placed on nodes 580a, 582c, 584a such that only one replica of the Bucket B is within a rack 572-576. This allows system administration tasks to be performed on the cluster 570 one rack at a time, while ensuring two replicas of any piece of data is available.

In some embodiments, a group of nodes may correspond to more than one physical rack, termed a "zone." In other words, a node associated with a single rack may also be associated with a zone that includes other nodes belonging to other physical racks. Zones are convenient for grouping nodes such that failures in physical components which serve more than one physical rack only causes a loss of at most 1 replica from each bucket. For example, in some situations, a single network switch serves 3 racks. In practice, to maximize the amount of system administration work that can be done at once, the nodes of a database may be organized with a goal replication level of 3 into 4 zones. It will be appreciated that a zone may alternatively be a grouping of a plurality of logical racks.

In some embodiments, the swarm system 500 may replicate information more or less than three times, and the number of replications of information may be determined depending on, but not limited to, system design, capacity, machine-type, or other factors. In other words, there may be more or less than three replicas of each bucket. The swarm system 500 allows nodes 552 to read data, or replicate a bucket to a new node 552 irrespective of the network topology. Nodes 552 may read from or copy to/from neighboring nodes 552. In some embodiments, a 4-replica cluster 140, 240 instead of a 3-replica cluster 140, 240 is possible, where two replicas each are in two different locations.

In some embodiments, topology may be important when, for example, determining where buckets should go and which bucket should be accessed for a read operation when a single cluster, such as cluster 140, 240, is spread over two geographic regions with a relatively narrow network pipe between the regions. Reading from a bucket replica close by is preferred. Additionally, for failure reasons, it is useful to have four replicas of each bucket, with two in each geographic region. If there is a single failure, there is still a bucket replica close by to read, and a repair daemon (described in later sections) can always make a new copy from a nearby bucket replica.

Swarm Operation: Addressing Failures

The system 500b of FIG. 5B illustrates the manner in which the swarm system 500b addresses failures according to some embodiments. In general, the system 500b is designed to have a certain degree of fault tolerance, allowing for normal failure events to occur, without interrupting reading data from or writing data to the database and such failures do not require human intervention. If one replica of a bucket fails, then the same information is made available at one of two other replicas of the bucket. Thus, information is stored on disks in replication for fault-tolerance in the swarm system 500b. Disk failures include a wide range of errors that may occur, including "read errors" reported by the swarm system 500b or by an Operating System of the client (not shown), or the failure of data to pass an error detection test such as checksum, a CRC (cyclic redundancy check) or other procedures for checking data or blocks of data for errors and correcting any detected errors that is stored in buckets (e.g., written onto disks). When an error is detected in a bucket, that replica of the bucket which failed the test is dropped and data from another replica of the bucket is read or processed. A disk failure may cause a node 562 to stop servicing requests for the buckets on that node 562, and the node 562 will stop advertising that it serves these buckets in the map. Consequently, the other nodes 552 continue communications 564, 566 to available nodes 552 other than the faulty node 562 until the problems to the node 562 have been resolved. In some embodiments, a disk failure may cause a repair protocol, such as a repair daemon, to be invoked, as will be described in later sections, which may eventually decide to replicate those buckets that have fallen below three valid replicas. For example, the repair daemon diagnoses the problem at node 562 and may cause the system 500b to recopy a replica on another available node 552d or 552e to replace the unavailable replica R3 on node 562.

In some embodiments, the entire node 562 fails, or a bucket or subset of the buckets on the node 562 fails, such as "Replica 3 of Bucket B," and will stop sending out updates (e.g., map updates to other nodes 552). Eventually, all nodes 552 will recognize that the buckets served by the failed node 562 or the failed replica of a bucket "Replica 3 of Bucket B" is no longer available at that node 562. This will cause the repair daemon (not shown) to replicate buckets that have fallen below three valid replications. In some embodiments, it takes three simultaneous machine failures before the failed node 562 or the bucket replica on node 562 "Replica 3 of Bucket B" is deemed unavailable. In other embodiments, more or less than three simultaneous failures may be required before the node 562 or the bucket "Replica 3 of Bucket B" is determined to be unavailable. In some embodiments, if the bucket replica "Replica 3 of Bucket B" on node 562 is determined to be unavailable, the nodes 552 will have communicated to each other (shown as communication 564, 566) such that the unavailable bucket replica on node 562 is bypassed, and the two other bucket replicas (for example, on node 552a and node 552c) are accessed instead. As in the previous example, the other nodes 552 will continue communications 554, 556 to other valid nodes 552 and stop communications to the failed node 562.

Swarm Operation: Allocating Buckets and Hash Operations

Figure 6A:
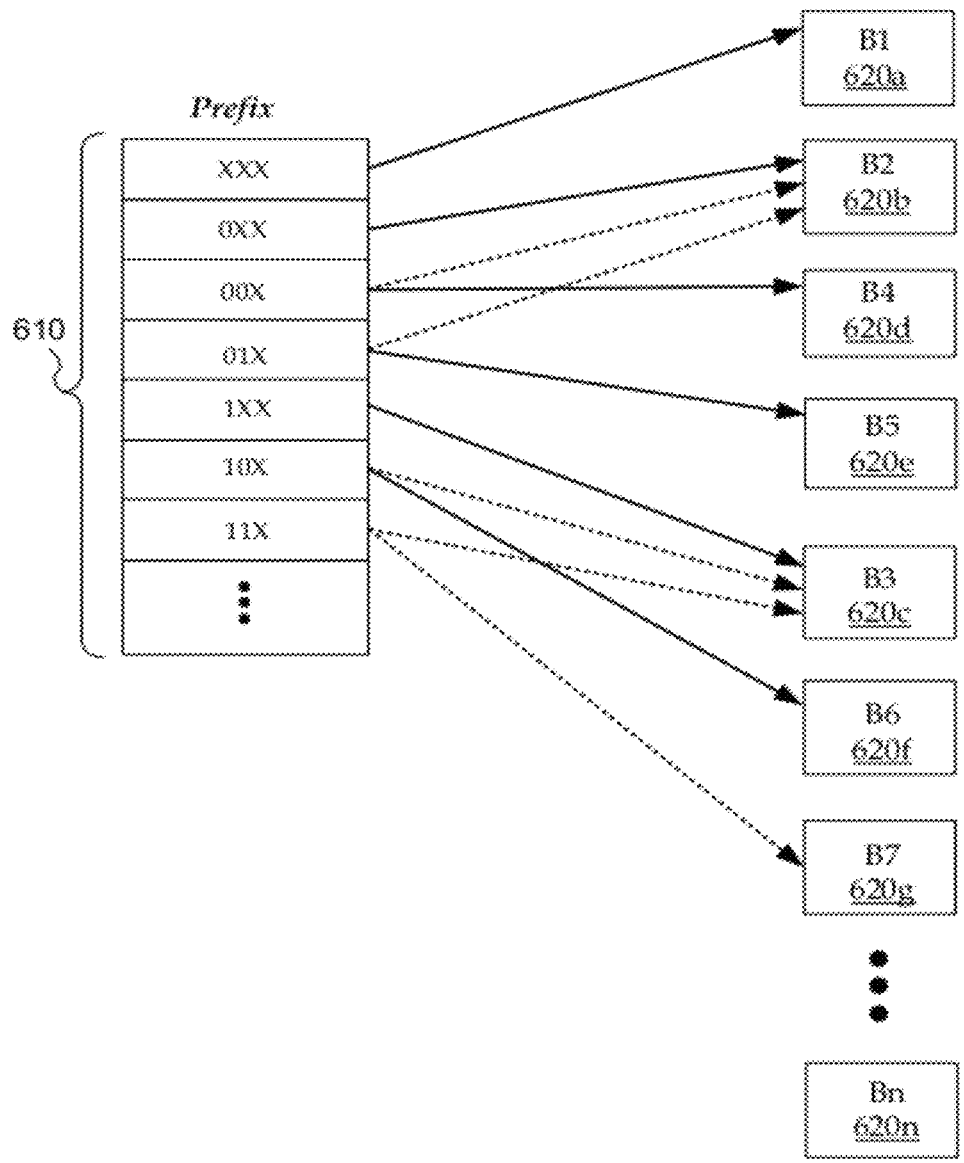

FIGS. 6A-C are block diagrams of mapping and allocating buckets 620 in a swarm system 300, 500 in accordance with some embodiments. In some embodiments, the allocation of a "bucket" in a distributed database such as swarm systems 300, 500, is mapped by hash functions, which is a procedure or mathematical function to convert large blocks of data into smaller, organized information, such as metadata, rows, tables, indices, and so forth. Mapping of rows to buckets may be achieved by using a hash function to convert a key of arbitrary size to a binary hash output of fixed size. In one example, information or the location of information stored in a particular bucket is identified by the hash function of a row key from a hash table 610, which points to the particular location where a bucket 620 is located. The hash functions, such as the hash functions listed in hash table 610, for all row keys are mapped to a table (not shown) residing at each node of the distributed database, such as system 300, 500, and is locally maintained and updated by each node. The row key may include a location code, e.g., location= (hash mod n_nodes), or may be slots in a table, such as hash table 610, in a scheme called "consistent hashing".

In either case, each row key or slot points to buckets 620a-g. In some embodiments, bit prefixes of the hash key (e.g., 00X to 11X . . . in hash table 610) are used to generate or allocate buckets, which can be variably sized, and the prefix of the keys is determined by the name of the bucket.

Thus, the variability of bucket size allows for flexibility and scalability in allocating storage space of the database. In some embodiments, the hash table 610 is a list of prefixes that uses a bit pattern hash to assign or allocate a row key to a bucket 620a-n (Buckets B1-Bn). The location of a piece of data in a map in the distributed database, such as systems 300, 500, is determined by the hash of its row key, as described above. The highest bits of the hash, called the prefix in hash table 610, determine which buckets the data resides in.

In some embodiments, the buckets 620a-n are nested. For example, one bucket B1 620a may contain all rows. The prefix for bucket B1 620a is X, where X can be 0 or 1. Buckets B2 620b and B3 620c nest inside bucket B1 620a. The hash key may be configured such that a row is in bucket B2 620b if its hash begins with 0, and a row is in bucket B3 620c if its hash begins with 1, as shown in FIG. 6B. Additional buckets B4 620d and B5 620e, as shown in FIG. 6C, may be nested in bucket B2 620b of FIG. 6B. A row may be in bucket B4 620d if its hash begins with 00, and a row may be in bucket B5 620e if its hash begins with 01. Therefore, a hash configuration according to hash table 610 indicates a row key whose hash begins with 01 is in buckets B5 620e, B2 620b, and B1 620a.

According to this hash configuration, as shown in FIG. 6B, bucket B2 620b is half the size of bucket B1 620a. As shown in FIG. 6C, bucket B4 620d is half the size of bucket B2 620b, and bucket allocation is identified by double digit prefixes 00, 01, 10, 11. That is, bucket B2 620b contains half of the hash range that bucket B1 620a does, and bucket B4 620d contains half of the hash range that bucket B2 620b contains. If the hash function successfully distributes row keys evenly into hash space, then bucket B2 620b will be roughly half the physical size of bucket B1 620a.

If it is desired that the buckets in the database be roughly the same size, the buckets would be accordingly selected to have a range of buckets such as buckets B2-B3 620b-c in FIG. 6B or buckets B4-B7 620d-g in FIG. 6C, and no others. In such a system, a row would exist in exactly one bucket.

Defining the mapping according to hash keys has several benefits. First, the name of the bucket, a small integer, determines the range of key hashes stored in the bucket. This is more convenient to debug and manage than recording an arbitrary range of hash values being in a bucket. Second, this method allows buckets of different sizes to exist at the same time in the system. Given a row key hash, it may turn out that the map indicating a particular row might live in more than one bucket, which is convenient when considering multiple replicas of buckets exist in the database system. Reading/writing the row would then read from or write to all of these buckets. Allowing different-sized buckets allows various flexible and scalable actions, such as splitting or combining buckets while the database is running.

Given that a single hash function is used for all mapping of rows to buckets, a given row will be in the same bucket(s) for all tables which contain this row. This is a useful efficiency technique when executing parallel mapjobs. A program accessing all of the rows of a table in a bucket on a node is guaranteed that accessing a row in a different table but the same row key will be a local access.

In summary, the full sequence of locating a particular bucket and node that a row is on is as follows. First, hash the row key. Then use the prefix of this hash and the list of buckets which exist in the system to determine which bucket(s) contain the row. Finally, look to see which nodes have announced that they store these bucket(s).

C. Component Level

Data Writes

Figure 7A:
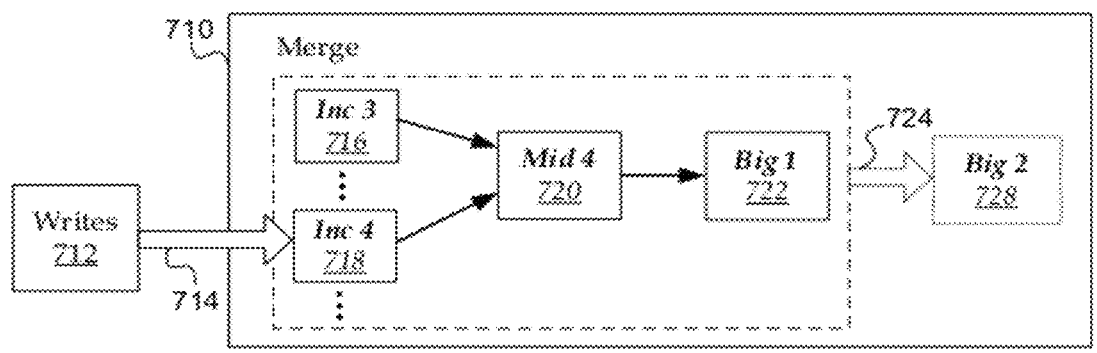
FIGS. 7A-7C are block diagrams of how data is organized and stored in a distributed database in accordance with some embodiments.
Figure 7B:
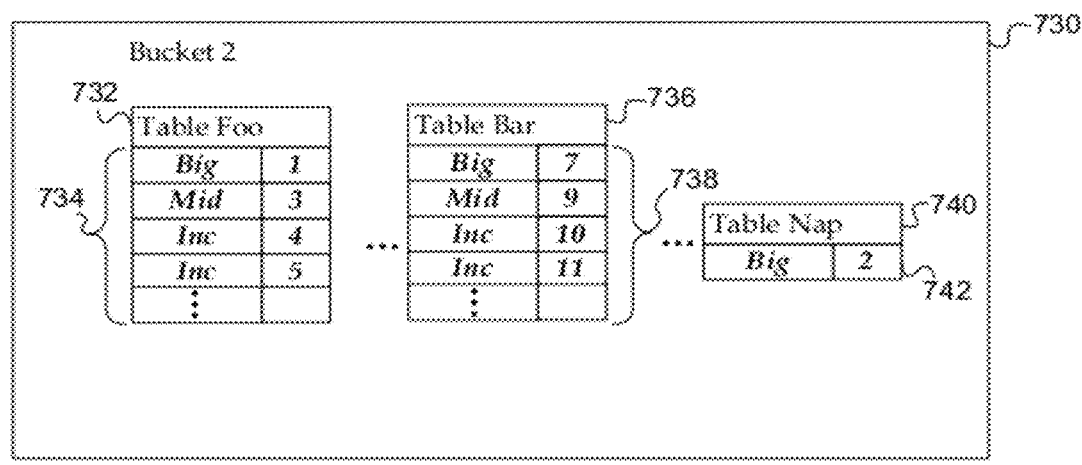
Figure 7C:
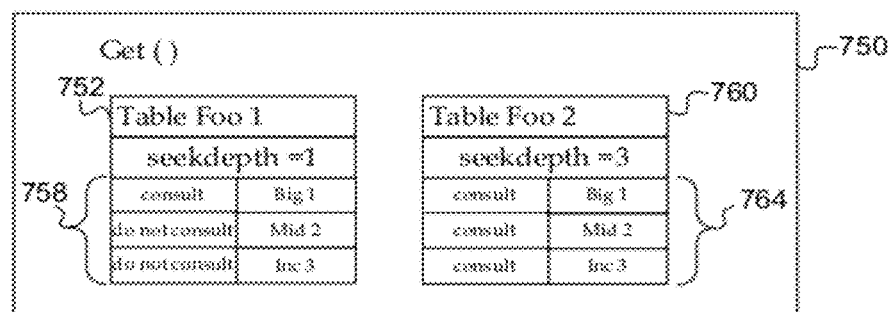

FIGS. 7A-7C are block diagrams showing how data is organized and stored in the swarm database system 100-300 in accordance with some embodiments. Buckets contain multiple tables for storing and managing data. This data needs to be stored in a manner such that it is cheap to both read and write data onto rows in multiple tables. Also, the tables stored in each respective bucket are configured such that altering one table does not change anything about another table. This separation additionally reduces the impact of a bug or a storage error.

The data is stored on underlying storage, examples of which include, but are not limited to, a hard disk, flash disk, or ram disk. One embodiment involves storing the data in files in a Linux filesystem. Each table within a bucket consists of a hierarchical set of files 734. One embodiment uses three levels, named "big", "mid", and "inc." Each file 734 has an index mapping the row key hash to a location within the disk file. This index is loaded into RAM, and ensures that fetching a row involves a single disk seek and read. The "big" file contains the oldest data in the table, the "mid" file somewhat newer data, and the "inc" files contain the most recent data.

When an application wishes to write to a row in a table, the write operation is sent to a "writer daemon" (not shown) on either the local node or a remote node. The writer daemon writes this data into a transaction log (not shown), which will be replayed for fault-tolerance after a crash of the local node or of a remote node, or a failure to communicate with the remote nodes. In some embodiments, a given row write needs to be delivered to one or more (typically 3) replicas of a bucket, which usually reside on three different nodes as previously described. In some embodiments, the writer daemon will delay a given write for a while hoping to find more writes that need delivering to the same remote buckets.

In some embodiments, a "bucket daemon" (not shown) receives writes from the writer daemons. The bucket daemon remembers and combines write tasks until after some period of time has passed or some amount of data has arrived (e.g., N seconds or M megabytes of data arrive for a particular table at respective nodes 142, 352). This data is then written to Inc files on disk. Inc files are eventually combined (merged) into a Mid file, and multiple Mid files are combined into Big file. In some embodiments, another daemon, a bucket_maintenance daemon, does the combining.

The Operating System is involved in the activity of reading and writing to disk. In many Operating Systems, such as Unix or Linux, data being written to disk becomes "dirty pages" (e.g., the memory page has data that needs to be written but has not been written yet). A local operating system (not shown) generally schedules writes of the dirty page every N seconds or if the number of dirty pages is too large, a percentage of main memory (not shown). Consequently, large chunks of data are written at a time, which is generally preferred because large writes are more efficient than many small writes. However, large writes are a problem for other processes trying to do small reads. Therefore, in some embodiments, write operations are "metered" to break down large write operations. In other words, system writes are inhibited by metering, so that disk capacity is left over to quickly answer reads. For example, a disk that can write 50 MB/s of data can be reduced to meter a write at 8 MB/s. Thus, metering involves splitting a task into smaller chunks, which are then executed no more than N per second. In another example, 100 megabytes of data may be written at 8 megabytes per second by dividing the 100 megabytes into 25 4-megabyte chunks, and writing two 4-megabyte chunks to disk per second.

Additionally, operating system features may be relied on such as fsync( ) function, which allows the system 300, 500 to force writes to go out immediately instead of after N seconds. The function fsync( ) is commonly used to minimize data loss in case of a crash. For example, the Unix/Linux/POSIX fsync( ) function forces writes to be immediately written to disk, instead of being kept in a memory buffer so that data does not run the risk of being lost. As a result, the write operation is more efficiently executed.

Using a "Writemap" to Increase the Speed of Reads and Writes

The database described here stores multiple replicas of each bucket as previously described. Another way to speed up disk reading and writing is to dedicate a given replica of each bucket to either writing or reading at a given moment in time. Disks run faster if during a short time period (less than 1 second) a physical disk or storage system does only reads or only writes rather than executing a mix of reads and writes in a given physical disk or storage system. For example, a 'writemap' may be created which contains information for each bucket of which replicas are available for reading and which are available for writing. A physical disk or storage system containing multiple replicas needs to have all bucket replicas either reading or writing to get the benefit.

A new writemap is generated every N seconds, for example N=30 seconds. This somewhat long time period allows plenty of time to distribute the writemap to all of the nodes of the cluster. The nodes have their clocks synchronized to within a few milliseconds, and the new writemap is adopted when everyone's clock reaches an N second boundary. It is important that all nodes agree which disks are dedicated to reading or to writing because all readers must know which nodes to send get and nextrow operations.

A given replica of a given bucket must be allowed to eventually write or the write data from the bucket daemon will pile up in memory (starvation). Thus, every bucket replica may be given a chance to write at least ⅓ of the time in an R=3 system. In fact, the algorithm used to pick the replicas for writing considers the elapsed time since the last write as the primary factor for picking which replicas are writeable.

With this algorithm, at least one replica of a given bucket must be available for reading, and the read algorithm must attempt to read from 'read replicas' before cut-n-running to the 'write replicas'.

An example of an algorithm for picking which disks to write to include:
 Loop over the storage devices from the ones that have been written to least recently to the ones written to very recently.
 For each bucket replica on this storage device, see if any of these buckets are needed to be the 1 read replica for this bucket.
 If no bucket replicas need to be readers, then set this storage device to be a writer.
Another method of picking which disks to write to is to use the organization of the database into zones. Simply rotate through the zones, picking 1 zone per N seconds to write to. Since an r3 cluster usually has 3 or more zones, this method often provides less write bandwidth than the previously-described method.

Data Organization

FIG. 7A illustrates how data is written to a respective node in a distributed database, such as swarm system 300, 500. As previously described, the bucket daemon receives writes from the writer daemons. The bucket daemon holds on to writes 712 for a while hoping to receive more writes for the same table, but eventually writes out all the writes 712 it has for each table as a new Inc file 718. These Inc files proliferate, as illustrated by Inc files 716 . . . 718, and eventually the bucket maintenance daemon notices and decides to merge together a bunch of Inc files 716 . . . 718 into a single Mid file 720. The Inc files 716 . . . 718 are then removed. In some embodiments, multiple Mid files then proliferate, in other embodiments there is at most one Mid file 720, and when Inc files are merged they are combined with the existing Mid file 720 if present to form a new Mid file. Eventually, the bucket maintenance daemon will combine the Mid file 720 with a Big file 722 to form a new Big file 728. In some embodiments, the Big file 728 is the result of merging multiple Big files like Big file 722.

Different tables in the same bucket, such as Bucket 2 730, each have their own sets of files. In FIG. 7B we see three tables 732, 736, 740. Table Foo 732 and Table Bar 738 have been written to recently, and thus have files at all 3 levels of the hierarchy 734, 738. Table Nap 740 hasn't been written to in a long time, and the bucket maintenance daemon has merged all of the data in this table into a single Big file 742.

When data is read out of these files 732, 736, 740, the cost and accuracy of the answer depends on how many files are present. To get a perfect answer to a read request for a row, every file for the table is looked at. For Table Nap 740 this is exactly one file, so there is 1 disk seek. For Table Foo 732, many disk seeks may have to occur to be sure that the right answer is located. For example, the row associated with the data being sought might exist in the Big file, but the row might have been modified in the Mid or Inc files. So all files need to be consulted to get an accurate answer. If assuming, each disk seek takes 2 ms (milliseconds) to 10 ms, a table with 200 files might take quite a while to answer a read request.

The distributed database, such as system 300, 500, allows for a trade off of accuracy for speed. FIG. 7C illustrates this. The name of the value used to limit accuracy is "seekdepth". It is the maximum number of disk seeks to be done. In Table Foo 1 752 a read of a row is conducted with a seekdepth=1. In this case, only the Big file is consulted 758, and the data in the Mid and Inc files are ignored. In Table Foo 2 760, a row read is set to a seekdepth=3. In this case, at most three files are consulted 764. Thus, the read of Table Foo 1 752 will be faster but less accurate than the read of Table Foo 2 760. Seekdepth may be set with a default on a per-table basis, or in an individual read request.

Merging Incs into Mids and Mids into Bigs reduces the number of files in a table. This number of files is also referred to as the seekdepth. To determine how much merging work needs to be done to leave all of the data in Big files, the worst seekdepth in the system is computed, and this value is named seek100. The count of seekdepth in all replicas of all buckets in the system is also determined, and the seekdepth value is computed at the 50th and 90th percentiles. These numbers are called seek50 and seek90 respectively. These values may be graphed as a function of time to visualize the interaction of writing and merging data (e.g., how much writing is occurring and how much merging is necessary).

In some embodiments, a bloom filter is kept in memory, and may be used to avoid consulting a file on disk if the Bloom filter indicates that a particular row key is not present in that file. This is especially helpful in paths with a large seekdepth.

Component Data Read/Write Overview

Figure 8:
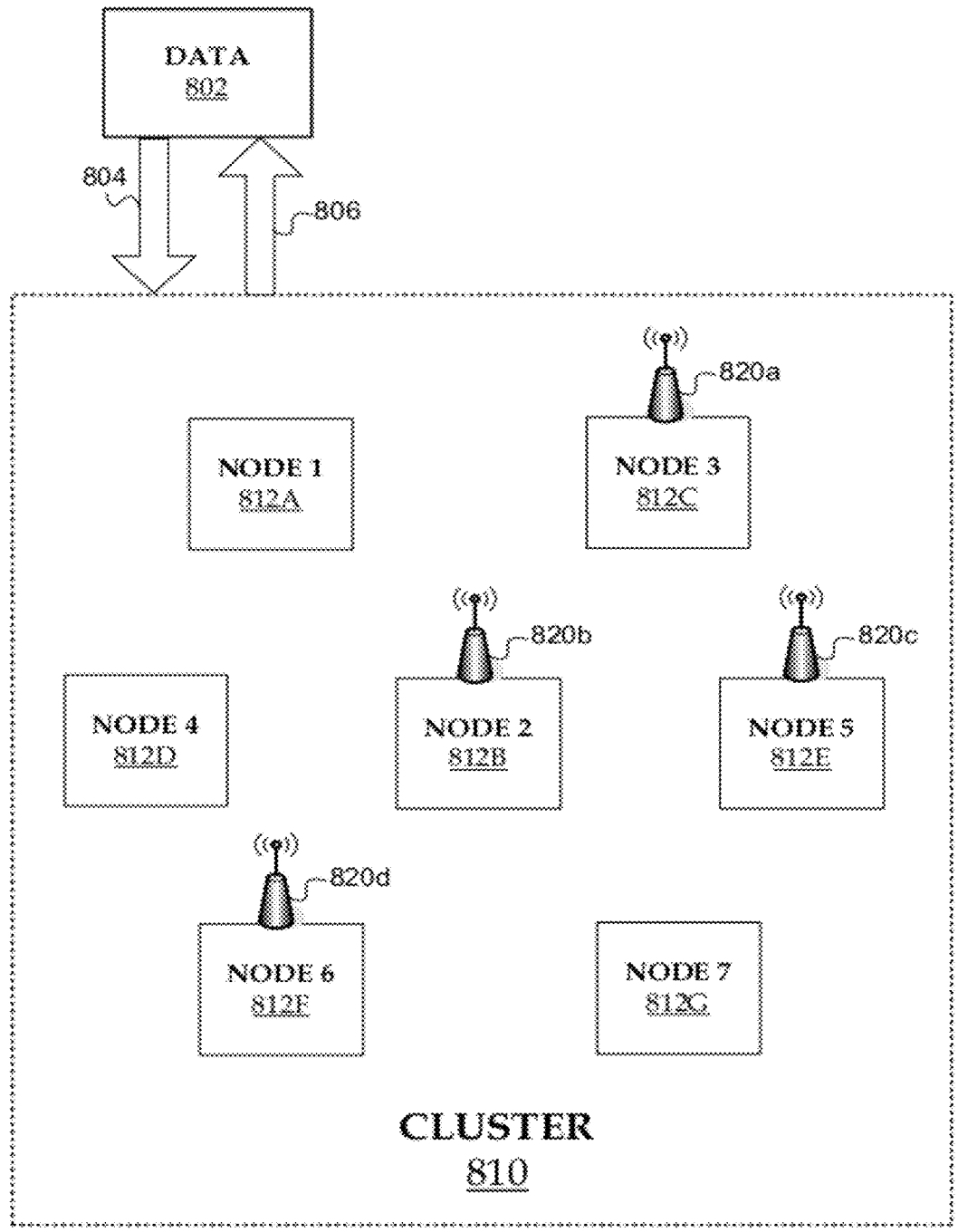
FIG. 8 is a block diagram illustrating the exchange of data in a swarm system in accordance with some embodiments.

FIG. 8 is a block diagram illustrating the exchange of data 802 being written to 804 or read from 806 nodes 812 in a cluster 810 according to some embodiments. The cluster 810 includes nodes 812A-812G. As in FIG. 3B, the nodes 812A-812G communicate directly with each other, and each node 812 may communicate to any one of the nodes 812A-812G in the cluster 810. The nodes 812 in cluster 810 broadcasts their status updates and other information via communication devices 820. As previously described, communication devices 820 may be enabled by wires or may be for wireless communication. In some embodiments, not all the nodes 812 respond to data 802 being received, or alternatively to respond to a get data request. For example, some of the nodes, e.g., nodes 812B, 812C, 812E, 812F respond as data 802 is received 804 because these nodes may have available buckets for storing the received data. If a data request is received, one of the responding nodes may broadcast to other nodes 812 that it has the requested information. In some embodiments, the broadcasting nodes 812B, 812C, 812E, 812F may be send or updating status reports and updating their own tables, information, broadcasting a repair request or any other managerial tasks. In some embodiments, one or more of the broadcasting nodes 812B, 812C, 812E, 812F may be a new node and broadcasting to other nodes 812 to assist with tasks or receive data to store.

Once a node 812 is part of the cluster 810, a number of managerial tools and protocols are shared or implemented in all the nodes 812 in the cluster 810. For example, a repair daemon (not shown) on the node 812 will begin operating. If the node 812 is a new one and has no buckets, it will begin volunteering to replicate buckets resident on overloaded nodes 812, until the new node reaches its bucket goal. Each of the nodes 812 include a number of programs or daemons to perform a number of tasks related to the database system. These programs include, but are not limited to webservers, crawlers, image crawlers, trash daemon, global daemon, logger daemon, fileserver daemon, mapjob daemon, repair daemon, ram daemon, bucket daemon, bucket_maintenance daemon, reader daemon, writer daemon, heartbeat daemon, monitoring daemons: out-of-memory (oom) daemon, and check-r daemon. Some of the daemons will be discussed in further detail.

Reading (Get Data): Generally and Cache

Figure 9:
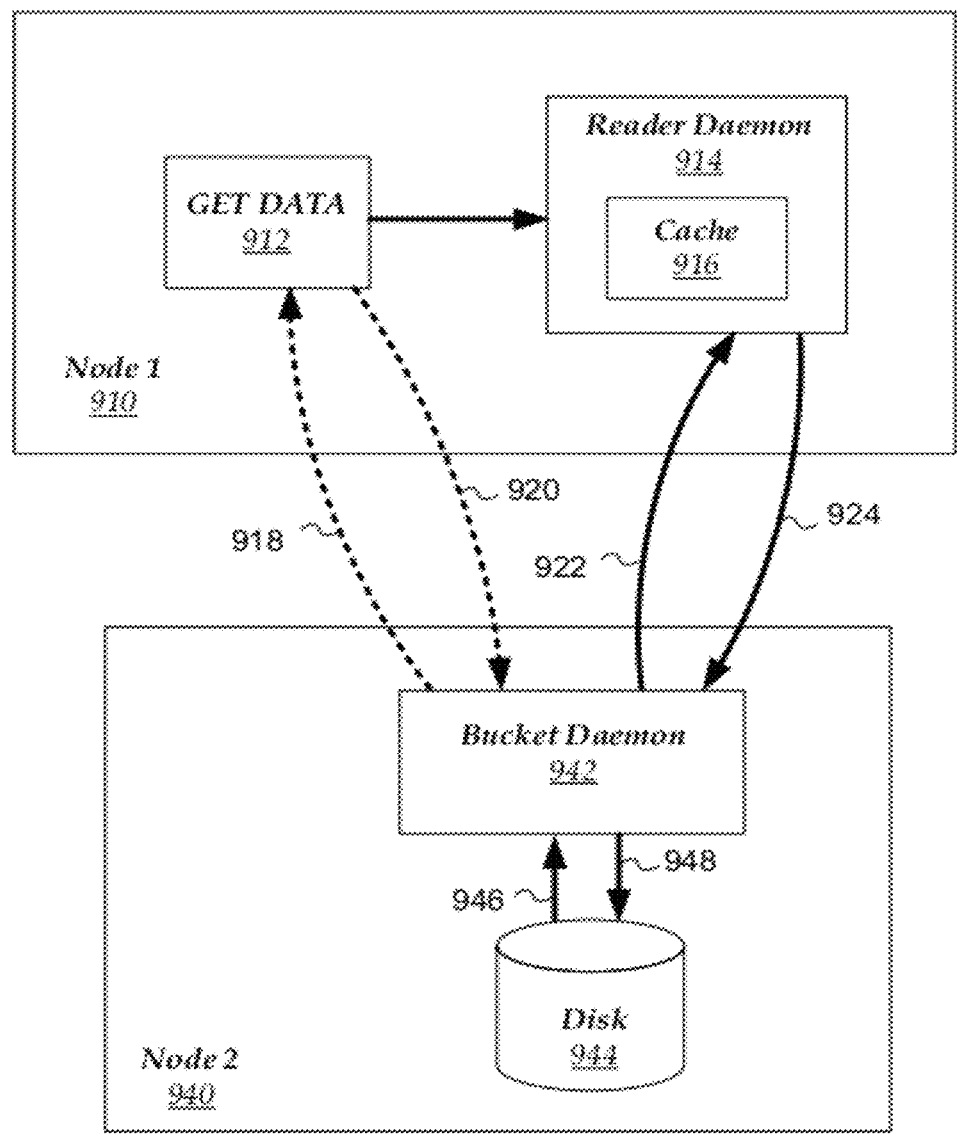
FIG. 9 is a block diagram for a get operation in a distributed database system in accordance with some embodiments.

FIG. 9 is a block diagram illustrating the collaboration between two nodes 910, 940 for a get request task in a distributed database system in accordance with some embodiments. A request to get data 912 is received at Node 1 910. The get data request 912 corresponds to a request to get a row from the database such as cluster 810. When the request is made, the row key is first hashed to determine which buckets the row appears in. The get data request 912 is received by a reader daemon 914 in Node 1 910, which executes get( ) requests. In some embodiments, the reader daemon 914 hashes the row key.

In addition to information stored on disk, which is stored replicated for fault-tolerance, some information for faster access is in a cache, such as cache 916. In some embodiments, the cache 916 is managed by the reader daemon 914, but in other embodiments the cache 916 may be located external to a local disk in Node 1 910 or external to Node 1 910 and may be managed by other daemons. In some embodiments, the cache 916 may be either in RAM, on a server, in Flash on a solid-state drive (SSD), or Flash on a Peripheral Component Interconnect (PCI) Express card. In some embodiments, the data stored in RAM/Flash may not be a replica, but instead a copy of data that is stored, replicated, on disk. In some embodiments, the reader daemon 914 is used to read data from cache 916. The reader daemon 914 first checks the cache 916 to determine whether the requested data 912 is already stored in the cache 916. In some embodiments, the reader daemon 914 may include a RAM cache (not shown) in addition to cache 916, or the node 910 may include a RAM cache daemon, configured to store data from buckets for responding to queries faster. In some embodiments, the first replica is stored in the RAM cache or the cache 916, if the first replica is always requested first before searching the location of second or third replications of information. In some embodiments, the first replica of data is locked into the RAM cache or the cache 916 so that it can be provided very quickly in response to queries. In some embodiments, the RAM cache or the cache 916 is transparent to the programmer, such that if a response to a query cannot be provided quickly, because that part of the bucket in the node 910 has not been uploaded yet, it will read the answer off of the RAM cache or the cache 916.

If the answer to the get data request 912 is not in the RAM cache or the cache 916, reader daemon 914 may make the request via communication 924 to another node 940, Node 2, known to contain the bucket corresponding to the hashed row key. If that node 940 does not reply quickly, a second request is made to the third node (not shown) with that bucket, and so on.

In some embodiments, a bucket daemon 942 in the next node 940, Node 2, receives the get request from reader daemon 914. Bucket daemons, such as bucket daemon 942, manages one or more buckets in respective nodes to complete tasks that include processing requests, retrieving information from buckets stored on disk 944, or writing information to disk 944. Bucket daemon 942, checks 948 the local disk 944 for the requested row according to the row key hash. If the disk 944 contains the requested row, the information is returned to the bucket daemon 946 for delivery. In some embodiments, the retrieved information is returned to the reader daemon 914 via communication 922 for final delivery to the requestor. In some embodiments, the bucket daemon 942 delivers the retrieved information directly to the requestor.

In some embodiments, after the row key is hashed, the get data request 912 is simultaneously sent to two or more nodes 910, 940. As the get data request 912 is being processed in Node 1 910, the request is also sent via communication 920 to Node 2 940. In some embodiments, the get data request 912 may be processed similarly, following a common protocol for all nodes 910, 940. For example, the get data request 912 may be first received by local reader daemons to check the local cache or ram cache. If the local cache or ram cache does not contain the row, the local bucket daemon may process the request 912. In some embodiments, the get data 912 may be processed independently, for example the reader daemon 914 may first check the cache 916 in Node 1 910, while the get data request 912 in Node 2 940 is first received and processed by the bucket daemon 942. Thus, nodes in cluster 810 may follow a common protocol for processing and managing information; the nodes may locally process and manage information independent of one another; or the nodes may follow a protocol that is a combination of both.

Reading (Get Data): Cut & Run

Figure 10:
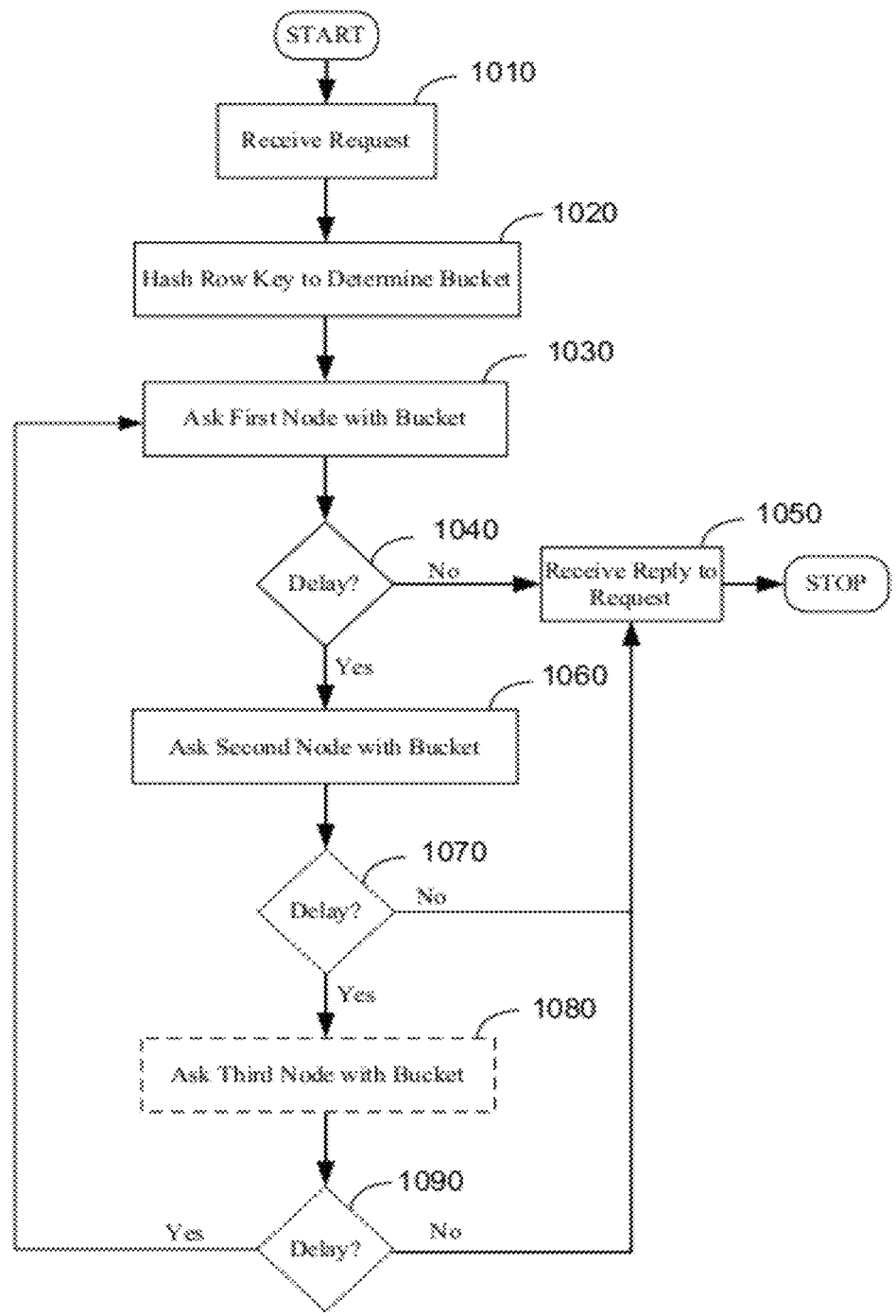
FIG. 10 is a flow diagram for processing a get request in a distributed database system in accordance with some embodiments.

FIG. 10 is a flow diagram for processing a request in accordance with some embodiments. A request may be received by the system 810 from any number of sources, including but not limited to, a client such as client 110, another node 812 from cluster 810, another node 142, 242 from another cluster 140, 240, and so on. The request may be, but is not limited to, a read request, a get request, a nextrow request, a request to make status updates, request to update local tables and maps, or any type of a remote procedure call (RPC) within the cluster 810 or from a source external to cluster 810. Upon receiving a request, at step 1010, a row key is hashed at step 1020 to determine whether a bucket is able to service the request. Once one or more buckets are determined, a first node having one of the buckets is asked to service the request at step 1030. If the first node responds quickly, at node 1040, and there is no delay, the reply to the request is received from the first node at step 1050, the first node processes the request, and the process is stopped. In some embodiments, if the first node does not respond or is delayed in responding, a second node having one of the determined buckets is asked to service the request at step 1060. Again, if there is no delay in responding by the second node at step 1070, the reply to the request is received by the second node at step 1050, the request is processed by the second node, and the process ends. In some embodiments, if the second node delays in responding at step 1070, a third node having one of the determined buckets is asked to service the request at step 1080. The process is repeated, where if there is no delay at step 1090 in responding by the third node, the reply to the request is received at step 1050, the request is serviced and the process ends. If there is yet another delay at step 1090, the request process is repeated, and the first node is again requested at step 1030. In some embodiments, particularly if more than three replications of data are maintained by more than three buckets, the process continues until the request is serviced by an available node 812 in cluster 810 or by another node 142, 242 in another cluster 140, 240.

Figure 11:
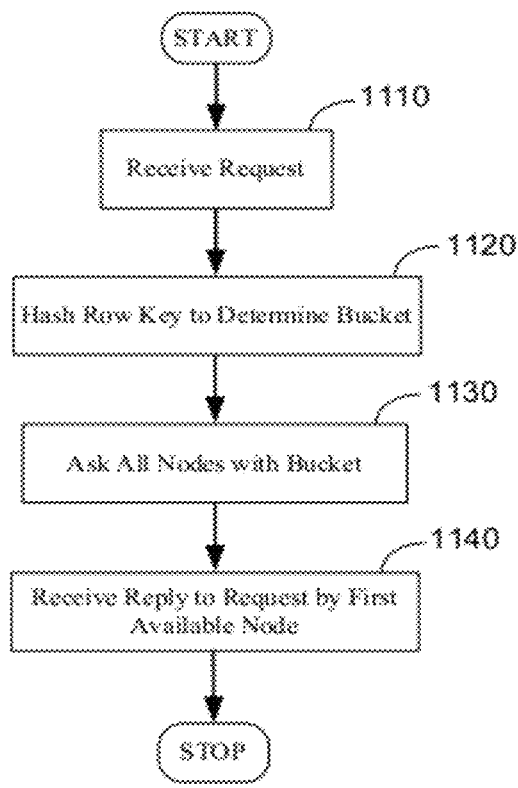
FIG. 11 is a flow diagram for processing a request in a distributed database system in accordance with some other embodiments.

FIG. 11 is a flow diagram for processing a request in accordance with some other embodiments. Similar to steps 1010 and 1020 of FIG. 11, upon receiving a request at step 1110 (e.g., an RPC) a row key is hashed at step 1120 to determine whether a bucket is able to service the request. Once one or more buckets are determined, all the nodes with buckets are asked to service the request at step 1130. The first available node that replies services the request. When the first available node replies to the request at step 1140, the process is stopped. In some embodiments, the nodes are from the same cluster 810 or from different clusters 140, 240.

Nextrow( )

In some embodiments, a second kind of read operation, nextrow( ) is used to read through all the rows in a table in hash order. This is typically used in Mapjob tasks that are computing something for every row in a table. Nextrow( ) for example in a Mapjob (described in later sections), is silently transformed from a call that goes over the network to one which reads from local disk, which is a much more efficient process. In some embodiments, the same code as a Mapjob and as a non-Mapjob may be used for Nextrow( ) operations, which makes testing and debugging easy. The Mapjob version, however, runs much faster over large amounts of data.

In some embodiments, an index of some key(s) (not the hashed key) and/or some columns in a table are maintained in memory. This index is used when nextrowing( ) to efficiently access a range of keys or column values.

Repair

Figure 12:
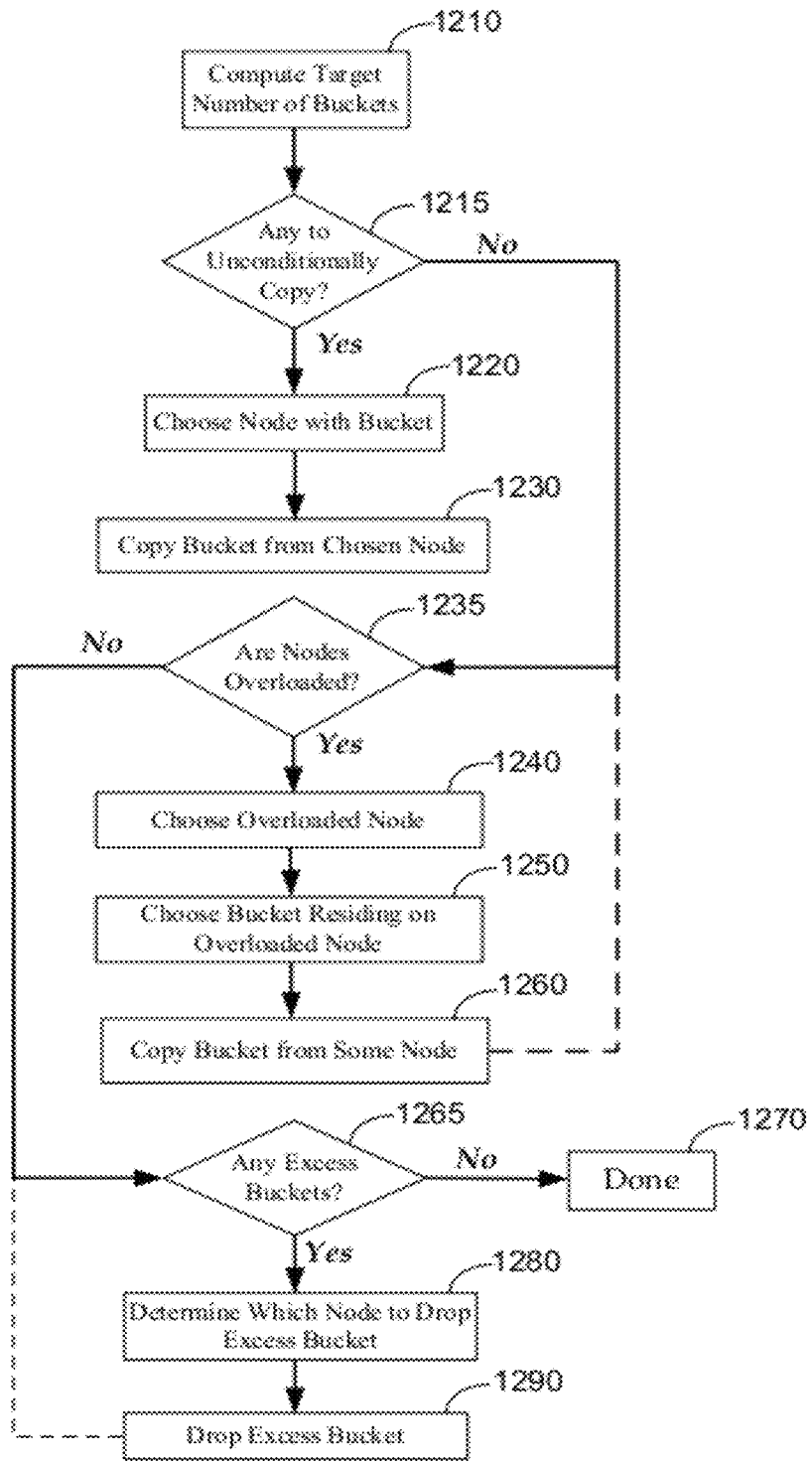
FIG. 12 is a flow diagram of a process for repairing and managing buckets in a distributed database system in accordance with some embodiments.

FIG. 12 is a flow diagram of a process for self-repairing and managing buckets in a distributed database system in accordance with some embodiments. Each node 812 of the cluster 810 includes a repair daemon that is invoked starting from when a node is added to the cluster 810. The repair daemon uses swarm algorithms to coordinate without using a master node. The repair daemon is part of the fault tolerance infrastructure, and repairs the damage from failed hosts, failed disks, and corrupted buckets. The repair daemon also helps load balancing by moving buckets from nodes with too many buckets to nodes with too few. For example, a new node beginning with no buckets will be given some by the repair daemon.

The repair daemon computes a target number of buckets for each node, at step 1210, using information such as the number of disks, CPU (central processing unit) power, disk usage, and so on for each node 812. These targets are computed by every node for every node using globally-available information. If a node fails, for example, the bucket targets for the remaining nodes will all rise slightly. If a new node is added, it will receive an appropriate target, and the targets for all the other nodes will decrease slightly. In some embodiments, every node 812 uses the same data to compute these targets, and thus most nodes 812 will calculate the same target goals most of the time. The target number is then used to determine whether to reorganize or reallocate buckets and bucket sizes. At step 1215, the repair daemon looks for buckets that should unconditionally be replicated. Buckets are unconditionally replicated if, for example, buckets were duplicated within the same rack or buckets that have less than three replicas. For example, fewer than three replicas of a bucket initiate a node request to make a replica of the bucket. In some embodiments, the count does not include buckets or nodes that have been marked "HOSTABANDON" or "HOSTBAD." Buckets marked HOSTABANDON and HOSTBAD are administrative conditions set by a human to stop the use of hosts as soon as their buckets can be removed, while the removal without causing any alerts that the number of these "bad" buckets are less than three replicas. The repair daemon identifies buckets that need to be replicated, and at 1220 a node with an available bucket space is chosen. In some embodiments, the available bucket space is selected at a location where another replica of the bucket is not located so that no two buckets reside on the same node 812. The bucket is replicated at step 1230 from the node identified with the bucket to copy to ensure that three valid replicas of the bucket is stored.

In some embodiments, if there are no unconditional replicas to make, then at step 1235, the repair daemon considers replicating buckets from nodes that appear to be overloaded. Overloaded nodes are chosen based on comparing the target number of buckets with the actual number of buckets currently on the host. Nodes 812 with more actual buckets than the target are overloaded; nodes 812 with fewer actual buckets than the target are underloaded. If overloaded nodes are identified at step 1235, an overloaded node is selected at step 1240. At step 1250, a bucket residing on the overloaded node is selected to replicate. One or more buckets may be selected from the overloaded node. Since there are typically multiple replicas of every bucket available to be copied, the repair daemon picks which node to copy from based on factors such as how many copies that node is currently engaging in, or how far behind on writes the bucket is, and so on. A copy of the one or more buckets residing on the overloaded node is replicated from some node containing replicas of the selected buckets at step 1260. In some embodiments, unloading overloaded nodes is repeated until all the overloaded nodes are serviced.

In some embodiments, the repair daemon, at step 1265 also considers dropping buckets when there are four or more replicas of the same bucket. In some embodiments, if there are no excess buckets, the repair daemon is done at step 1270. In some embodiments, the repair daemon in every node does the same computation to identify excess buckets using the same input data, such that all the nodes with the bucket will know which node is the best one to drop the excess bucket. In determining which node should drop the excess bucket, at step 1280, the repair daemon considers, for example, whether the bucket or updates to the bucket are behind on a particular node, whether the bucket is duplicated within the same rack, or that node is overloaded. Once the node is identified, the excess bucket is dropped at step 1290. In some embodiments, the process of dropping excess buckets is repeated if more than one node has excess buckets.

Delete

Figure 13A:
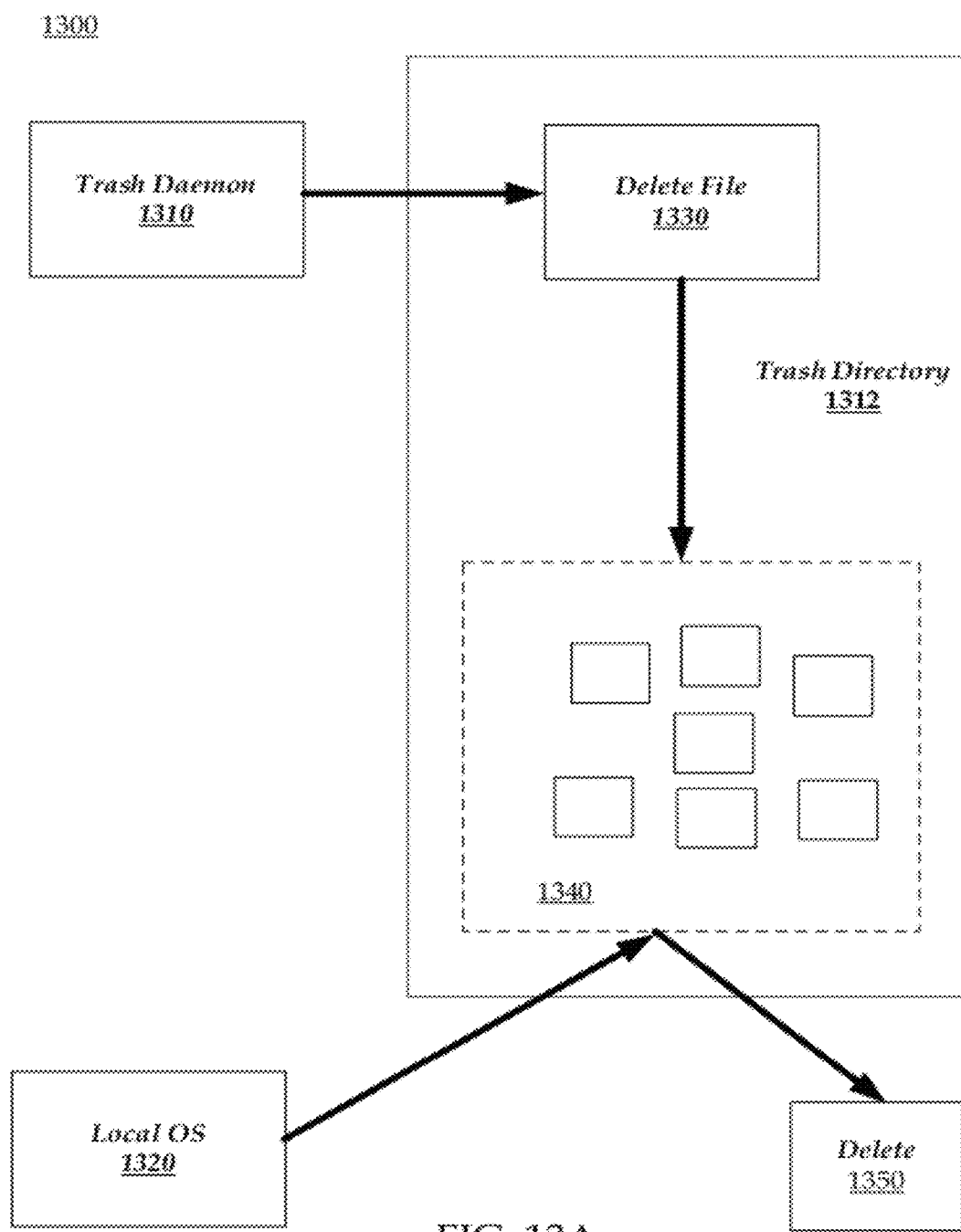
FIG. 13A is a block diagram illustrating how files are deleted in the swarm system 350, 500 according to some embodiments.

FIG. 13A is a block diagram illustrating how the swarm system 1300 deletes files according to some embodiments. In some embodiments, the nodes, such as 352, 552 of FIGS. 3 and 5, are capable of faster operations, e.g., read row of data from disk space, by relieving a local operating system 1320 of certain long operations which cannot be interrupted, such as writing rows of data to disk or deleting large files. In some embodiments, the swarm system 352, 552 prevents long operations by the local operating system 1320 by reducing some operations into more digestible pieces for the operating system 1320. Instead of using the conventional delete function 1350 of the local operating system 1320, which can take many seconds for a multi-gigabyte file, the swarm system 1300 move files needing deletion to a trash directory 1312, which is some designated space on the respective node. A trash daemon 1310 comes along later and slowly truncates one or more larger delete files to smaller and smaller sized file pieces 1340, a delete process known as a polite unlink. The polite unlink operation is a user level function which opens the file, and essentially divides up the delete operation into small chunks such that the delete operation would not monopolize use of the disk for a long time. When the one or more delete files have been reduced, the local operation system deletes the smaller file pieces 1340 faster using its conventional delete function 1350 to remove the file 1330. The trash daemon 1320 manages most file deletions. In some embodiments, the large file 1330 is renamed into the trash directory 1312, and later the trash daemon 1310 come along and politely unlinks it instead of the local operating system 1320. Thus, by using the trash daemon 1310 to delete files relieves the local operating system 1320 to allow, for example, reads from other processes (e.g. to respond to a user web search) to be completed faster in the swarm system 1300 for faster response time.

Mapjob

Figure 13B:
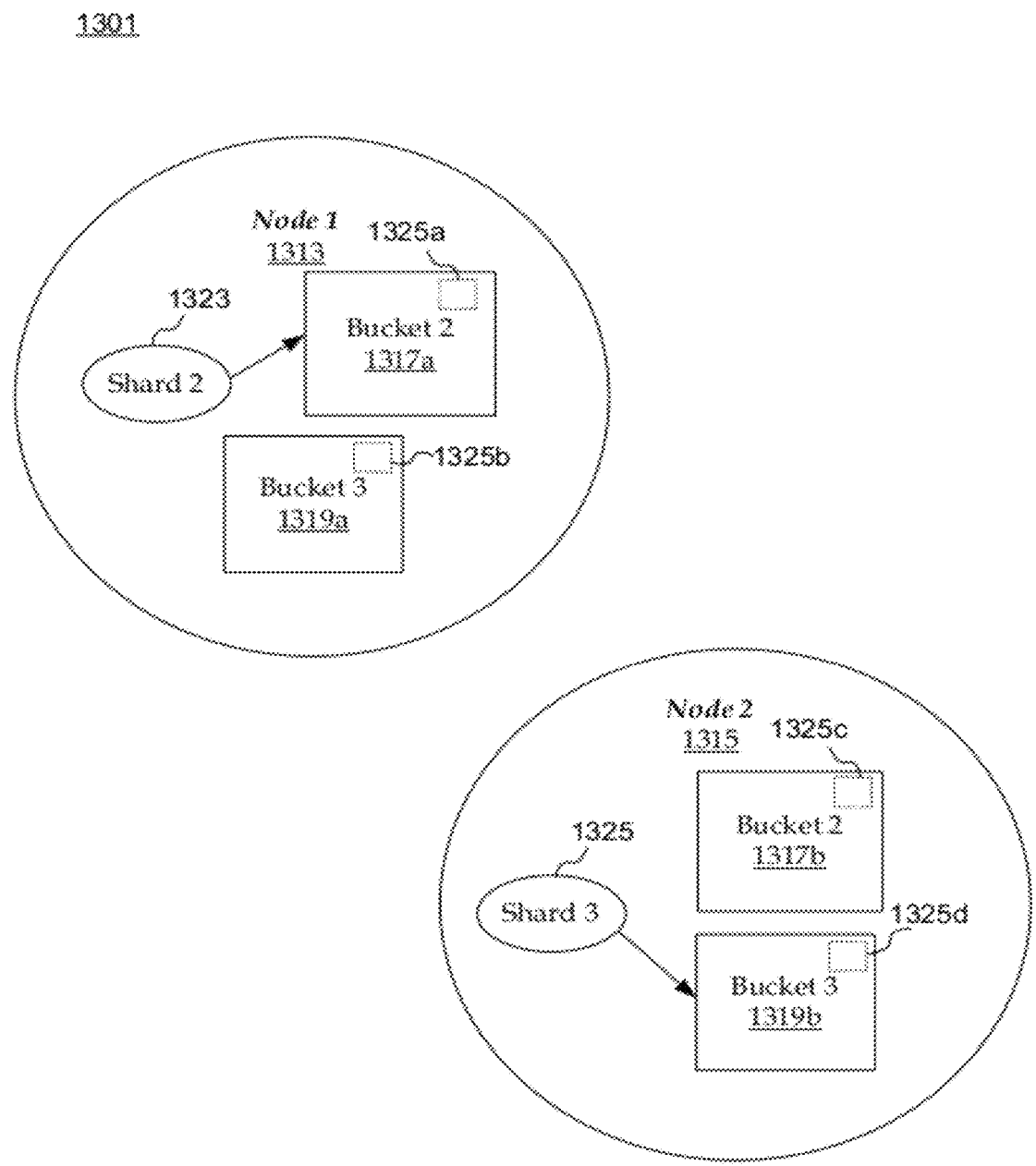
FIG. 13B is a block diagram illustrating a parallel mapjob process according to some embodiments.

FIG. 13B illustrates a parallel mapjob process in system 1301 servicing two nodes 1313, 1315 according to some embodiments. A mapjob is a parallel program which runs efficiently by processing a complete table by dividing the work into "shards" 1323, 1325 to improve execution time. Each shard 1323, 1325 reads the appropriate piece of the table from local disk, shown as buckets 1317, 1319. For example, a mapjob on the database system 1301 has at least two shards 1323, 1325. In the example, Shard 2 1323 is run on Node 1 1313, directly reading the contents of Bucket 2 1315a from local disk. Shard 3 1325 is run on Node 2 1315, directly reading the contents of Bucket 3 1317b from local disk. A mapjob usually generates an answer by either setting data in the database, or by returning data to the main process. Most other systems doing similar things are called "MapReduce" because they have only one way to return the answer by returning data to the main process. Mapjobs, however, allow for multiple ways to return the answer. The ability for a mapjob to write immediately into the database means that partial results for the mapjob are available immediately to a reader, and also that any reductions (expressed with combinators) can be computed overlapped with the map computation.

In some embodiments, mapjob uses combinators, which are described in the next section, to do the reduction instead of an explicit reduce phase. Combinators are remote atomic operations which can be used, among other uses, to take pieces of data from many nodes and combine them into a single answer. For example, the "add" combinator in a mapjob may be used to compute the sum of a single column over all rows of a table. These combinator "reductions" can either be done to return data to the caller or to set data in the database. Mapjobs may be computed as a mapjob described above or, alternatively, computed acting on a stream of data coming in over a period of time, such as webpages being crawled.

Another interesting aspect of a mapjob doing reduction to the database instead of to the caller is that the reduction workload can be spread over the life of the mapjob, instead of concentrated at the end. This leads to better performance. Additionally, mapjobs are another fault-tolerant aspect of the swarm system 350, 500. A "shard" of a mapjob will be re-run on a different node containing the appropriate bucket if a disk or node failure causes a shard, such as shard 1323, 1325, to fail to complete.

D. Combinators

Overview

Figure 14A:
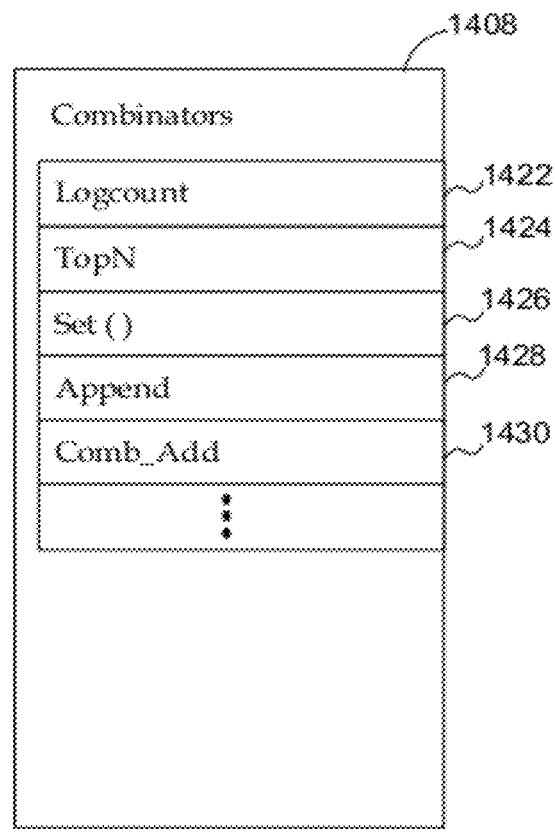
FIG. 14A is a collection of combinator tools in accordance with some embodiments.
Figure 18:
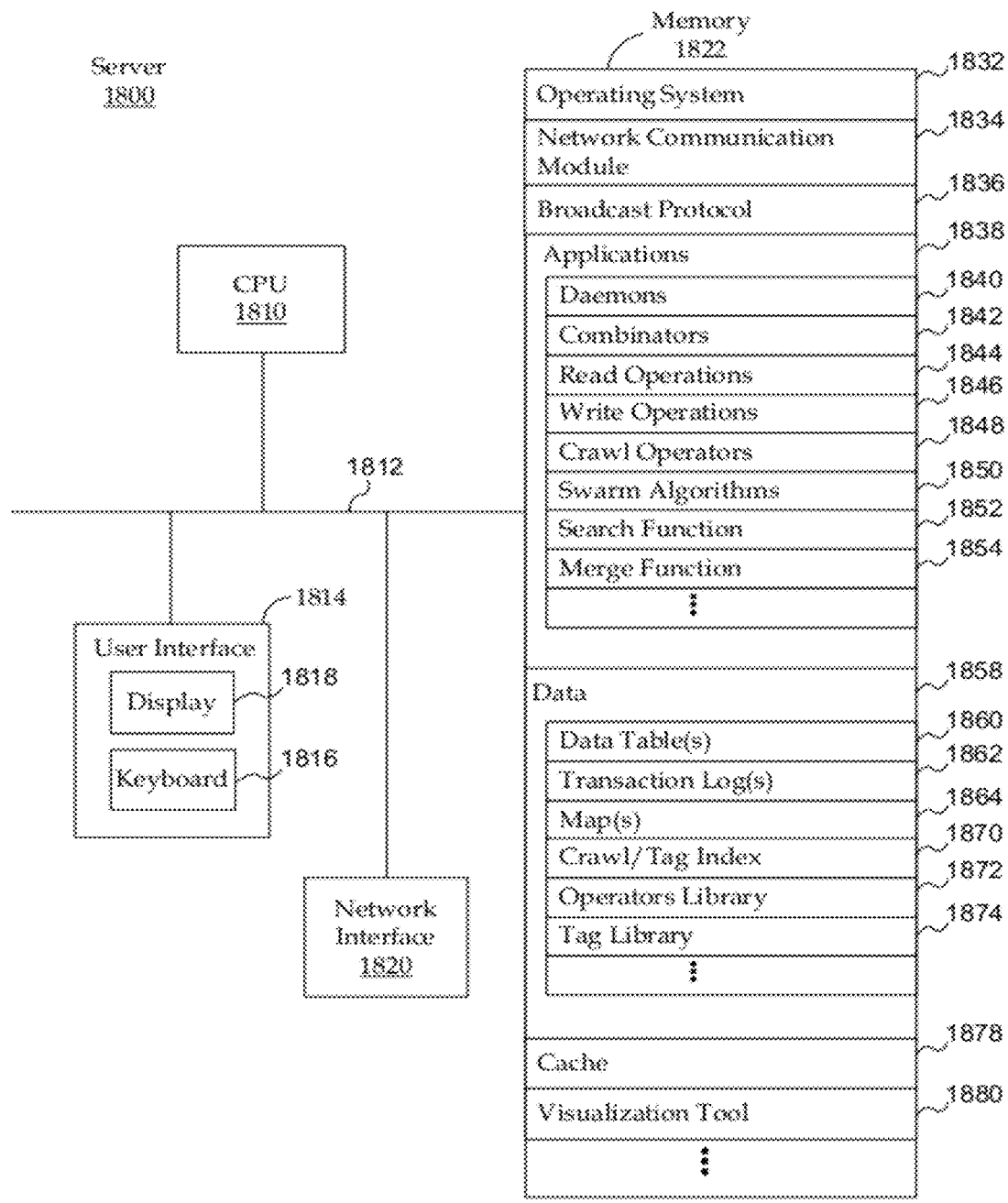
FIG. 18 is a block diagram of a server in accordance with some embodiments.

FIG. 14A lists several combinator tools 1408 that may be stored as applications 1838 in memory 1822 of FIG. 18, according to some embodiments. The combinators 1408 will be described in further detail in later sections. The combinators 1408 may be utilized in a variety of database and search operations, and are described in detail in various sections. Combinators 1408 may include, but are not limited to, the following:

Logcount 1422—approximates the count of unique items in a set of items.

TopN 1424—ranks data items, keeping only the N highest ranked.

Set( ) 1426—takes the last value seen as the answer.

Append 1428—append a string into the end of an existing string.

Comb_Add 1430—add a value to the existing value.

Figure 14B:
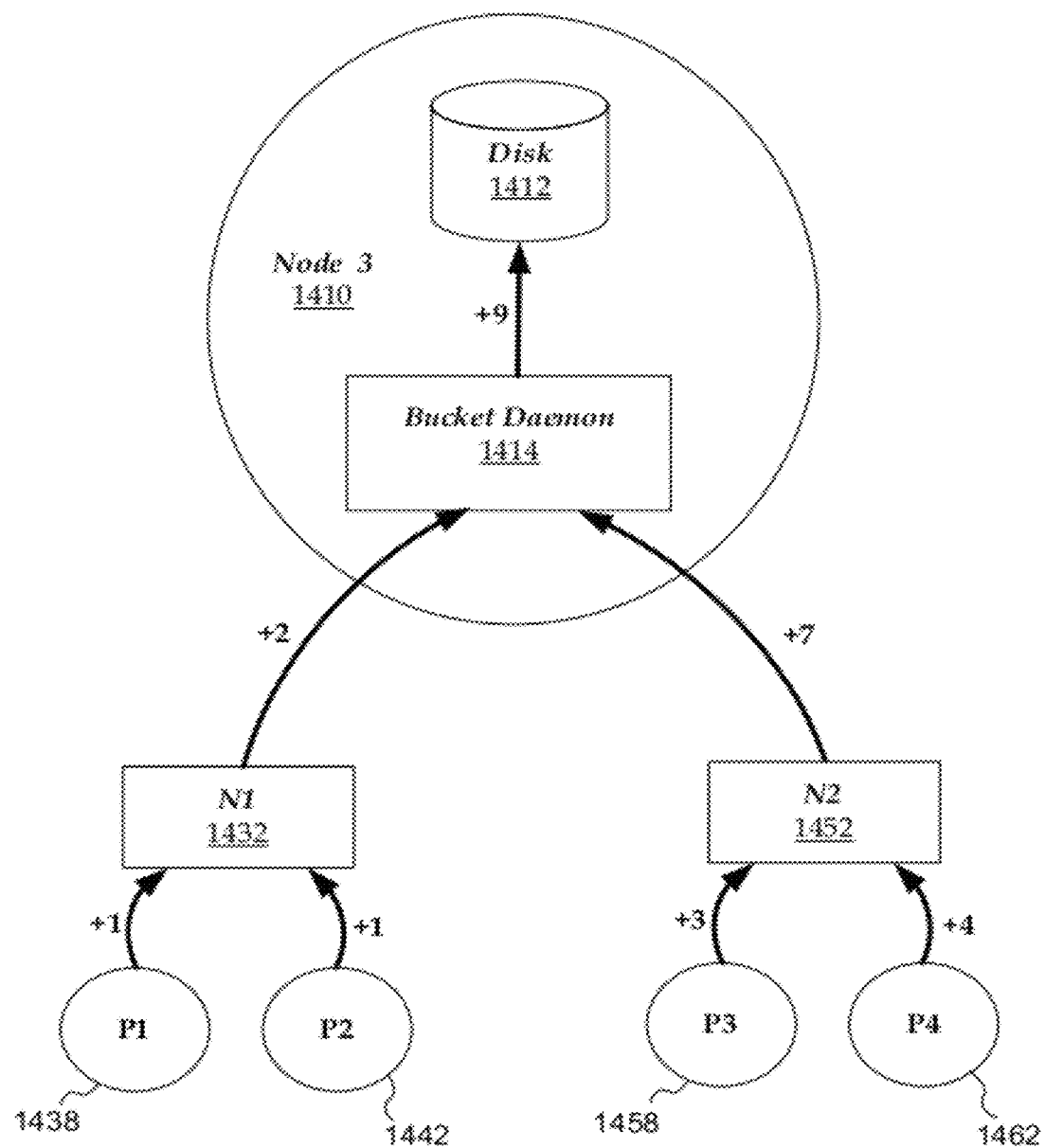
FIG. 14B is a block diagram illustrating an add combinator for a node in a distributed database system in accordance with some embodiments.

FIG. 14B is a block diagram illustrating an add combinator for a node 1410 in a distributed database system, such as swarm system 350, 500, in accordance with some embodiments. In some embodiments, combinators combine tasks at many different levels of the swarm system 350, 500, which reduces the amount of data transferred across the network and written to disk. For example, consider an "add" combinator illustrated in FIG. 14B. For a given number of requests to add to a value in a row stored in disk 1412 of node 3 1410, a first request at a first process 1438 (P1) represents an add +1, to the row in disk 1412. Another process 1442 represents another add +1. Thus at some level (here the node N1 1432), the adds are combined to be a single combined operation of add +2. The summed request is received by a request processor, such as a bucket daemon 1414 of node 3 1410. In some embodiments, more than one add for the row in disk 1412 are received from a single process, such as shown by P3 1458 and P4 1462. There are add +3 process P3 1458 and add +4 from process P4 1462. Therefore, the sum of requests received by node N2 1452 equals add +7. Add requests may, therefore, come from different location (e.g., N1, N2), but are combined by bucket daemon 1414. Consequently, the bucket daemon 1414 receives a total of add +9 for the value in the row stored in disk 1412. Combining the operations reduces the resources needed to update the value.

Combinators in Three Bucket Replication

Figure 15:
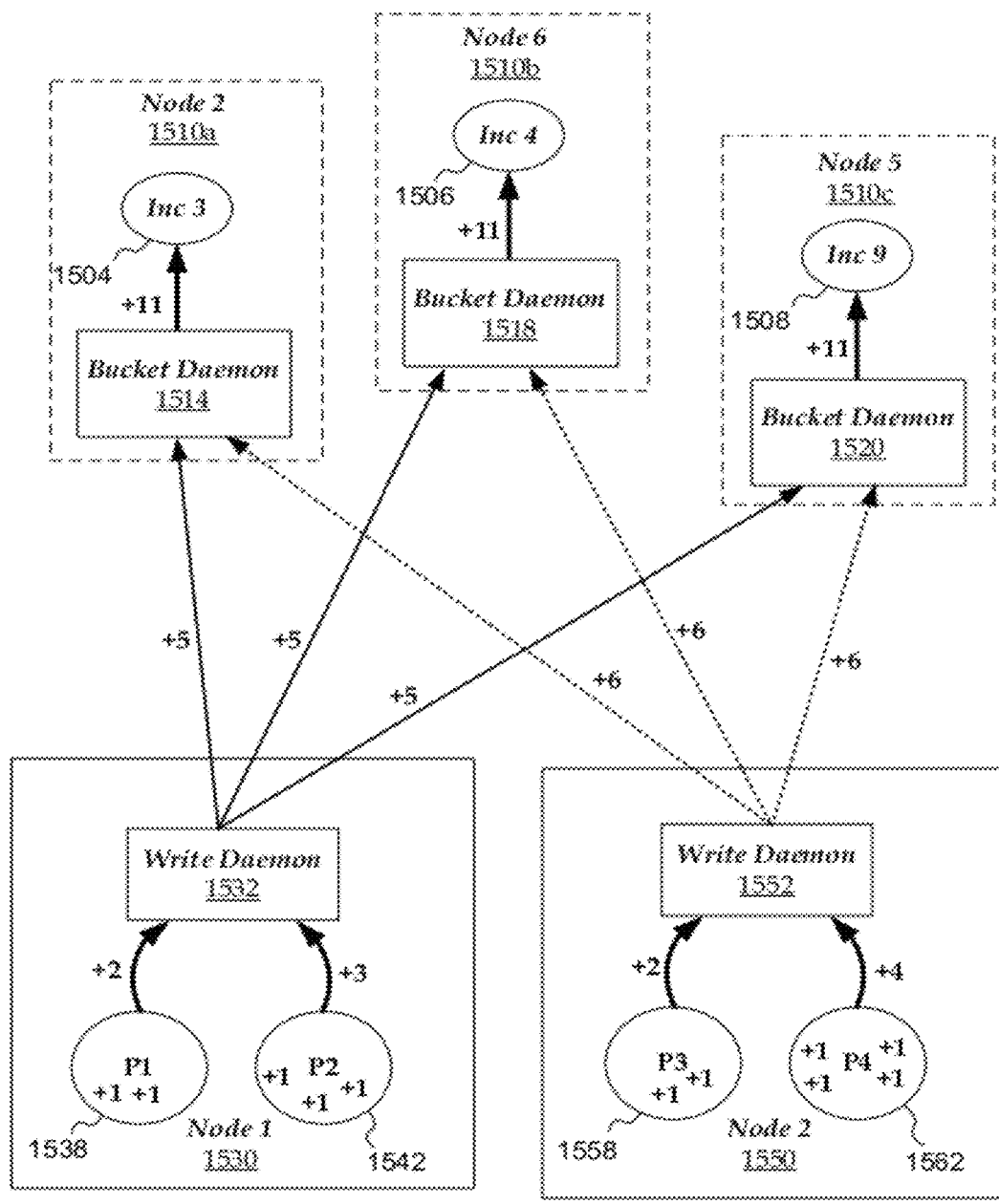
FIG. 15 is a block diagram illustrating combinators used for writes to three bucket replications in a distributed database system in accordance with some embodiments.

FIG. 15 is a block diagram illustrating combinators used for writes to three bucket replications (in nodes 1510*a-c*) in distributed database system, such as swarm system 500, in accordance with some embodiments. Process 1538 in a Node 1 1530 includes two write requests to add to a given row and column of a table to send to a write daemon 1532 which might succeed in finding more adds to the same row and column of the same table and combining them. Process P2 1542 in Node 1 1530 also includes add +3 to the same row. Thus, total adds to write daemon 1532 is add +5. Similarly, process P3 1558 has add +2 and process P4 1562 includes add +4 to the same row. Thus, add +6 are received by a write daemon 1552 of Node 2 1550. The adds are sent to several remote bucket daemons 1514, 1518, 1520 (one per replica), which in turn combine more operations in memory until the data is written to disk. The bucket daemons 1514, 1518, 1520 at respective three nodes 1510*a-c* receive the adds. Thus, each bucket daemon 1514, 1518, 1520 writes a total of add +11 to respective Inc files 1504, 1506, 1508.

Due to all of these combinations, millions of add operations on the cluster to the same column and row in a table might result in only a few or perhaps a single disk transaction.

Combinators can be stored in the database in several ways. One way is to store a combinator as a column in a row of the database. The other is to have the combinator be embedded in a complex datastructure such as a Perl hash or Python dictionary which is stored in a column in a row of the database. There is a special combinator, comb_hash, which is a Perl hash or Python dictionary containing other combinators such as comb_add or comb logcount.

Combinators also exist as objects in ordinary variables, i.e. they can be Perl or Python variables.

Deleted values are represented by a special combinator, comb_delete, whose role is somewhat similar to "tombstones" in Casandra.

In some embodiments, the time that a combinator was created is recorded and is used to determine which value is chosen when situations arise such as 2 comb_sets or a comb_set and a comb_delete or a series of comb_adds and a comb_set done to the same value. This aids determinism of combinator calculations. For example, if the operations being combined are a comb_set to zero at 11:00 am, and a comb_add +1 at 10:35 am, then the result would be comb_set of zero at 11 am.

In some embodiments, the clocks of the nodes in the cluster are carefully synchronized using a protocol such as NTP (the network time protocol) in order to facilitate the process described in the preceding paragraph above.

Set( ) Operations

The use of combinators has been implemented for a very large number of operations in our system besides add. One such use is "set( )". The set( ) combinator 1426 takes the last value seen as the answer. Because set( ) can be written as a combinator, it uses all of the combinator infrastructure available in the system. With most databases, if 10 processes on 100 nodes set 1,000 different values into a given row and column of a particular table, there will be 1,000 RPC calls made from the nodes to the database server, each resulting in a write into a transaction log. In contrast, the writer daemons 1532, 1552 on nodes 1530, 1550 may combine the 10 local set operations into one, and the bucket daemons 1514, 1518, 1520 on the nodes 1510*a-c* with replicas of this bucket may combine the 100 incoming set( ) operations into a single set( ) resulting in one disk transaction. This is much higher performance.

In some embodiments, combinators 1408 may be combined with different combinators 1408 in some cases, e.g. a cell might be operated on by both set and add combinators 1426, 1430. If both combinators are associative, e.g., comb (comb(a,b),c)=comb(a,(comb(b,c)), then the combinators can be used together.

TopN

FIG. 16A is a diagram of a data structure illustrating a TopN ranking 1603 according to some embodiments. A single item sent into a TopN 1603, as shown in FIG. 16A is a tuple of (name, rank, extra), where 'name' is a scalar variable (string, number, etc), 'rank' is a number (larger is better), and 'extra' is an arbitrary data structure optionally used to record additional information about 'name'. The value of N sets a bound on the memory usage of the TopN 1603. Example usages of TopN 1603 include: remembering the N most important (highest ranked) webpages mentioning the word 'Obama', or remembering the latest N webpages crawled mentioning the word 'Obama'. In this last example, the "rank" of the webpage is the time that the webpage was crawled. A larger time value indicates more recent crawls.

Logcount

Figure 16B:
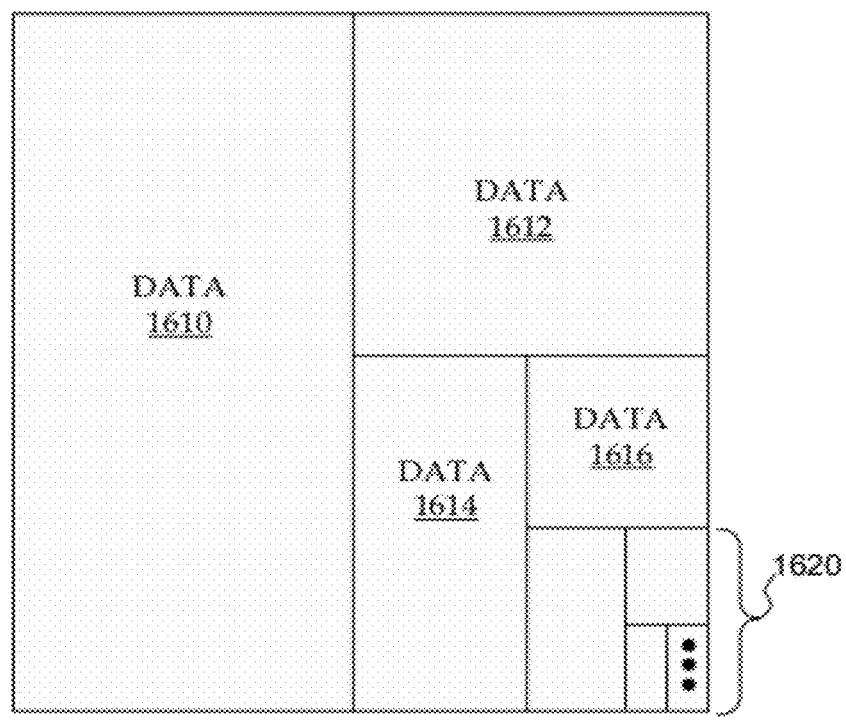
FIG. 16B is diagram illustrating a conceptual Logcount structure and process in a distributed database system in accordance with some embodiments.
Figure 16C:
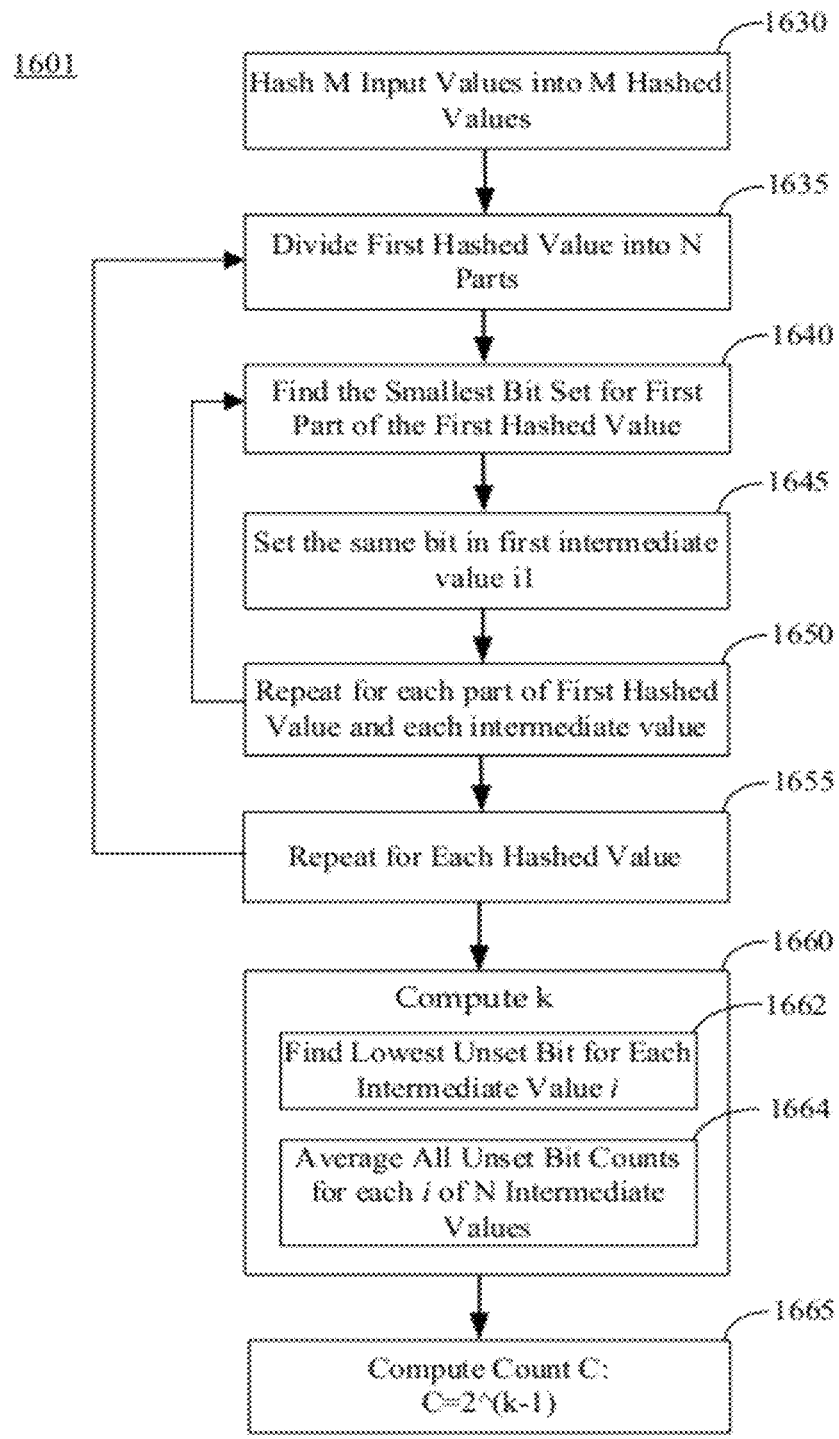
FIG. 16C is a flow diagram of a process for using Logcount to count a set of unique items, according to some embodiments.

FIGS. 16B-16C illustrates various embodiments of a Logcount structure 1600 resulting from the Logcount combinator 1422 and a process 1601 in a distributed database system, such as swarm system 350, 500, in accordance with some embodiments. Logcount 1422 solves the problem of getting an approximate count of unique items in a set of items, using a small amount of memory. For example, Logcount 1422 may be used to count the number of incoming links to a website. There might be 0 or 1 such incoming links, or millions of incoming links for a site such as yahoo.com. It is desirable to count these links without having to store all of them. By only counting the unique incoming links, the data can be re-processed repeatedly while still keeping an accurate count of the unique incoming links.

The problem of counting unique items, such as visited websites, was typically addressed by a technique called a "Bloom filter", which requires megabytes of storage to give an accurate answer when presented with billions of items. Logcount 1422, however, is a less accurate method that uses much less memory. In one embodiment, billions of unique items can be counted to an accuracy of roughly +−50% using only 16 bytes of storage. This small storage size makes it possible to logcount many separate kinds of data with fewer resources than using a Bloom filter to uniquely count just one kind of data. Additionally, Logcount 1422 can be used in both MapJobs and incrementally.

A process 1601 illustrated in FIG. 16C is one example where Logcount 1422 can be used to count a set of M input values v1, v2, . . . vM. At step 1630, each input value is hashed into a hashed value h1, h2 . . . hM. The logcount algorithm uses N pieces of intermediate data i1, i2, . . . , iN. Before counting any items, i1 . . . iN are zero. To count the first hashed value h1, at step 1635, the hashed value h1 is divided into N parts h1_1 . . . h1_N. In some embodiments, the hash h1 contains 128 bits and if N=4, each part is 32 bits. The intermediate values i1 . . . iN in this embodiment are also 32 bits each, so the total intermediate storage needed by Logcount in this embodiment is 128 bits.

For each part of the first hashed value h1_1 . . . h1_N, at step 1640, the lowest bit set is found. For example, if h1_1=6, or 0110 in binary, the lowest bit set is the second bit. In step 1645, the same bit is set in the first intermediate value i1. Steps 1640 and 1645 are repeated for each of the N pieces of the hashed value h1. Finally, the steps starting at 1635 is repeated for each hashed value h2, h3, . . . , hM until all the hashed values are counted.

To compute the output count C given the intermediate values i1 . . . iN, a log variable k is computed at step 1660. To compute k, the lowest unset bit in each intermediate value i1 . . . iN is found. For example, if i1=0111011111, the lowest unset bit is 6. At step 1664, these lowest unset bit values are averaged together for all i1 . . . iN.

The final output value is then determined at step 1665 by the equation $C=2^{(k-1)}$.

The key to understanding this algorithm mathematically is that the larger bits in i1 . . . iN are less likely to be set than the smaller bits. Logcount 1422 is analogous to throwing darts at a dartboard as shown in FIG. 16B 1610-1620, where instead of similar-sized targets, each box is ½ the size of the box before it. Half of the time the dart will hit the biggest box 1610, and a small fraction of the time the dart will hit one of the tiny boxes 1620. After a few throws, all of the large boxes 1610-1616 will have been hit, but there will be tiny boxes 1620 which have not been hit yet. The smaller the box which has not been hit, the larger the count. This method is only an approximation to the count, and the error in the count can be quite large. However, to make the count C more accurate, N separate dartboards i1 . . . iN are maintained, and their counts are averaged together.

Continuing with the dartboard analogy, in contrast, a Bloom Filter is like a dartboard with equal-sized boxes. So the number of boxes must be extremely large to count a large number of darts, using much more storage than Logcount 1422 does.

Finally, note that if the hashed value h1 is counted again, it will set bits in i1 . . . iN which are already set, resulting in no increase in the count.

In some embodiments, to make the logcount more accurate, N can be increased, and the size of i1 . . . iN can be increased to 64 bits or more. As an example, a variant called logcount64 may be created, which has N=64 and i1 . . . iN sized as 32 bits. A variant algorithm that gives more accuracy for very small counts is used to record the exact answer for very small counts by storing the keys themselves (or their hashes) into the storage bytes that normally would be used to record i1 . . . iN. A flag indicates when this is done. If the count increases to the point where no more storage is left, then the algorithm switches to using normal logcount.

Logcount, as described, is expressed in powers-of-two, thus all of the operations may easily be expressed in binary arithmetic, which is very fast. In some embodiments, another variant is to use a factor other than ½ to determine which bits are set in i1 . . . iN. This can be thought of as having the boxes 1610-1620 in FIG. 16B decrease in size other than by a factor of ½. A factor of 9/10, for example, would require the size of i1 . . . iN to be increased to be able to store a count of up to 4 billion unique keys, but the count would be more accurate.

In some embodiments, additional variations are implemented, for example where the accuracy of an estimator (count) of a given bit is dependent on an arbitrary exponential decay ϵ. Logcount 1422 is an amazingly useful tool given its ability to fairly accurately estimate the number of unique strings. However, Logcount 1422 may be limited by the maximum number that it can count to. For example, a maximum Logcount value of $2^{32}$ is generally useful for quick results, and is selected because of the popular use of 32-bits. But, after 4 billion counts or more, Logcount at this size is no longer useful. Logcount 1422 may also be limitation in the size/accuracy trade-off. It is found that a storage capacity of 32 bytes allows Logcount 1422 to store numbers (counts) with accuracy in the +/−50% range. However, some variations, as described above, may include systems that require greater or lesser accuracy. In order to allow for greater flexibility, Logcount 1422 may be constructed where the probability of a given bit is no longer 50%, but an arbitrary exponential decay. This complicates the evaluation of the logcount (primarily through the "holes" in the bit pattern that are now likely not only to exist and carry useful information), but allows for balancing maximum count and size/accuracy trade-offs on a per-estimator basis, as described further in the next section.

In some embodiments, Logcount 1422 may be modified by having requirements for an exponential decay factor ϵ (introduced above). As in other Logcount variations, a good digest (hash) function is first needed, where d(string)→[0,1). Given ϵ the bit is set in a bit vector, defined as:

$$i = \left\lfloor \frac{\ln(1 - d(\text{string}))}{\ln(1 - \epsilon)} \right\rfloor$$

where i is an intermediate data value in a set of intermediate values for a count algorithm. Thus, for a given string the following probabilities that any given bit will be set are:

$$p(b_0) = \epsilon$$
$$p(b_1) = \epsilon(1-\epsilon)$$
$$\ldots$$
$$p(b_i) = \epsilon(1-\epsilon)^i$$

Also, for convenience in later sections, a second variable $f_i$ is defined as:

$$f_x = \epsilon(1-\epsilon)^x$$

Combining these bit vectors i is as simple as a bitwise "or".

Given the definitions above, a given bit vector may now be used to estimate the number of unique strings that went into its creation. This is done through modeling the probability of a bit vector given a number of unique strings, and maximizing the log-likelihood with respect to the number of unique strings.

First consider the effect of putting S unique strings into the bit vector. The probability that a bit is not set is then:

$$p(\sim b_i | S) = (1 - \epsilon(1-\epsilon)^i)^S = (1-f_i)^S$$

And therefore, the probability that a given bit is set is:

$$p(b_i | S) = 1 - p(\sim b_i | S) = 1 - (1 - \epsilon(1-\epsilon)^i)^S = 1 - (1-f_i)^S$$

So the probability of a given bit string given S unique strings would be:

$$p(b_0, b_1, \ldots b_n | S) = \prod_{i=0}^{n} p(b_i | S)^{b_i} p(\sim b_i | S)^{1-b_i}$$

And the log-likelihood is:

$$\ln(p(b_0, b_1, \ldots b_n | S)) = \sum_{i=0}^{n} b_i \ln(p(b_i | S)) + (1-b_i)\ln(p(\sim b_i | S))$$

$$= \sum_{i=0}^{n} b_i \ln(1 - (1-f_i)^S) + (1-b_i)\ln((1-f_i)^S)$$

$$= \sum_{i=0}^{n} b_i \ln(1 - (1-f_i)^S) + S(1-b_i)\ln(1-f_i)$$

Maximizing log-likelihood with respect to the number of unique strings results in:

$$\frac{d}{dS}\ln(p(b_0, b_1, \ldots b_n | S)) =$$

$$\sum_{i=0}^{n} b_i \frac{-(1-f_i)^S \ln(1-f_i)}{1-(1-f_i)^S} + (1-b_i)\ln(1-f_i)$$

-continued $$0 = \frac{d}{dS}\ln(p(b_0, b_1, \ldots b_n | S))$$

$$= \sum_{i=0}^{n} b_i \frac{-(1-f_i)^S \ln(1-f_i)}{1-(1-f_i)^S} + (1-b_i)\ln(1-f_i)$$

$$= \sum_{i=0}^{n} \ln(1-f_i)\left((1-b_i) - b_i \frac{(1-f_i)^S}{1-(1-f_i)^S}\right)$$

$$= \sum_{i=0}^{n} \ln(1-f_i)\left(1 - b_i\left(1 + \frac{(1-f_i)^S}{1-(1-f_i)^S}\right)\right)$$

$$= \sum_{i=0}^{n} \ln(1-f_i)\left(1 - b_i \frac{1}{1-(1-f_i)^S}\right)$$

$$= \sum_{i=0}^{n} \ln(1-f_i) + \sum_{i=0}^{n} b_i \frac{\ln(1-f_i)}{1-(1-f_i)^S}$$

which separates out a constant term from a sum over the set bits. This root can be discovered with Newton's method to a reasonable approximation.

In choosing $\epsilon$, given a length in bits N, and a desired maximum count to reasonably estimate M, then estimator runs out of bits when:

$$(1-\epsilon)^N = \frac{1}{M}$$

Which means the optimal $\epsilon$ would be:

$$\epsilon = 1 - \left(\frac{1}{M}\right)^{\frac{1}{N}}$$

It will be appreciated that one or more of the Logcount variations described in the preceding sections may be combined. Furthermore, other Logcount algorithms and methods known in the art may be utilized in the swarm system 350, 500, or utilized in combination with any of the Logcount variations described in this document. For example, one or more Logcount concepts from the following list may be utilized:

"Probabilistic Counting Algorithms for Data Base Applications," Philippe Flajolet and G. Nigel Martin, *Journal of Computer and System Sciences*, 1985;

"Log log Counting of Large Cardinalities," Marianne Durand and Philippe Flajolet, *ESA* 2003, *LNCS* 2832, pp. 605-617, 2003; and "Fast and Accurate Traffic Matrix Measurement Using Adaptive Cardinality Counting," Min Cai, Jianping Pan, Yu-Kwong Kwok, Kai Hwang, *Proceedings of the 2005 ACM SIGCOMM workshop on Mining network data.*

The generalized concepts of Logcount in the above papers may be utilized in any manner known to an ordinary person skilled in the art in the swarm system 350, 500, or other similar distributed databases systems (e.g, search engines), and are hereby incorporated by reference.

E. Subset Mapping

Figure 17A:
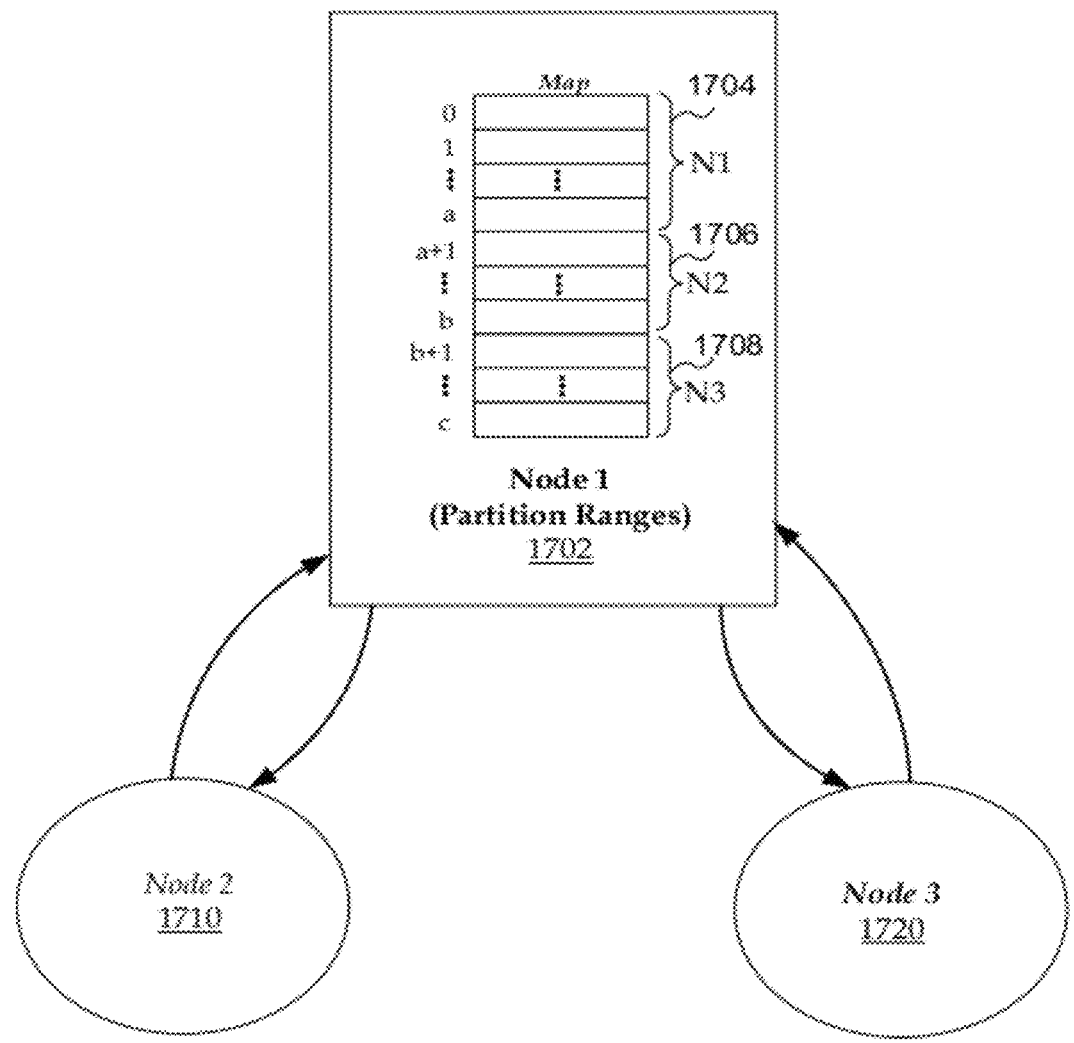
FIG. 17A is a block diagram illustrating a data structure for mapping the location of data in accordance with some embodiments.

FIG. 17A is a block diagram illustrating a data structure, as shown in Node 1 1702 for mapping subsets of data in accordance with some embodiments. Mapping subsets of data may be utilized in situations where some workload or set of tasks must be executed such that each node 1702, 1710, 1720 should hold a unique, unduplicated portion of the rows in a table. In such conditions, the entire table should be serviced, no rows should be duplicated between nodes 1702, 1710, 1720, and the organization should be adjusted if nodes 1702, 1710, 1720 come or go (due to machine crashes, new servers added, and so on.)

In a "parition ranges" protocol, active nodes, such as nodes 1702, 1710, 1720, are sorted in the cluster, for example, by IP address. The digest range (which is $0-2^{128}-1$) is divided, and portions of the digest range are allocated to nodes 1702, 1710, 1720 based on their position in the sorted IP address list. The lowest numbered node 1702, 1710, 1720 starts a digest 0 and go up to some value a (N1 1704). The next server starts at digest a+1 and go up to some value b (N2, 1706), and so on, up to the end of the digest range, N3 1708.

Each node 1702, 1710, 1720, thus, knows which rows of the table it is assigned to by checking to see if they lie within its partitioned digest range. The 1702, 1710, 1720 do not have to communicate with each other beyond the normal communication to know which ranges they are responsible for.

The rows of the table that a node is responsible for are not necessarily located on a bucket hosted on that node 1702, 1710, 1720, so they will likely have to be fetched from the network. Also, when the map changes (a new node 1702, 1710, 1720 comes up or goes down), all of the boundaries move. Every node 1702, 1710, 1720 in the cluster is affected by any changes to the server map.

Figure 17B:
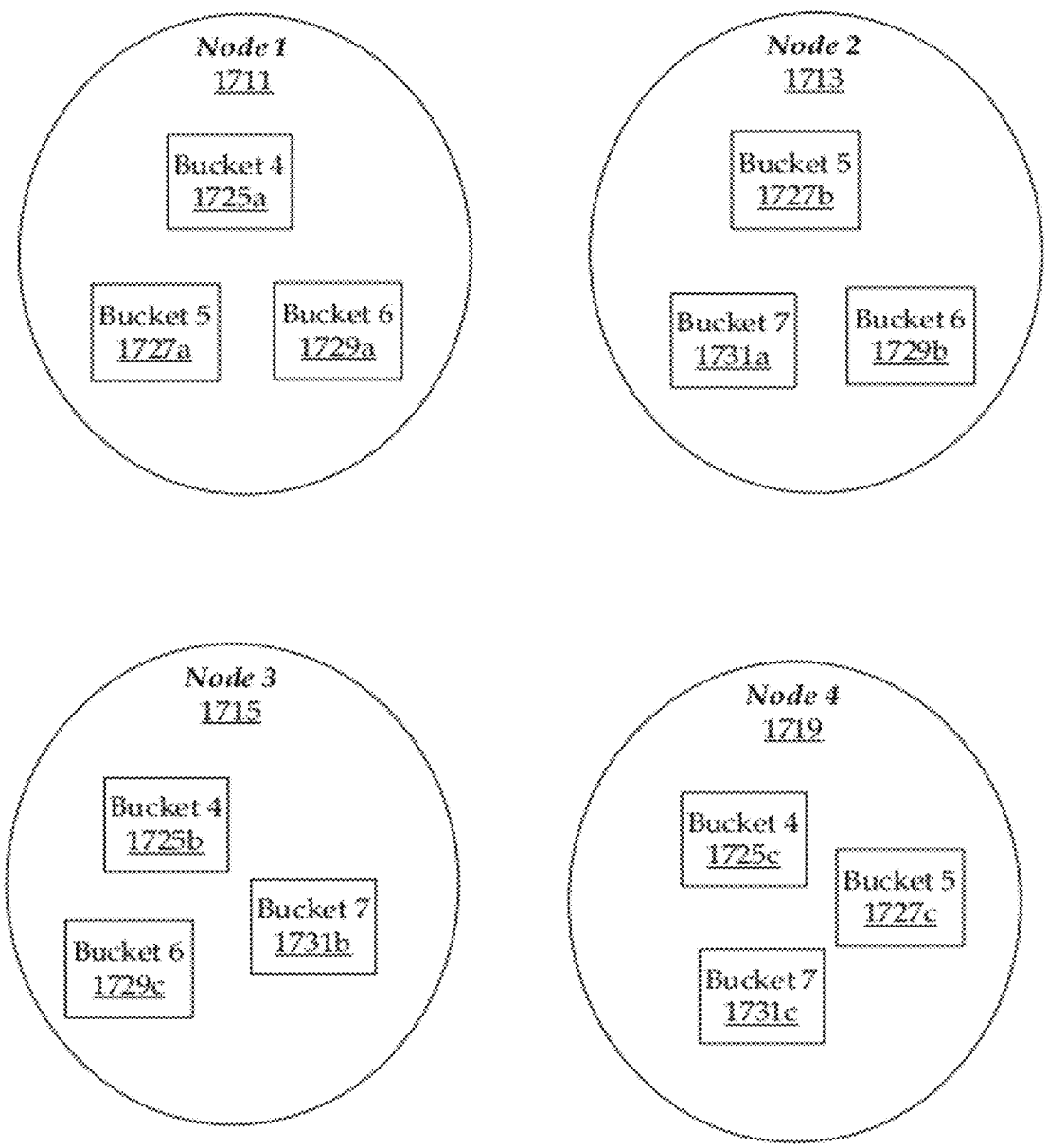
FIG. 17B is a block diagram of a localized subset of a map in accordance with some embodiments.

FIG. 17B shows a localized management of a subset of the map at nodes 1711-1719 in a distributed system 1701 according to some embodiments. A consistent first replica of a set of replicas subset of the map is desired such that each node 1711-1719 may identify a subset of its local buckets. The total set of such first replica identified buckets forms complete coverage of the map—each bucket will occur once and only once.

This is achieved for each three replicas of buckets 1725-1731, identifying the nodes 1711-1719 the bucket resides. In a three replica system, the first replica map at each node 1711-1719 will on average include one-third of the buckets. The three buckets are consistently ordered according to some sorting by IP address, hashes of the bucket numbers and so on. Thus, the first node Node 1 1711 is assigned the buckets 4-6 (1725*a*, 1727*a*, 1729*a*), the second node Node 2 1713 is assigned the buckets 5, 7, 6 (1727*b*, 1729*b*, 1731*a*) and so on, such that each node 1711-1719 is responsible for its own set of buckets.

This configuration allows for a single replica subset of data on each node 1711-1719 to be locally available on disk, and does not need to be fetched over the network. Furthermore, if the server map changes, only some of the subsets of buckets will change. Some nodes 1711-1719 will no longer be responsible for some buckets they were previously in charge of due to reassignment. Some nodes 1711-1719 will have responsibility for new replica buckets. However, the "churn" within the overall database system is minimized—many nodes will not have any changes (either first replica bucket additions or deletions) occurring to them. This localized management system is in contrast to partition ranges, where a host addition or exit causes all of the nodes 1702, 1710, 1720 in the cluster to have to adjust the rows they are responsible for. There are other first replica maps possible. Hashing and sorting are used so each node 1711-1719 may locally determine the total first replica map of a set of bucket replicas in such a way that if everyone does this process, they all arrive at the same first replica map without needing to talk to each other.

Several algorithms have been explored for distributing the buckets in a first replica subset map given an existing three-replica map. One algorithm attempts to make the number of first replica buckets as even as possible across all the hosts. Such an algorithm has the benefit of load-balancing the work evenly across the hosts. This algorithm could also be updated to make the distribution as even as possible with respect to a weighted hostlist, with the weights representing e.g. the relative CPU power or disk bandwidth of the hosts, or the amount of memory in the hosts.

Another algorithm considered distributes the first replica buckets so that the minimum number of first replica buckets need to be moved when the three-replica map changes due to a host or disk addition or failure. Yet another algorithm considered attempts to give good load balancing while simultaneously keeping the number of first replica bucket copies to a low number when the three-replica map changes.

In order to be able to successfully copy combinators without losing information, both the ability to get the "raw data" of a combinator and the normal value of the combinator are provided. In the case of a logcount combinator, the "raw data" is the 16 bytes, while the "normal value" is the integer approximate count.

The comb_bloom combinator is used to efficiently compute Bloom Filters. For example, a 1024-bit bloom filter b1 is combined with another same-size bloom filter b2 by "or"-ing the bits. In a search engine context, comb_bloom can be used to determine if an URL might have been crawled before.

The comb_avg combinator stores the average of the numbers sent into it. comb_avg_weight compute the weighted average of the numbers sent into it. In a search engine context, comb_avg could be used in a mapjob to sum a column of a table, such as the average rank of all webpages known to the search engine.

The comb_eavg combinator stores an exponentially-decaying average, where adding a new value multiples the old value by (1-decay_rate). For example, if the decay rate is 0.5, sending in the value 1 10 times in a row results in a value of $1+\frac{1}{2}+\frac{1}{4}+ \ldots +\frac{1}{1024}=2047/1024$.

The comb_escore combinator is an exponential decay in time. Each value is sent in with a time, and the old value is decayed as necessary. For example, if the decay rate is 0.5, and the new value is 10 seconds newer than the old value, the old value will be divided by 1024 before being added to the new value.

Comb_index

Comb_index is a special form of TopN used for the list of webpages that are good for a each search term or bi-gram. The "rank" is the quality of the match, or the date. The "key" is data compressed using the compression scheme below, including the URL of the webpage, and facet and other information used to quickly evaluate if an URL matches an operator. It is important for the size of this compressed data to be small enough to fit long lists of webpages for every possible search term into ram or flash disk or other fast storage devices.

In a search application, several separate comb_index combinators are kept for each word or bi-gram indexed. For example, for the word 'Lindahl', there is one comb_index ranked by rank with the highest quality webpages for 'Lindahl'. There is also one comb_index ranked by chrondate, containing the most recent chrondate-containing webpages for 'Lindahl'. Answering the query "Lindahl" consults the first comb_index; answering the query "Lindahl /date" consults both. For the date-sorted query, the second combinator contains the most recent webpages for Lindahl without regard to quality, and the first combinator adds in older but highly-ranked webpages for Lindahl. A 3rd comb_index stores the most recent webpages with 'Lindahl' in the anchortext, title, or URL; this is a higher-quality subset of all the pages mentioning Lindahl, and will go back farther than time than the list of all pages mentioning Lindahl.

There are also comb_index combinators for the most important operators. As an example, the 'gov:obama' comb_index contains the most important webpages for Obama matching the /gov facet. And there is a plain 'gov:' comb_index used to answer a plain "/gov" query. Some of these operator comb_index combinators use chrondates as the rank.

To get more parallelism into answering queries, each comb_index can instead be represented by N comb_index combinators, known as "slices". For example, instead of having only an 'obama' comb_index, there would be 8 comb_indexes named '0:obama', '1:obama', . . . , '7:obama'. The parallel benefit comes when these sliced comb_index combinators are fetched with get( ): N bucket daemons or N ram daemons are used instead of only 1.

In some embodiments, the comb_index combinator contains an additional "tail" of even more highly compressed data. For example, if the full compressed data for each webpage is 32 bytes, and the tail data is only 4 bytes, some information about 9 times as many webpages can be stored in only 2 times the size. However, 4 bytes is so small that it cannot uniquely identify the URL, or store rank or facet information. Instead, these 4 byte quantities are picked to be 4 bytes out of the 8 byte hashed value of the URL. These 4 bytes can't be mapped directly to the URL, but, if the same URL exists in the "head" of another comb_index being consulted in the query, it is likely that a matching 4 bytes is referring to the same webpage.

For example, consider the query "Greg Lindahl". Greg is a common first name and Lindahl is a rare last name. Assume that there isn't a comb_index combinator for the bi-gram "Greg Lindahl". To answer the query, fetch the comb_index combinators for "Greg" and "Lindahl". Assume further that the URL for Greg Lindahl's homepage (GLHP) is in the head of "Lindahl" and the tail of "Greg". When intersecting these two lists to find pages mentioning both "Greg" and "Lindahl", we note that the 4 byte quantity for GLHP in the tail of "Greg" happens to match the 4 bytes from the hashed URL of GLHP in the head of "Lindahl". Then we can guess that GLHP contains both words "Greg" and "Lindahl". The facets for GLHP are found from the head entry in "Lindahl"; we do not know the rank of GLHP for the word "Greg", but we store the average rank of the webpages in the tail of "Greg", and can use that as an approximation.

The benefit of "tails" for multi-word and many-word queries is actually even greater than getting 9× data into 2× the space, because of combinatorial effects.

Comb_TopN

A TopN variant comb_TopN uses logcount (or any other combinator) to replace the rank. For example, assume it is desired to compute the most important incoming link anchortext by uniquely counting the number of incoming links use a given anchortext, and remembering the top N of these. The input data for webpage http://skrenta.com/ would look something like:

Rich Skrenta: <logcount of URLs with this anchortext=about 10,000 unique incoming urls>

Richard Skrenta: <logcount of URLs with this anchortext=about 500 unique incoming urls>

First Virus Inventor: <logcount of URLs with this anchortext=about 2 unique incoming urls>

Because logcount data is small, it is cost-effective to do this for every webpage on the entire Internet. Also because logcount counts unique items, the webpages can be crawled repeatedly and these logcounts can be updated without double-counting anything.

F. Compression

Compression Method 1

The database described in this patent is the type of database known as 'schema-free'. Schema-free databases are extremely flexible, but can suffer from data size bloat because the names and types of the columns need to be somehow stored in each row. In contrast, a schema-based database only needs to store this information once for an entire table. Also, a schema-based database that knows that a given column exists in every row of a table can compress it: for example, a boolean variable can be represented by 1 bit. In a schema-free database, the usual implementation requires storing the name of the Boolean column, its type, and its value in every row of the database that it exists.

In order to compress a schema-free database as much as a schema-based database, we have built a special purpose compression engine which is driven by a versioned 'compression table' of column names and types. Any column name in the actual data which is found in the compression table can be compressed. Any column name which does not appear in the compression table can be stored as a (name, type, value) triple. The version number allows the compression table to evolve over time as the data evolves. The compression subroutine can use whatever version produces the smallest output. The decompression subroutine can use knowledge of all of the versions in the compression table to decompress anything generated by the compression subroutine.

As an example, consider this compression table:

COMPRESSION TABLE 1

| column name: | column type: |
|---|---|
| version 1 | |
| 'name' | short string |
| 'age' | small integer |
| version 2 | |
| 'first_name' | short string |
| 'last_name' | short string |
| 'age' | small integer |

Example 1 input:
name 'Greg Lindahl'
age 39

To compress input Example 1, the compression routine determines that using version 1 from the compression table will give the smallest output.

An example embodiment of the output would be:
compression table ID, 2 bytes, value 1
version, 2 bytes, value 1
first fixed column: 'name', short string
   length, 2 bytes, value 12
      value, 12 bytes, value 'Greg Lindahl'
second fixed column: 'age', small integer
   value, 2 bytes, value 39
count of additional columns, 2 bytes, value 0

The total length of this is 20 bytes. (The byte lengths chosen for these datatypes and the examples below are arbitrary and are given for illustration only.)

The reason for this small size is that the names and types of the columns ('name', 'age') are specified by the compression table ID and version, and don't have to be stored in the compressed output. The decompression subroutine would be able to consult its copy of the compression table to look for the fixed columns in the same order as emitted by the compression subroutine.

Example 2 input:
extra 'Blekko'
first_name 'Greg'
last_name 'Lindahl'
age 39

In the second example, the compression routine sees that the input will be best compressed by version 2, with one column 'extra' not present as a fixed column name.
compression table ID, 2 bytes, value 1
version, 2 bytes, value 2
first fixed column: 'first_name', short string
   length, 2 bytes, value 4
      value, 4 bytes, value 'Greg'
second fixed column: 'last_name', short string
   length, 2 bytes, value 7
      value, 7 bytes, value 'Lindahl'
third fixed column: 'age', small integer
   value, 2 bytes, value 39
count of additional columns, 2 bytes, 1
column name length, 2 bytes, value 5
column name value, 5 bytes, value 'extra'
column type, 2 bytes, short string
column value length, 2 bytes, value 6
column value value, 6 bytes, value 'Blekko'

The total size of this compressed structure is 40 bytes.

An example representation of an uncompressed storage embodiment for the same input data for Example 2 would have to record a (name, type, value) triple for each column present in each row:
count of triples, 2 bytes, value 4
column name length, 2 bytes, value 5
column name value, 5 bytes, value 'extra'
column type, 2 bytes, short string
   column value length, 2 bytes, value 6
column value data, 6 bytes, value 'Blekko'
column name length, 2 bytes, value 10
column name value, 10 bytes, value 'first_name'
column type, 2 bytes, short string
   column value length, 2 bytes, value 4
column value data, 4 bytes, value 'Greg'
column name length, 2 bytes, value 9
column name value, 9 bytes, value 'last_name'
column type, 2 bytes, short string
   column value length, 2 bytes, value 7
column value data, 7 bytes, value 'Lindahl'
column name length, 2 bytes, value 3
column name value, 3 bytes, value 'age'
column type, 2 bytes, short integer
column value, 2 bytes, value 39

This adds up to 70 bytes, and as you can see this is much larger than the Example 2 data compressed using compression table 1.

Compression Method 2

A drawback of Method 1 is that compression tables and versions must be consistently distributed to all potential decompressors of data, and there could potentially be an extremely large number of them in a big database with many database tables that evolve over time. As an alternative, a 'numbered short string table' could be used to compress some of the 'short strings' in the data. Since column names are short strings, this could be very effective using only a single table of numbered short strings to compress all of the database tables. Also, some of the column values might be short strings found in the numbered short string table, and thus would also be compressed.

As time passes, the database administrator or an automated system would be able to append new short strings to the numbered short string table as new short strings become common enough to benefit from compression. Strings cannot be removed or renumbered in the table unless it is known that no compressed data refers to these particular strings, as this would cause old compressed data to be destroyed.

An example embodiment of this technique on the input data from Example 2 above is given below. The fact that a given short string should be looked up in the numbered short string table is indicated by the high bit of the short string 2-byte length being set.

The Numbered Short String Table:

| | |
|---|---|
| 'Greg' | 1 |
| 'Lindahl' | 2 |
| 'Greg Lindahl' | 3 |
| 'name' | 4 |
| 'first_name' | 5 |
| 'last_name' | 6 |
| 'age' | 7 |
| 'Blekko' | 8 |

The representation of the compressed data:
count of triples, 2 bytes, value 4
column name length, 2 bytes, value 5 (high bit not set)
column name value, 5 bytes, 'extra'
column type, 2 bytes, short string
   column value length, 2 bytes, value 6+high bit set
column value data, 2 bytes, value 8, corresponding to 'Blekko'
column name length, 2 bytes, value 10+high bit set
column name value, 2 bytes, value 5, corresponding to 'first_name'
column type, 2 bytes, short string
   column value length, 2 bytes, value 4+high bit set
column value data, 2 bytes, value 1, corresponding to 'Greg'
column name length, 2 bytes, value 9+high bit set
column name value, 2 bytes, value 6, corresponding to 'last_name'
column type, 2 bytes, short string
   column value length, 2 bytes, value 7+high bit set
column value data, 2 bytes, value 2, corresponding to 'Lindahl'
column name length, 2 bytes, value 3+high bit set
column name value, 2 bytes, value 7, corresponding to 'age' column type, 2 bytes, short integer
column value, 2 bytes, value 39
This corresponds to a compressed length of 43 bytes.

Compressing Inside a Column

The above techniques can also be used to compress a structured column value. In the BlekkoDB, the contents of a column value can be generalized data structure such as a perl hash or python dictionary.

Generalization of Compression Methods

The compression examples above used a limited set of datatypes. In a more general system a Numbered Table for other datatypes such as Integers or Floating Point Numbers could be used. This would be useful in cases where an integer for floating point field had only a limited range of values, e.g. the number of telephone area codes found in the USA is less than 256, so a Numbered Integer Table could be used to represent them.

The compression examples above used the high bit of a sort string length field to signal that the data should be looked up in a Numbered Short String field. Another way to represent this would be to use a different type, a Numbered Short String type, to indicate the table lookup is needed. This is very useful for types which do not have an encoded length, such as integers.

G. Server System

FIG. 18 is a block diagram illustrating an embodiment of a server system 1800 according to embodiments. The server system 1800 may include at least one data processor or central processing unit (CPU) 1810, one or more optional user interfaces 1814, a communications or network interface 1820 for communicating with other computers, servers and/or clients, a memory 1822 and one or more signal lines 1812 for coupling these components to one another. The user interface 1814 may have a keyboard/mouse 1816 and/or a display 1818. The one or more signal lines 1812 may constitute one or more communications busses.

The memory 1822 may include high-speed random access memory and/or non-volatile memory, such as one or more magnetic disk storage devices. The memory 1822 may store an operating system 1832, such as LINUX, UNIX or WINDOWS, that includes procedures for handling basic system services and for performing hardware dependent tasks. The memory 1822 may also store communication procedures in a network communication module 1834. The communication procedures are used for communicating with clients, such as the clients 110 (FIG. 1), and with other servers and computers.

The memory 1822 may include a broadcast protocol 1836 for communicating with other servers and/or machines in a distributed database system. For example, the broadcast protocol 1836 may be relied upon to integrate a new node, such as node 416 in FIG. 4 to the database system. The broadcast protocol 1836 may also be relied upon for one server (node) or task daemon to communicate to other nodes or components of nodes to read, write, or update data locally stored on disk at various locations in the database system.

The memory 1822 may additionally include several applications for servers 1800 to participate in a distributed database community, such as swarm systems 100, 300, 500. Applications 1838 stored in memory 1822 include various task daemons 1840 to complete system tasks both locally and globally, cooperating with task daemons 1840 at other servers. Combinators 1842 and swarm algorithms 1850 described in preceding sections may be stored in the applications 1838. Also included are read/write operations 1844, 1846, which determine protocols for task daemons 1840 to fetch data and write data to rows, including operations such as get( ) set( ) and nextrow( ) requests. Applications 1838 may additionally include search functions 1852 and merge functions 1854 for storing, merging, searching and updating operations to manage data stored at the server system 1800.

Memory 1822 also includes data storage 1858 to store data accessed and managed by applications 1838 or applications at other servers and machines. Stored data includes data tables 1860 and transaction logs 1862 for storing and recording data being retrieved or accessed. Data storage 1858 includes maps 1864 for storing hash key and row locations (bucket partitions) of data stored on data tables 1860. Data storage 1858 also includes data for searching and logging data retrieved by search engines, such as crawl/tag indices 1870, operators library 1872, tag library 1874, and so on.

Memory 1822 also includes an additional cache 1878 for additional storage and applications/ data related to maintaining a visualization tool 1880.

FIG. 18 is intended more as a functional description of the various features which may be present in a distributed database system rather than as a structural schematic of the embodiments described herein. In practice, and as recognized by those of ordinary skill in the art, the functions of the server 1800 may be distributed over a large number of servers or computers, with various groups of the servers performing particular subsets of those functions. Items shown separately in FIG. 18 could be combined and some items could be separated. For example, some items shown separately in FIG. 18 could be implemented on single servers and single items could be implemented by one or more servers. The actual number of servers in a distributed database system and how features are allocated among them will vary from one implementation to another, and may depend in part on the amount of information stored by the system and/or the amount data traffic that the system must handle.

Figure 19:
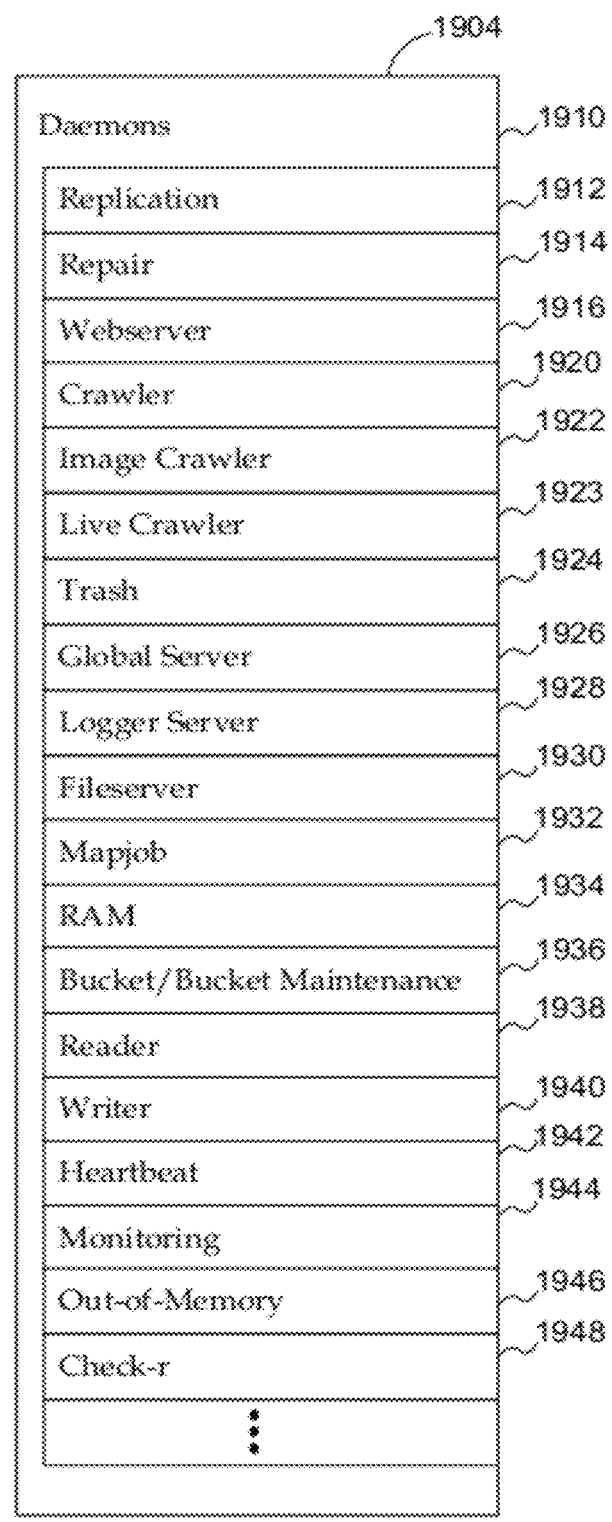
FIG. 19 is a collection of daemon tools in the server of FIG. 17 in accordance with some embodiments.

FIG. 19 represents a number of daemon applications 1904 that may be included, but is not limited to, in the server system 1800 of FIG. 18. Some daemon applications, such as replication 1912, repair 1914, trash 1924, mapjob 1932, bucket 1936, reader 1938 and writer 1940, are described in detail in other sections. The daemon application list additionally includes, but is not limited to the following:

Webserver 1916—a frames-based implementation of an http server.

Crawler 1920, Image Crawler 1922, Live Crawler 1923—frames-based servers that crawl webpages, images, and frequently-updated webpages, respectively.

Global Server 1926—used to store data which is replicated to every node of the cluster. This data can be read quickly because accessing it does not have to occur across the network.

Logger Server 1928—used to collect statistics about the database system and record them in the database.

Fileserver 1930—used to send files across the network, such as when the repair daemon copies a bucket to create a new bucket replica.

RAM daemon 1934—holds a subset of the database tables in memory for quick access.

Heartbeat daemon 1942—used to hold the mapping of buckets to nodes, and to exchange this map info with other nodes.

Monitoring system 1944—used to monitor the performance and availability of the database system.

Out-of-Memory (OOM) daemon 1946—monitors the memory usage of processes, and make decisions as to which processes should be disabled if the database system is low on memory. These decisions are made with the knowledge of how the distributed database system is organized, unlike a decision made by the Linux OOM system.

Check-r 1948—monitors the R-level (replication level) of the database system, and also announces the appearance and disappearance of nodes and disks in the system.

H. Client System

Figure 20:
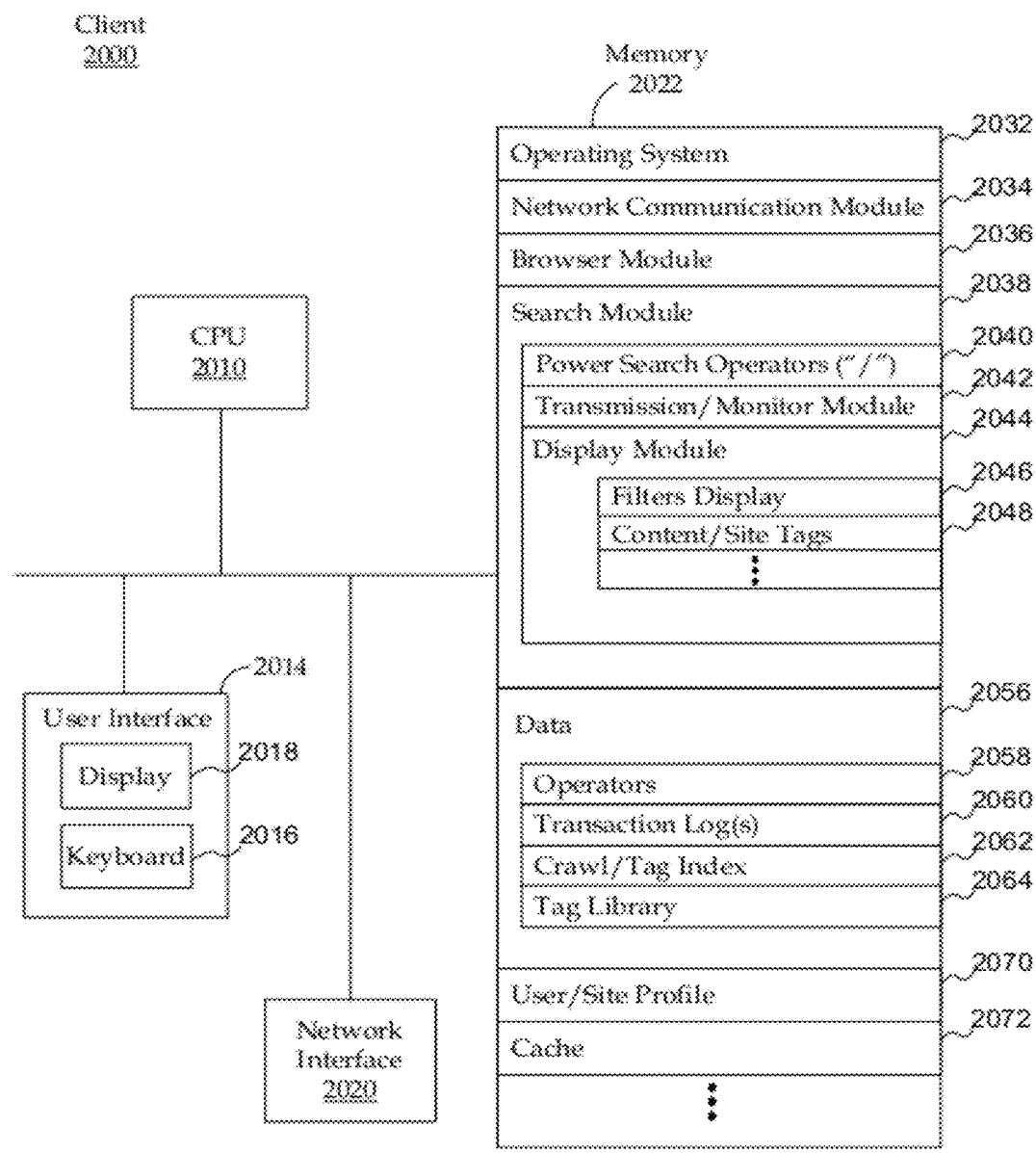
FIG. 20 is a block diagram of a client computer in accordance with some embodiments.

FIG. 20 illustrates a block diagram of an embodiment of a client system 2000, such as those used by the clients 110 (FIG. 1). The client system 2000 may include at least one data processor or central processing unit (CPU) 2010, one or more optional user interfaces 2014, a communications or network interface 2020 for communicating with other computers, servers and/or clients, a memory 2022 and one or more signal lines 2012 for coupling these components to one another. The user interface 2014 may have a keyboard/mouse 2016 and/or a display 2018. The one or more signal lines 2012 may constitute one or more communications busses.

The memory 2022 may include high-speed random access memory and/or non-volatile memory, such as one or more magnetic disk storage devices. The memory 2022 may store an operating system 2032, such as LINUX, UNIX or WINDOWS, that includes procedures for handling basic system services and for performing hardware dependent tasks. The memory 2022 may also store communication procedures in a network communication module 2034. The communication procedures are used for communicating with server(s) 1800 (FIG. 18).

The memory may also include the following elements, or a subset or superset of such elements: a browser or browser tool module 2036, the search assistant module 2038 and one or more user or content site profiles 2070. The profiles 2070 may be generated, much like a cookie, by the search assistant module 2038 by monitoring user activities or it may be generated remotely based on content of one or more URLs visited or associated with a user or content site. The search assistant module 2038 may include the following elements, or a subset or superset of such elements: a transmission/monitoring module 2042 for monitoring user input or for sending a search query, a search results receipt module (not shown) for receiving search results and a display module 2044 for displaying search results. The search module 2038 may additionally include instructions for operators ("/") 2040 and filters display 2046 for displaying selectable content/site tags 2048, displayed in either a listing or tabs. In embodiments where the client system 2000 is coupled to a local server computer, one or more of the modules and/or applications in the memory 2022 may be stored in a server computer at a different location than the user. Memory 2022 may additionally include a cache 2072 for additional storage.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 2022 or 1822 may store a subset of the modules and data structures identified above. For example, memory 2022 may store in a client data storage 2056, operators 2058, transaction logs 2060, crawl/tag index information 2062 accessed by the user, and tag library 2064. In other embodiments, all data stored in data storage 2056 may be stored in memory 1822 at the server 1800. Furthermore, memory 2022 or 1822 may store additional modules and data structures not described above.

I. Search Overview

One application of the swarm database system 350 is a search engine for answering queries made by users. Results are displayed with the result URL, content tags, site tags, and optionally a text snippet. Users may optionally specify operators, which are used to specialize the result beyond what is available using just keywords. The operators are wrapped in a specific syntax. Another interface to search results is one providing data of use in the Search Engine Optimization industry.

Combinators

The general-purpose combinators described with respect to FIG. 14A have a large number of applications in search and other fields. Not only are combinators 1408 versatile in reducing the number of transactions during operations such as write, but combinators 1408 may also be used to summarize data, particularly in the area of search. As will be described further below, combinators 1408 allow for data to be collected more efficiently and the summary information generated in real-time, while reducing the amount of I/O needed to generate the summaries.

TopN and Ranking

TopN 1424 is another combinator 1408 that may be used for ranking data items. Given a series of data items and ranks, TopN 1424 keeps the top N data items and ranks In some embodiments, TopN 1424 may be used for items examined in a Mapjob (this is common), or additionally, TopN 1424 may be used incrementally for items examined in a long-lived client, such as the crawler. The significance of "incremental" or "streaming" TopN 1424 is that it can be computed without having to run a MapReduce job and waiting a long time for the answer. TopN 1424 can also be computed on the fly, for example in the crawler while crawling the web.

The TopN 1424 operator can be used to keep a list of webpages that are the best answer for a given word. In this case the data item would be a webpage URL, and the rank would be importance of the word in the webpage. By keeping a separate TopN 1424 list for every word in the dictionary, we have a crude search engine index.

Logfile

Another example of combinators 1408 used in search and other fields is logfile analysis. Most big websites generate one line of text in a logfile for every web "hit", recording the time, which page was fetched, the IP address the request came from, and the success or failure of the transfer. These logfiles amount to gigabytes per webserver machine per day, and each day the website owner wants to know how many hits happened, how many failures were seen, and, e.g., what countries the requests came from. These summary items are usually generated by copying the logfiles from every webserver to a central machine, and running a daily batch job over all the data. Such a batch job can take most of a day to run, so the answer is not available until two days after the data is taken.

With combinators 1408 this data may be collected more efficiently and the summary information generated in real-time, while reducing the amount of I/O needed to generate the summaries. First off, the logfile data can be added to a table in the database using the append combinator 1428, which appends lines of text to an existing set of lines of text. Next, the webservers appending this data can also immediately use combinators 1408 to compute the summary information. For example, comb_add 1430 can be used to count the requests from every country, comb_add 1430 can be used to count the total hits, and so on. Since combinators combine their data, generating this information does not result in billions of transactions, but only millions.

Since all of this summarization is being done in real time, the summary answers are available with only a short time-lag of perhaps five minutes, not two days, after the logfile entries are appended.

Applying Combinators to Email Spam

Another use of combinators 1408 includes detecting email spam in real-time. One method of detecting spam is to compute a set of "signatures" based on the email headers and content, and checking to see if the same signatures are present in a large number of emails to a large number of people. The Logcount( ) combinator 1422 can be used to count how many recipients have received a given signature. When this count grows too large, the signature might be suspected to be spam. In addition, each signature can have a logcount of how many IP addresses have sent it. This can help determine if the spam is being sent through open relays (a high rate of sending through few IP addresses) or via a botnet (a lower rate of sending over a large number of IP addresses).

Query Serving

In search engines generally, the highest ranked pages for a given term are kept in a small head list, and a much longer list is called the deep list. Most simple queries can be answered by consulting only the head list, which is faster than consulting the deep list. A multi-term query is answered by intersecting lists for all of the query terms. Again, if intersecting the head lists provides enough answers, the results are provided faster than intersecting the deep lists. Search results stored in cache are used for common queries.

In addition to storing head and deep lists for every word in the dictionary, head and deep lists can be created for common pairs of words (e.g. 'iron chef'), and common phrases consisting of pairs of words joined by 'joiner words' such as "the" and "or." An example of such a phrase is "Jack the Ripper" or "William of Orange."

These head and deep lists could be represented by TopN combinators, with the rank being the rank of the webpage. For example the "Jack the Ripper" head and deep list would rank the webpages according to the rank of the term "Jack the Ripper" on these webpages.

Additional head and deep lists may also be ranked by different criteria, for example ordered by date from most recent to least recent. These alternate lists are used to answer queries such as "obama /date", where the operator /date specifies that the user wishes the answers to be ordered by date. The date used for this ordering is the "chrondate" facet, i.e. the date when a blog posting was made or a news article was published.

In addition to ranking based on the relevance or quality of a webpage or the date on a webapge, other query-depending rankings may be used invoked by some operators. The /local operator tries to return webpages for entities physically near to the query, for example "pizza /local" will return pizza restaurants close to the user's location.

Crawler Application

The crawler application monitors the system and suspends itself when the system seems to be behind on merging as shown by the "seek100" value, or the time that it takes a "write" to appear in the database, or other values. The crawler uses a large number of heuristics to determine which pages to crawl in the future. Since there are trillions of URLs on the web and only a few billion can be crawled, it is important to crawl only the most important URLs. When a URL in a link is first seen on a webpage, a row in a table is created, keyed by this new URL, containing a bunch of logcount combinators. The number of unique referring URLs and the number of unique geographic locations of referring URLs (determined using the GeoIP address of the referring domain is counted. The count is at several levels of geography, including countries, US states, and US cities), the number of unique class C IP networks (the first 24 bits of the 32-bit IP address) of referring domains, and unique anchortext of incoming links. By using logcount combinators for this data, a benefit is gained of not double-counting anything as URLs are repeatedly crawled. These counts are all done on-the-fly and can be used by the crawler to determine which URLs to crawl next.

In addition to these logcount combinators, TopN combinators are kept of things such as incoming links (ranked by incoming hostrank), and a TopN of incoming anchortext ranked by hostrank of the incoming link. A comb_TopN combinator may be used of incoming anchortext ranked by logcount of the referring URL.

In addition to the above quality data for individual URLs, similar data is also kept for every host on the Internet.

In addition to this data for URLs and hosts, other combinators are kept for other values. One example is an "adsense id". Webpages displaying Google ads have the advertiser id visible in the webpage source. A TopN of URLs and another TopN of hosts is used for every adsense id encountered. Later, if some webapges are penalized for having bogus content and lots of ads, then all of the pages from the same adsense id can be penalized. In the SEO pages, users of the search engine can be shown other webpages with the same adsense id as the webpage they are looking at.

Another example is 'fishy-cohosts'. For each IP address, a TopN of the domains that map to this IP address are maintained. If it is later determined that some of the domains are bad, the other hosts on the same IP address may be penalized for being in a bad neighborhood.

After the crawler crawls a webpage, it immediately runs several pieces of code (called 'classifiers') which determine if the page has various properties, which are called 'facets'. For example, in an attempt to determine the language(s) that a webpage uses (ex: English French, . . . ) a classifier for 'language' is executed to store the language facet. These facets may be used later in the ranking process, and also for "facet operators," which are operators used for particularizing a type of search query. Additional examples of facets include html elements such as the contents of <h1> tags, porn/not porn/unknown porn, chrondate, has video (embedded video), has audio (embedded audio), has (blog) comments (embedded blog), has images (embedded images), has a gallery of images, a personal webpage, a blog, news, a government webpage, a university webpage, a shopping webpage, song lyrics or poetry, a forum webpage, a review webpage, a webpage with positive/negative sentiment, a webpage leaning towards Liberal politics, a webpage leaning towards Conservative politics, and so on.

An example of one of the more sophisticated facets is the chrondate facet, used by the facet operator "/date" facet operator. Many webpages have dates on them, including webpages which display the current date and time. Incorrectly interpreting dates has caused stock market panics such as the recently incorrect announcement that United Airlines had gone bankrupt. Thus, our date facet classifier carefully considers factors such as the date on the page, a date embedded in the page URL (common for blogs), and a date in an RSS feed, irrespective of whether the page is the index page of a blog or the actual blog entry.

Another example is detection of a shopping webpage. Mere mention of a product is not a sufficient filter. In some case, a webpage is judged to be a shopping webpage if it has elements additional defining elements, such as the name of a product that can be purchased, a price, a shopping cart, and a "buy" button.

In addition to determining facets in real time as pages are crawled, facets can also be computed in a batch process such as a mapjob. This is useful if algorithms change and facets for already-crawled webpages need to be recomputed, or for facets whose values depend on looking at multiple webpages.

Frame Version—FSM

Frames are a different way of writing threaded code. Normally threads are implemented on a fairly low level, with operating system functions, or at a minimum with separate stacks for each process. However, threaded code is difficult to write, difficult to understand, and is often very inefficient.

An alternative to threads is using a set of finite state machines (FSM). Frames may be a more efficient means to express a set of finite state machines. As an example, consider a crawler. For a given URL, the crawler seeks the IP address of a webhost, checks a robots.txt, grabs the actual page, runs various classifiers against the returned data, and then updates various tables in the database with the crawled data. In a threaded implementation, one thread is utilized for each simultaneous page being crawled. These threads need a multi-threaded library to talk to the database, and calls would need asynchronous versions, all of which require complex coding.

With a FSM, the task of crawling may be divided up into N subtasks, each consisting of operations that can be done without blocking, e.g., the tasks up to issuing the request for the IP address. The next subtask would then take the results of the IP look-up and continue on until all the subtasks are completed. The FSM may be expressed as a single thread, and use a single-threaded library to access the database, but the coding for such tasks and subtasks are long and complex.

Frames are an efficient way to express an FSM. In a frame version of the FSM code, a pointer is positioned at the point where a block is needed until a result is returned. The pointer allows the process to return to the next subtask. The code to frames simplifies the traditional FSM. Frames are integrated with the swarm system 350, 500 so that, for example, if a subtask accomplished N get( ) operations and the next subtask wants these results, the frame system will not run the next subtask until the results from all N get( ) operations is available. This is similar to a traditional FSM, but the Frame+Swarm system tracks that N get( ) results are needed transparently to the programmer. Frame also allows a programmer to write regular code, and end up with multithreaded event-driven code.

In addition to the crawler, the webserver utilizes many frames. Normally a webserver (e.g. Apache or Microsoft ISS) either spawns a lot of threads, or processes, or both, to answer many requests. The use of frames allows the handling of high loads, in addition to making the many get( ) from the database easy to program. As an example where frames are useful is when the web server is receiving several streams of traffic, some of which quick answer are desired. For example, consider a website that gets hits from users, from RSS readers, and from crawlers. It is desirable to answer users more quickly than RSS readers and more quickly than crawlers. In the frames system, a priority to each class of access is assigned, and the frames system will pick the highest priority work to do at each opportunity.

Process IPC

Process IPC is done with a fairly traditional "active message" paradigm. A perl hash (equivalently, a Python dictionary) is converted to a linear series of bytes using cram( ) and on the far end, a routine is called (specified by an element in the hash) and given the uncrammed hash as an argument. Routines like cram( )/uncram( ) are often called things like "serializer/deserializer" routines or "argument marshaling" routines. Cram computes a weak checksum, which can be checked end-to-end to guard against corruption. (A stronger/more expensive checksum is used for data written to disk.)

J. User Interface Search

Overview

Figure 21:
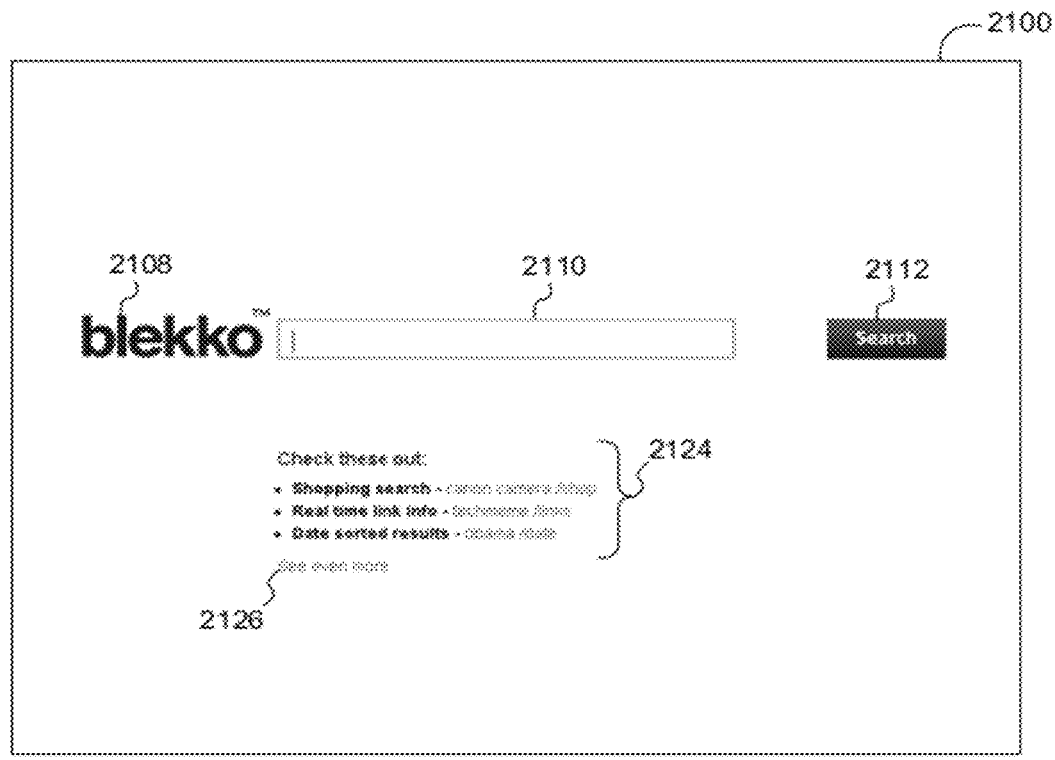
FIG. 21 is an example of a screen display of a search query box in accordance with some embodiments.

FIG. 21 is an example of a screen display 2100 of a search query box 2110 in accordance with some embodiments. The screen display 2100 illustrates an example of the display 2100 viewed by a user at a client, such as client 110 of FIG. 1. In some embodiments, the user enters key words, shortcuts, operators, and/or other search text and symbols, collectively known as "search terms," to conduct a search query. Once the user enters one or more search terms, the user selects (e.g., by clicking on) a search button 2112 to initiate a database search in, for example, any one of the distributed database systems described in previous sections (collectively referred to as "search database"). In some embodiments, a name, title, company logo, or any other markings, such as "Blekko™", may be displayed next to the query box 2110. In some embodiments, a list of commonly visited sites, subjects, categories, updates, newsflash or any other topics that may be of interest to a user or affiliated with the title 2108, may be displayed under "Check these out:" topics 2124. In some embodiments, the key words or search terms listed as topics 2124 is highlighted or in bold print, and a short description is provided next to the highlighted or bold text. In some embodiments, topics 2124 include a set of search terms to enter into query box 2110 to search the highlighted subjects or categories. In some embodiments, the user may select "See even more" option 2126 to view a list of operators, shortcuts and instructions for conducting effective searches in the search database.

Figure 22A:
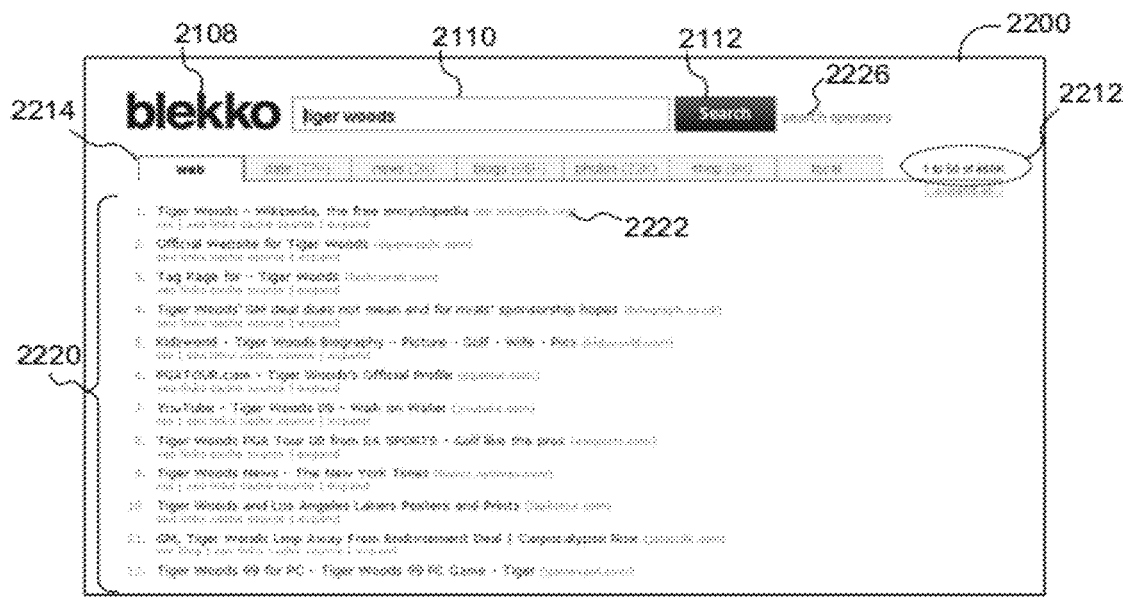
FIG. 22A is an example of a screen display of a search result in accordance with some embodiments.

FIG. 22A is an example of a screen display 2200 of a search result in accordance with some embodiments. In some embodiments, upon entering search terms into the query box 2110 and selecting the search button 2112, a list of search results 2220 is displayed in the screen display 2200. In some embodiments, a total number of items and the size of the search results 2212 is displayed. For example, in response to the search terms "tiger woods," twelve of 50 items is displayed in the list 2220. The size of the list 2220 is 460K. The number corresponding to each search result item in the list 2220 indicates where the respective search database ranked a particular site in the total list of items 2220. In some embodiments, the list 2220 is displayed on a web tab 2214, which is one of seven tab options on display 2200. Fewer than seven tab options may be utilized on display 2200, or alternatively more than seven tab options may be used. The web tab 2214 displays the list 2220 of the most relevant "web" topics from the internet and determined by the search database. The web tab 2214 and other tabs are described further in later sections. The search can be further refined or a new search can be entered in the query box 2110 from the display 2200. In some embodiments, additional operators may be selected to view a list of operators, shortcuts and instructions to conduct additional searches.

Figure 22B:
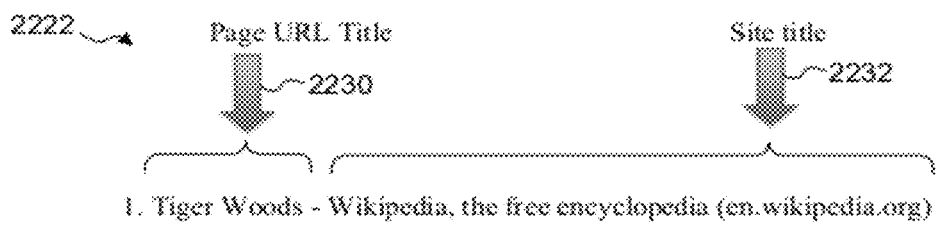
FIGS. 22B-22C are examples of a search result items listed in a search result in accordance with some embodiments.

FIG. 22B is an example of a search result item 2222 from the listed search result items 2220 of FIG. 22A in accordance with some embodiments. In some embodiments, the search result item 2222 is presented differently than standard search engines. Results in the list 2220, such as result item 2222, follow a two-line format. In some embodiments, the first line is dedicated to a Page URL title 2230 of the result item 2222 and a name of the web site 2232. For example, the first line of the first result item 2222 for the search "Tiger Woods" includes the Page URL title 2230 "Tiger Woods" and the web site title 2232 "Wikipedia, the free encyclopedia." The Page URL title 2230 is a hyperlink to the page URL, and the site title 2232 is a hyperlink to the top level site URL. In some embodiments, the second line of each search result item 2222 contains three distinct elements: content tags, site tags and optional snippets.

Figure 22C:
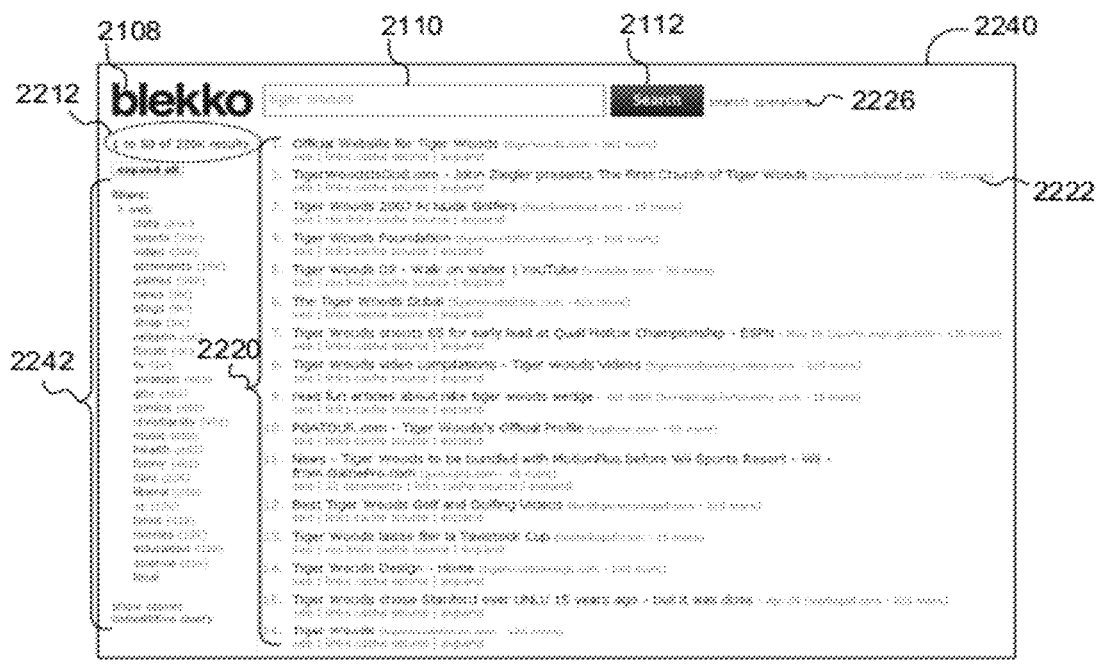

FIG. 22C is another embodiment for displaying search result 2240 based on a search query. In some embodiments, the tab features 2214 of FIG. 22A are not used, and instead are replaced by a selectable filter list 2242 of content tags relevant to various categories for organizing the search result 2240. In this instance, the search result for "tiger woods" displays a list of content tags (described in the next section) that include hits and locations related to the topic of "tiger woods." The filter list 2242 is a dynamically generated list of content tags based on the entered search query in box 2110 for organizing the resulting search into various optional categories. For some search queries, the filter list 2242 may be a smaller list or a larger list depending on the number of sites and categories of sites related to the query. Each item in the filter list 2242 displays in parentheses the number of sites associated with that content tag item. When a user selects a content tag in the filter list 2242, the browser displays the list of items for that content tag. In some embodiments, the list of items is displayed or ranked in order of relevance for that sub-group of items.

Content Tags

Content tags are designed to give users an insight into the type of content that a particular search result 2222 contains. The list of content tags which the search results (items derived from a search query) may be organized include, but is not limited to, the following:

News—result site is determined by the database to be a news source

Blog—result site is determined by the database to be a blog

RSS—result site has an RSS feed

Comments—result site has user generated commentary as part of its content

Audio—result site either plays music or has audio capabilities

Video—result site either plays a video or has video capabilities

Shop—result site has ecommerce capability (shows price if available too)

Photos—result site contains images

Adult—result site is determined to be pornographic

Local—a physical location of a result site is known

Hate—the result site contains hate speech

Content tags may be any subject of interest to a user, may be generalized for all users or a category of users, or may be customized for a specific group of users, and may include topics from technical or popular sources. Additional content tags from popular sources or specialized sources include, but is not limited to, the following:

| adult | catholicism | fitness | liberal | perl | scrapbooking |
|---|---|---|---|---|---|
| afam | chemistry | food | linux | pets | sports |
| altmed | christianity | funny | lyrics | photography | taoism |
| astronomy | comics | games | math | physics | tickets |
| aviation | conservative | gov | money | poker | torrent |
| biology | crafts | health | movies | psychology | travel |
| biotech | design | hinduism | music | religion | tv |
| buddhism | dogs | islam | paganism | science | vc |
| cars | education | judaism | people | scientology | wiccan |

Content tags may be displayed as a tab item 2214, as shown in FIG. 22A, or as list of tags, such as the filter list 2242 of FIG. 22C. When the user selects a content tag 2242, the search result list 2220 is redisplayed such that only the items 2222 related to the selected content tag 2242 are displayed. The redisplayed list 2220 is displayed according to the respective search database rank, (e.g., by relevance). Each content tag 2242 may be listed with additional information specific to each tag. For example, the size of the list associated with the respective content tag 2242 may also be displayed, such as shown in parentheses. In some embodiments, the filter list 2242 may be organized according to major content tags 2242, such as "web" and list subcategories of content tags 2242, such as date, sport, video, and so on.

In some embodiments, returning to the search result "tiger woods" in query box 2110 and the general list of search result items 2220, if a user selected a filter item 2242 labeled "movies", a list of search result items 2220 for "tiger woods" relating to "movies" (e.g., movies about Tiger Woods, referencing Tiger Woods, and so on) would be displayed in display 2240. If the user selects a filter item "aviation", the display 2240 would show a list of search result items 2220 for "tiger woods" relating to aviation topics, and so on. In some embodiments, the search result list 2220 in response to a selected filter item is a sub-group of search result items from the a general list of items for the search query, such as "tiger woods." In some embodiments, the search result list 2220 is a new search result based on the user-entered query term and one or more terms associated with the selected filter item from the filter list 2242.

Site Tags

The second line of every search results, such as result item 2222, contains a second set of tags call "site tags". Site tags, when selected, present to the user information about the result site itself. The following includes, but is not limited, the list of site tags 2302, 2404:

links—displays pages that link to the result site seo—displays a host of search engine optimization data for the result site rss—displays updates or changes to content of a website cache—displays cached version of the result site according to the search database source—displays the source document for the result site ip—displays the ip address of the result site and other sites hosted on that same address rank—displays a list of the rank of each result for the query according to the search database hostrank—re-ranks the results for the query the rank of the host, not the page operators—organizes query results according to categories (described in detail in later sections)

Figure 23:
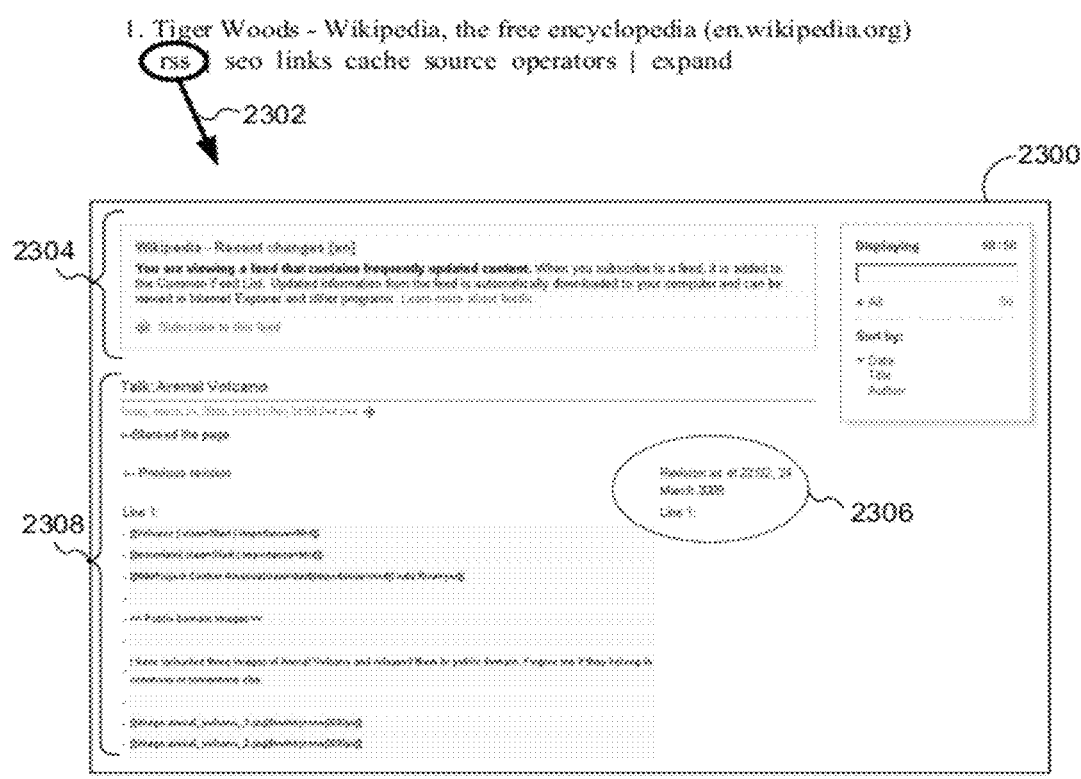
FIG. 23 is an example of a screen display of an RSS page for a search result in accordance with some embodiments.

FIG. 23 is an example of a screen display 2300 showing one of the content tags, an rss tag 2302, for a search result 2222. For example, when a user selects the rss tag 2302 in the second line of results item 2222, the rss feed page is shown in display 2300. The rss feed page may include a brief summary of the rss feed 2304 and instructions for joining the particular rss feed. Users may obtain updates on the particular search result item 2222 or view recent changes to content 2308 on the result item 2222 page. The rss feed may additionally include the latest update by date 2306. When other content tags are available for the particular search result 2222, other tags are listed in the same section as the rss tag 2302.

Figure 24A:
FIGS. 24A-24B are examples of a screen display of a LINKS page for a search result in accordance with some embodiments.

FIG. 24A is an example of a screen display 2400 of a selected LINKS tag 2402 for the search result 2222 in accordance with some embodiments. For the result item 2222 from a search of "tiger woods," four site tags are displayed seo, links, cache, and source. When he LINKS tag is selected, a list of pages 2408 that link to the search result item 2222 is displayed. In some embodiments, the link is displayed according to rank computations by the search database.

Figure 24B:
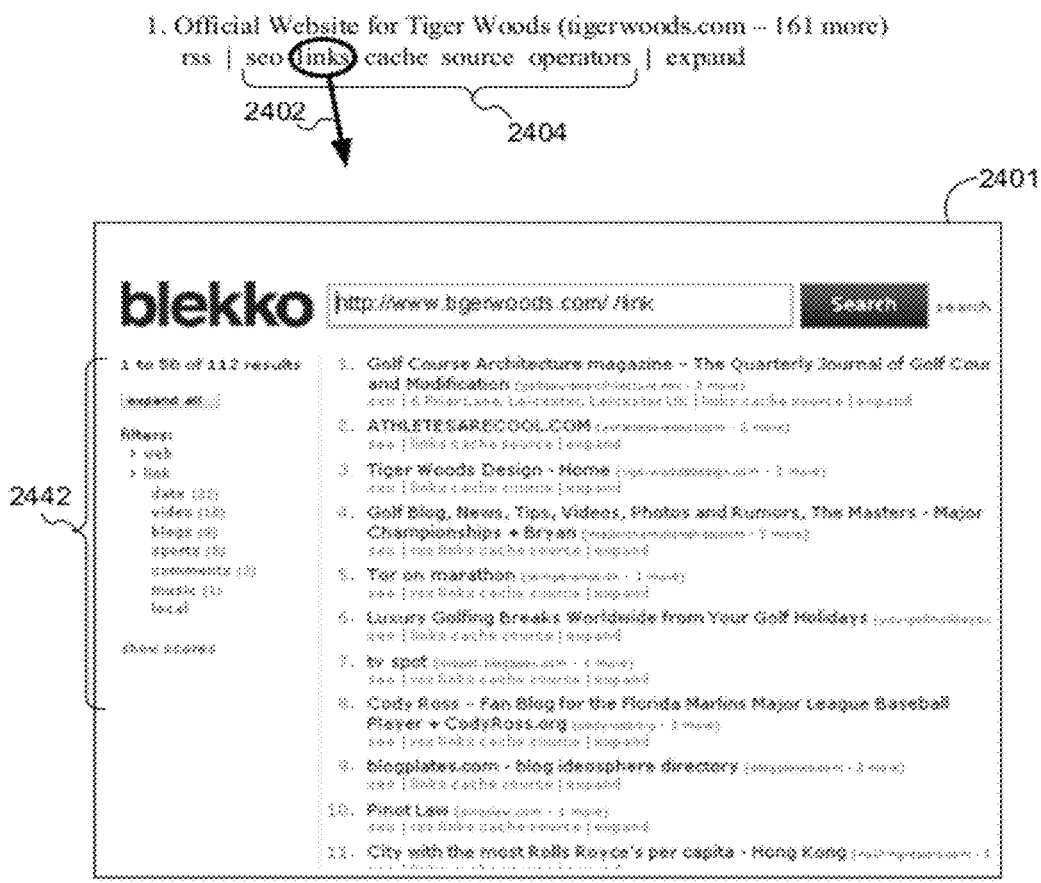

FIG. 24B shows an alternate embodiment for displaying a search browser 2401 according to other embodiments. As previously described, the content tags that are displayed as tabs in FIG. 24A are now displayed as a list of tags 2442. When a user selects the "links" site tag, the browser 2401 displays a list of items from the search result that are associated with "links" and the displayed result includes additional content tags in list 2442. In some embodiments, additional content tags within the category of "link" may be selected to refine or adjust the search result list to items relating to the selected content tag or tags.

The "operators" site tag is used to display and edit which operators include this URL: list operators, facet operators, and so on. The list of list operators can be edited by the user to suggest adding a new or deleting an existing operator.

Figure 25:
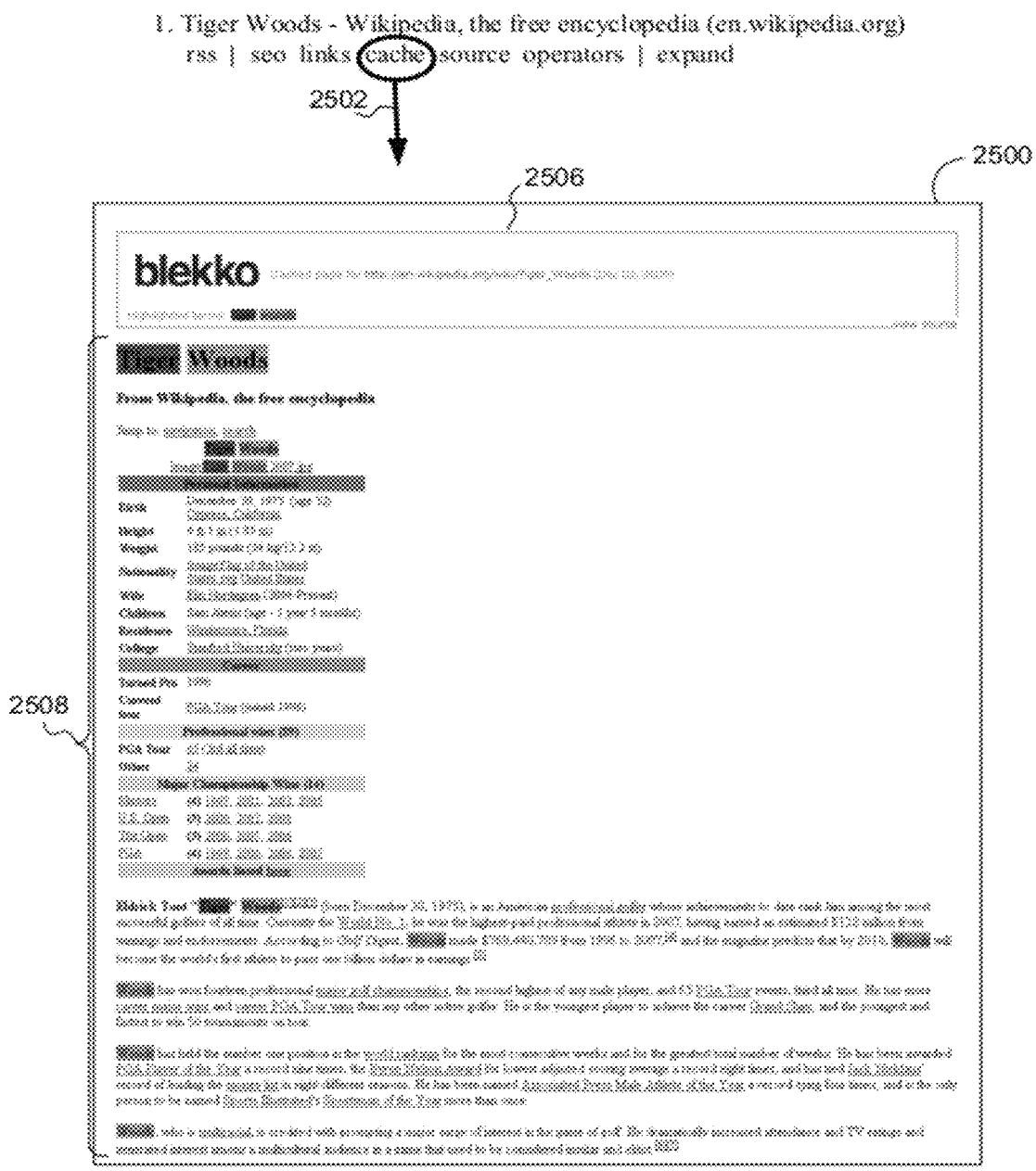
FIG. 25 is an example of a screen display of a CACHE page for a search result in accordance with some embodiments.

FIG. 25 is an example of a screen display 2500 of a selected CACHE tag 2502 for the search result 2222 in accordance with some embodiments. The cached page for the search result 2222 includes the URL 2506 for the search result item 2222 and the search terms highlighted in the content 2508 of the displayed cached web page. The URL 2506 also includes the date of the cached page. The content 2508 shows data that was previously posted for the URL site 2506 on Dec. 2, 2008.

Figure 26:
FIG. 26 is an example of a screen display of a SOURCE page for a search result in accordance with some embodiments.

FIG. 26 is an example of a screen display 2600 of a selected SOURCE tag 2602 for the search result 2222 in accordance with some embodiments. Thus the source code 2608 is provided for the search result item 2222.

The content tags and site tags, expands the user to addition information that is not typically available in other database systems. The user has access, with a click of a mouse, to detailed information, that includes not only content for search terms, but also information about respective web pages and other technical information. Users determine which content or site tags to display by configuring their preferences (located at the top of every page, not shown).

Optional Snippets

Figure 27:
FIG. 27 is an example of a screen display of an expanded search result list in accordance with some embodiments.

In some embodiments, the search result browser compresses the display of its search results into two lines by not displaying snippets of each item in the results list 2220. Snippets are the portion of the result site page 2222 that contain the query term originally entered. In some embodiments, snippets are not omitted from the search results 2220. FIG. 27 is an example of a screen display 2700 showing the result site page 2222 in expanded form that includes a corresponding snippet portion 2704 in accordance with some embodiments. The second line of each result site page 2222 includes an expand link 2702 which, when selected, displays (a) the snippet 2704 for that particular result site 2222, and (b) a page URL 2706 for that particular result site 2222. In some embodiments, once the expand link 2702 is clicked, the expand 2702 is changed to read "collapse" (not shown). If a user clicks on the collapse link, the snippet 2704 and page URL 2706 for that particular result site 2222 is hidden, and the display of the results site 2222 return to the two line display. It will be appreciated, that another embodiment of the display 2700 may not include a row of content tabs, but instead a list of content tags, such as shown in FIGS. 22C and 24B.

In some embodiments, the user may expand or collapse a single result site 2222 in a list of results 2708. In other embodiments, the entire results list 2708 may be expanded when the user selects an "Expand All" button 2710 on the top right corner of the searched display 2700. The Expand All button 2710, when selected, displays for all the results in the displayed result list 2708 (a) their snippets (not shown) and (b) their respective page URLs (not shown). Once clicked, the Expand All button 2710 is changed to read "Collapse All" (not shown). If the user clicks on the Collapse All button, the snippet and page URLs for each of the sites in the results list 2708 are hidden, and all of the sites in the results list 2708 is returned to the two-line display.

SEO Information

Figure 28:
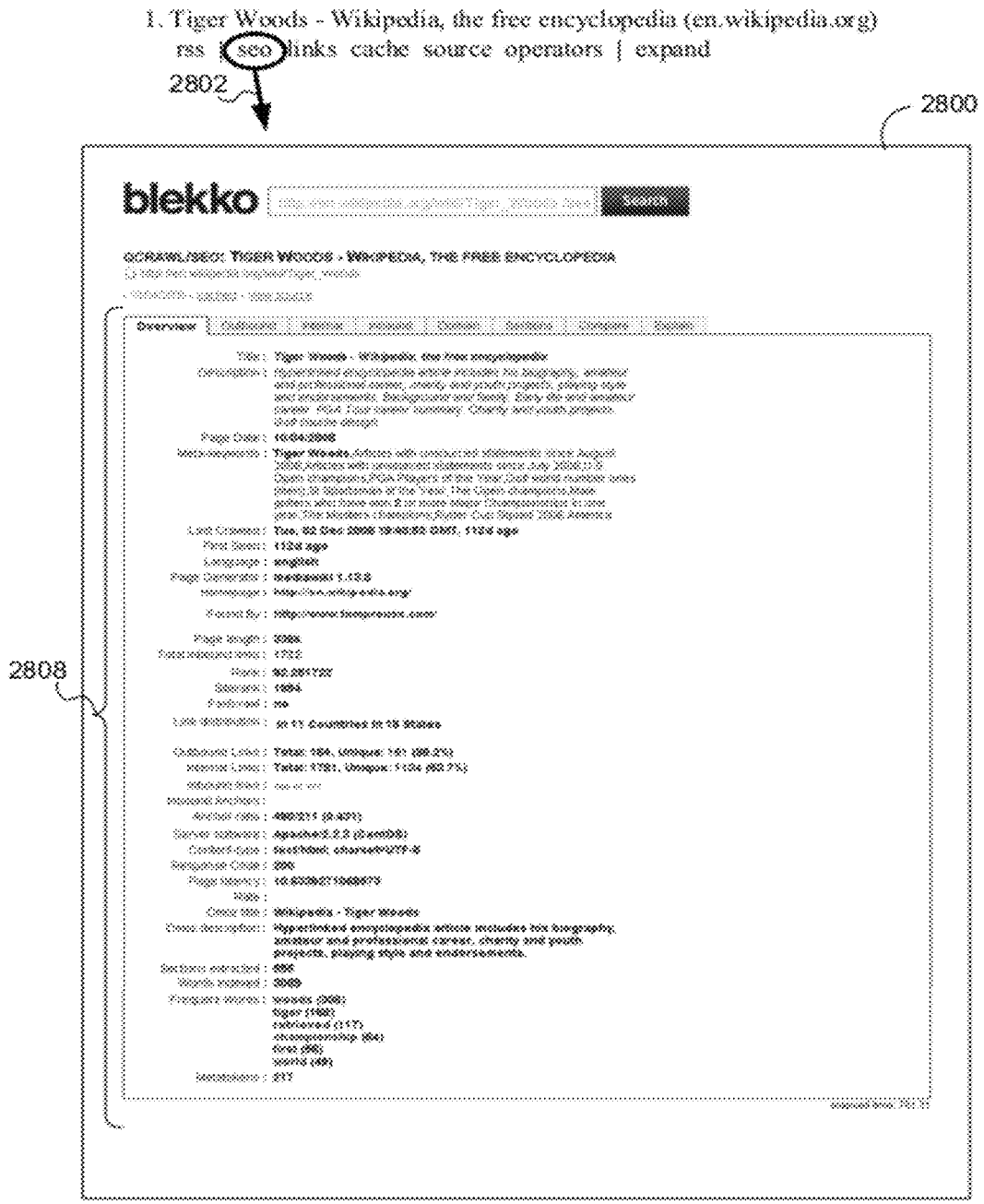
FIG. 28 is an example of a screen display of an SEO page for a search result in accordance with some embodiments.

FIG. 28 is an example of a screen display 2800 of a selected SEO tag 2802 for a search result 2222 in accordance with some embodiments. One of the site tags for search results 2220 includes the SEO tag 2802. As described above, when a user selects one of the site tags 2402, such as the SEO tag 2802, information about the resulting site 2222 itself is provided. For example, SEO information is displayed when the user selects the SEO tag 2802. SEO information includes a wealth of information about the way the distributed database (e.g., search engine) sees that result site page 2222, including various technical information about that page. There are 4 main sections of the SEO page in display 2800: an overview 2810, links 2812, domain 2814, and sections 2816.

The overview tab/page 2810 in the displayed SEO page 2800 provides an overview for the result page in question. The overview tab 2810 is the default tab on the SEO page 2800, and shows various information collected about the results site page 222 (e.g., including, but not limited to, title, description, language, CMS (Content Management System, for example, WordPress or Drupal), last crawl date, page length, the total inbound links, rank of the page, physical location of the IP's of the pages inbound links, and so on.) The SEO information is supported by a variety of graphs and tables.

Three tabs on the SEO page 2800 that relate to links 2812 include inbound, outbound and internal link information. Each of these tabs provide detailed information about the type and nature of links related to the result site page 2222. The inbound links tab displays all the pages in the crawl that link to that particular result site page 2222, including, but not limited to, anchor text (if any) associated with those links, source IP of those links, database rank of the sites, other pages linked to the result site page 2222, and so on.

The outbound links tab/page on the SEO page 2800 provides similar information about the links that are generated by that particular page to third party URLs and/or hosts. The internal links on the SEO page 2800 provide similar information about links that are generated by that particular result site page 2222 to URLs within the same host. For each of these links tabs 2812, the provided information is supported by a variety of graphs and tables.

The domain tab/page 2814 on the SEO page 2800 is similar to the Overview page 2810, except that instead of providing information for a particular page URL, the domain page 2814 gives that same information for the entire domain. As with the other tabs 2810, 2812, the information on the domain page 2814 is supported by a variety of graphs and tables.

The sections tab/page 2816 on the SEO page 2800 provides information about how the crawler (not shown) parses information on the particular result site page 2222. The information collected and whether or not such information is used to assign a rank to that page 2222 and/or other related pages is displayed the sections page 2816. The sections page 2816 is color coded so that the red colored sections are sections of the page that were exclude or ignored by the database, and the green colored sections are sections that were considered or included. The information on the sections page 2816 is supported by a variety of graphs and tables.

It will be appreciated, that the content organized by tabs may also be organized by a list of content items, such as filter lists shown in previous embodiments.

Operators—Overview

User interaction with search engines typically begins with a user generated query submitted to the engine via a query input box, which is then answered by the display of a set of results. Quite often, the user is looking for something other than the results they are shown, so the user refines his or her query so as to produce a new set of results. This back and forth continues until the correct set of results (from the user's perspective) is achieved.

Currently the only tools provided to users to help in this process are the keywords the user concocts. The distributed database described in previous sections provide more comprehensive search results, one that allows users to select from a wealth of information that includes content-specific information and technical information about the source of content. The organizational structure of the swarm architecture provides powerful search tools to allow users to find the results they are looking for at higher speeds.

FIGS. 29A-29B and 30A-30B are examples of screen displays 2900, 3000 of result site page 2222 in accordance with some other embodiments. FIGS. 29A-29B and 30A-30B include operators 2960, 3060, which are used to expand the search experience beyond keyword searches. The operators 2960, 3060 themselves are wrapped into a specific syntax recognized by the database structures previously described, and any other database systems configured to use operators 2960, 3060. In some embodiments, a user appends any query with the "/" character and then the selected operator 2960, 3060. For example, if the user is interests in only news articles for the query "Tiger Woods" as indicated in a query box 2910, the submitted search query is "Tiger Woods /news." The operator 2960 for limiting the search to only news articles is "/news." If the user was interested in searching for just blog results, the user would submit "Tiger Woods /blogs," where the operator 3060 for limiting the search to only blogs is "/blogs." Many types and categories of operators, such as operators 2960, 3060 have been developed, and more continue to be developed. Below are several lists of currently available operators. However, it will be appreciated that more operators continue to be developed, and thus, operators are not limited by the lists provided below.

Figure 29A:
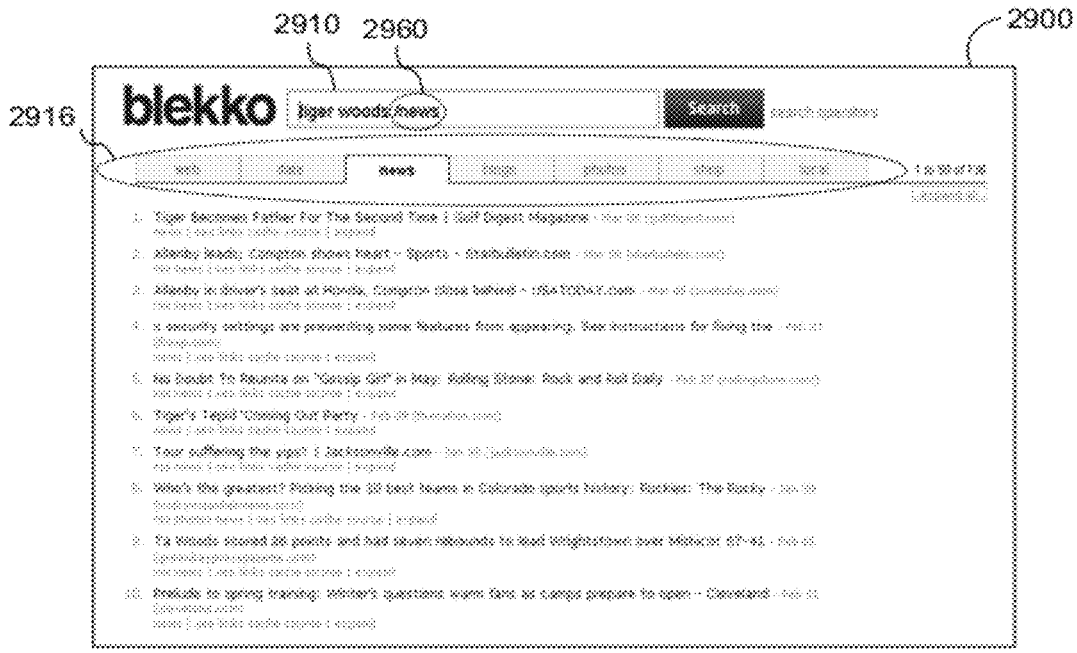
FIGS. 29A-29B are examples of a screen display of a search result in accordance with some other embodiments.
Figure 29B:
Figure 30A:
FIGS. 30A-30B are examples of a screen display of a search result in accordance with some other embodiments.
Figure 30B:
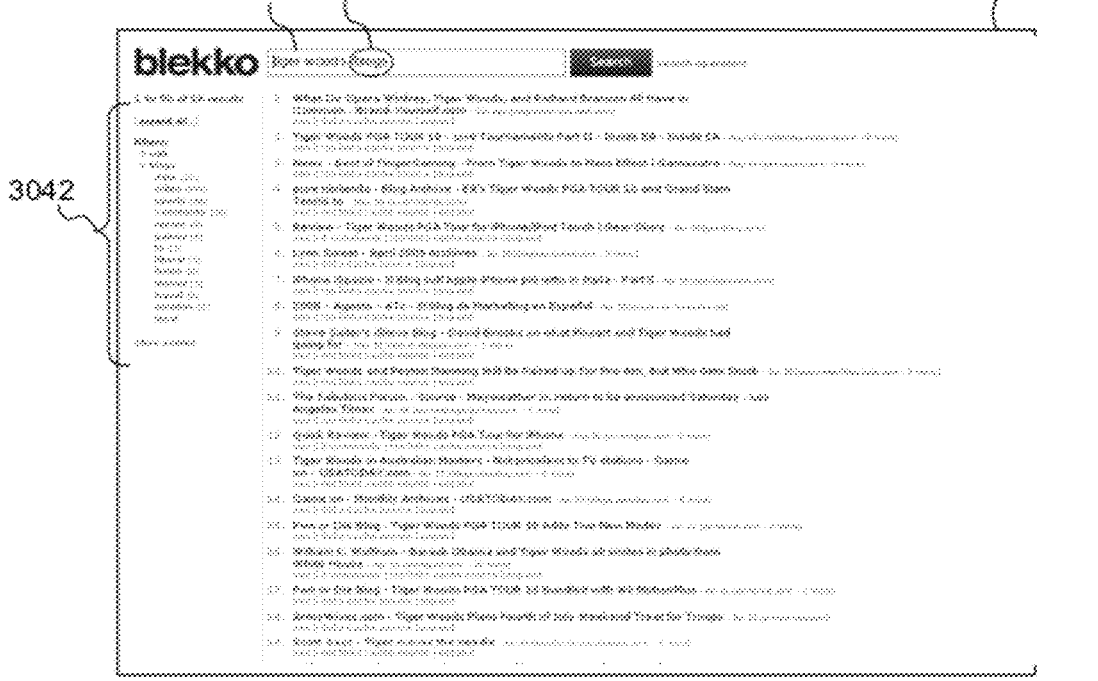

FIGS. 29A and 30A displays search results that organize content or operators, such as operator 2960, as operator tabs 2916, 3016. In some embodiments, the operators 2916, 3016 may include the same type of content or topic as content tags and content filters, or the subject matter may overlap with the content tags and content filters described in previous sections. In some embodiment, search results from queries that include operators 2960 are displayed and organized by content tag lists 2942, 3042 (or filter lists) as previously described. The content tag lists 2942, 3042 include the one or more topics indicated by the operator 2960 entered as part of the search query in query box 2910. In some embodiments, the content tag lists 2942, 3042 includes predetermined tags that are also common operators, such as operators 2916, 3016. In some embodiments, the content tag list 2942, 3042 includes a wider range of topics as described in previous sections.

Mainstream Operators

Mainstream operators. An initial handful of operators 2916, 3016 are selected as the most commonly used or mainstream operators. It will be appreciated that these common operators 2916, 3000 may be modified, revised or replaced with other common operators or common operators relevant to a particular database, group or organization. The commonly used operators are displayed as tabs on the top of every search engine result page, such as displayed in 2900, 3000. These tabs include:

Relevance—presents a list of results sorted by a determination of relevance. This is the default tab.

Date—presents a list of results sorted chronologically (newest to oldest). Particular data extracted from web pages is recorded, such as a date found on the web page. This becomes the "chrondate facet" value for that web page. The "date" tab is selected or the "/date"

modifier is used, results will be displayed ranked according to their chrondate.

News Sources—presents results from an editorially selected set of sources determined to be news sources (may be algorithmically determined).

Blog—presents results from an editorially selected set of sources determined to be blogs (may be algorithmically determined).

Photos—presents results from only pages that contain photos with the results sorted by, among other things, number and size of photos.

Shop—presents results from only pages that have e-commerce capability, sorted by relevance.

Local—presents results sorted by proximity to the users physical location (as submitted by the user or, if none, the user's physical IP location).

When any tab in the group of operators 2916, 3016 is selected, the original query is appended with the relevant operator syntax—e.g., if the "News" tab is selected after searching for "Tiger Woods", the query is automatically adjusted in the query box 2910 to read "Tiger Woods /news".

Often times these content tags correspond to operators. So for instance if a result includes the content tag "news", clicking on the "news" tag will commence a new search on the same query, but just for news results (and amend the original query with the /news operator).

Often times the site tags correspond to operators. So for instance if a user clicks on the site tag "links", the query is changed to (a) the URL for the result site where the links button was clicked and (b) appended with "/links".

In some embodiments, the operators are predefined for the database/search engine and users are not permitted to create operators. In some embodiments, the database allows for user input and users are enabled to create user-specified operators or set preferences to create, modify or delete predefined operators. In some embodiments, a combination of predefined operators and user-specified operators are utilized in the database.

Content Operators

In some embodiments, special query operators are utilized to limit searches to a particular topic. For example, "/traffic" provides traffic conditions for a specified location, and "/joke" displays a random joke. Other topics include, but is not limited to, the operators described in Table 1. In some embodiments, these special query operators provide a result in an answer from a different database, i.e. a /map query might be answered by displaying a map from Microsoft Maps, or a /define query might be answered by looking up the word in a particular dictionary source.

TABLE 1

| | | |
|---|---|---|
| /calendar | Search for a day on the calendar | Thanksgiving /calendar |
| /define | Look up a definition of a word | Awesome /define |
| /help | Navigates to this help page | /help |
| /joke | Shows a random joke | /joke |
| /map | Show a map of a particular place | San Francisco, Ca /map |
| /quote | Show the stock price for a particular trading symbol | BAC /quote |
| /randquery | Searches a random query | /randquery |
| /traffic | Show traffic conditions for a particular place | San Francisco, CA /traffic |
| /weather | Show the weather for a particular place | San Francisco /weather |

Facet Operators

In some embodiments, certain operators, facet operators, assist in particular types of searches, such as to limit search to anchor text only "/anchoronly", and searches for only to blog sites may be limited by including the operator "/blog." Some facet operators may imply a different ranking algorithm from the usual. For example, a /porn search might rank URLs according to the size and number of images on the page. This would bias the results to be free galleries of images instead of the entrance pages for pay porn websites. A comprehensive list of facet operators are shown, but is not limited to, the facet operators listed in Table 2.

TABLE 2

| Operator | Task | Example Query |
|---|---|---|
| /anchoronly | Limit search to anchor text only | Skrenta /anchor |
| /audio | Search only sites with audio capability | Polka /audio |
| /blogs | Search only blog sites | Izik /blogs |
| /bug | Files a bug report for a specific query | Bill dan /bug |
| /cluster = [n] | For a particular query, determines the number of results that will show up from any one site | Dell computers /cluster = 2 |
| /nocluster OR /cluster = 0 | Turns off clustering of results for queries | Engadget /nocluster OR Engadget /cluster = 0 |
| /comments | Search only sites that have commentary | Obama /comments |
| /date | Rank results by chronological order | Mike Arrington /date |
| /gov | Search only .gov sites | taxes /gov |
| /h1 | Search only the words contained in the primary heading (H1) of any site | Scoble /h1 |
| /hostrank | Rank results to a query by the overall rank of the host | Yahoo /hostrank |
| /local | Rank results by geographical proximity to user location | Gold earrings /local |
| /lyrics | Limit search to song lyrics | Penny lane /lyrics |
| /news | Search only news sites | Bank of America /news |
| /noporn OR /safe | Search only non-porn sites for a particular query (safe search) | Britney spears /noporn OR Britney spears /safe |
| /page = [n] | Takes you to the page [n] of results for a particular query | Britney spears /page = 3 |
| /page_size = [n] | Sets the number of results to be return for a particular query | Britney spears /page_size = 10 |

TABLE 2-continued

| Operator | Task | Example Query |
|---|---|---|
| /photos | Rank results by sites number of sites with photos | Madonna /photos |
| /porn | Search only porn sites for a particular query | Playboy /porn |
| /rank | Displays rank numbers of results to specific queries | iPod /rank |
| /relevance | Ranks results by relevance (default) | United nations /relevance |
| /rss | Product an RSS feed for a search result | Blekko /rss |
| /scores | Shows the scoring of results for a particular query | Pittsburgh Steelers /scores |
| /sort_inlinks | Rank results by the number of links pointing to a site | poodles /sort_inlinks |
| /shop | Search only those sites that have ecommerce functionality | Beef jerky /shop |
| /title | Search only the words contained in the title description of any site | calacanis /title |
| /top | Limit searches to only top level domain pages | Blackberry /top |
| /video | Search only sites with videos | U2 /video |

URL Operators

In some embodiments, searches can be limited to URL operators, as listed in Table 3. For example, "/seo" results in the SEO page of a particular URL. Other URL operators include, but are not limited to, the operators in Table 3.

TABLE 3

| Operator | Task | Example Query |
|---|---|---|
| /anchor | Show anchors and anchor count for a given URL | http://www.gigaom.com/ /anchor |
| /cache | View cached version of URL | http://www.gawker.com/ /cache |
| /link | Search for URLs that link to a particular URL | http://www.skrenta.com/about.html /link |
| /seo | Navigates to the SEO page of a particular URL | http://battellemedia.com/ /seo |
| /sitelink | Search for URLs that link to a particular site | http://www.techcrunch.com /link |
| /whois | Show link to whois data for a particular URL | http://www.techmeme.com /whois |

List Operators

In some embodiments, another category of operators include list operators.

TABLE 4

| Operator | Contents | | |
|---|---|---|---|
| Name | Data | Type | Example Query |
| huffpo | http://huffingtonpost.com/ | distance-1 | Barack Obama /huffpo |
| techmeme | http://techmeme.com/ | distance-1 | Barack Obama /techmeme |
| fail | http://failblog.org/ http://shipmentoffail.com/ http://screwups.com/fail | domain name domain name path prefix | |

These list operators are driven by a list containing types of content including, but not limited to, domain names (google.com), URL path prefixes (espn.com/nfl, which would match both espn.com/nfl/team1 and espn.com/nfl/team2), and individual URLs. In addition, a list operator might include other list operators, or use special query operators, facet operators, or URL operators to add to or subtract from the list operator.

In addition to the above, an element of the list might include both the element on the list, and all webpages which are distance-N away on the graph of webpages. For example, distance-1 from techcrunch.org would contain all pages at the website techcrunch.org plus every webpage pointed to by any page at techcrunch.org.

For example, the /huffpo list operator initiates a search of all pages in the index which are at or linked (distance-1) from any webpage at the domain huffingtonpost.com. To illustrate, if a user enters a search query "Barack Obama /huffpo", and a webpage at huffingtonpost.com links a page at the NY Times, that page at the NY Times may be returned as part of the answer.

These user-edited operators exist in multiple types. One type is usable by anyone and editable by anyone. For example, global list operators are editable and useable by everyone. Another type is usable by its creator and only edited by its creator. Other types include operators which can be used by their creator and friends, or edited by the creator and friends. And all combinations of the above. Users editing these list operators might create or delete entire operators, or might add or delete from the lists of domain names, and so on, contained in an operator.

In order for multiple users to have operators with the same name, without colliding, a "namespace" is used to name operators. The name /greg/linux is used to indicate a /linux operator which is specific to the user Greg. This operator is different from the global /linux operator.

Social methods are used to aid discovery of operators for users. For example, if user1 has used several of user2's operators in the past, the engine is more likely to suggest yet another of user2's operators as a possibly useful operator.

In addition to using operators in a positive fashion (e.g. /linux), operators can also be used in a negative fashion (e.g. !/linux). This deletes all results from the query which match the /linux operator. In another example, "/linux !/blogs" would return all results which matched the /linux operator and did not match the /blogs operator.

In addition to negating whole operators, a list operator might contain a negative entry, which deletes any matching webpage from the results. As an example, if all NY Times opinion information was below http://nytimes.com/opinion, a user might add nytimes.com and the negation of nytimes.com/opinion to her tag /newsonly.

Negative entries in list operators can also be marked to apply only in certain contexts. Consider the list operator /linux, which contain the website lkml.org, which hosts the high-volume Linux Kernel Mailing List (LKML). The query "/linux /date" would then be dominated by LKML postings, drowning out all else. In this case, a user may add a negative entry for lkml.org that only applies when the results are sorted by date, such as when the /date operator is used. Then "/linux /date" would contain topical information about Linux without being drowned out by LKML postings.

As an example of the productive use of several of these features together, assume that a user want to add to the /linux list operator. The user may do a search for [linux /!linux], i.e. a page that appears in the results for a search on [linux] which is not already included in the /linux list operator. The user may then select some URLs which the user believes would look good as a part of /linux, click on the "slashtags" button for each, view the existing tags for each selected URL, and finally add the /linux list operator to the list of operators containing each selected URL.

As an example of list operators changing the meaning of a query, consider the facet operator /news and the list operator /golf, which contain multiple golfing websites. A search for [Tiger Woods /news] likely return a large number of hits for Mr. Woods' personal life, while a search for [Tiger Woods /golf] likely returns many more hits for Tiger Woods' golf career.

In some embodiments, list operators can be collaboratively edited by multiple end-users, perhaps aided by an employee community manager. In some embodiments, social feedback is used to aid the process of selecting edits which are actually applied to the user-specified operator, i.e. editors are enabled to see that User Foo has had 9 of its last 10 edits rejected, or that User Foo tends to vote against the opinions of more trusted editors.

In some embodiments, a professional 'community manager' helps select which edits are allowed, and referees debates among end-users. In some embodiments, a hierarchy of volunteer and professional community mangers performs these functions. Discussion forums are created to discuss edits of each list operator. A history feature allows exploring the history of particular domain names or URL paths.

Pre-Intersect Lists

In some embodiments, pre-intersect common filters (not shown) are utilized by a respective search operation for greater speed or depth. The web index of the search database stores many lists for particular search terms. For example, in a list of webpages containing the word "Greg," each list is ordered according to the relevance of the webpage to the word "Greg." These lists are cut off at a fixed limit, so (e.g.) only the top 10,000 webpages mentioning the word "Greg" are in the list.

When an answer to a query is requested, such as "Greg /blogs" (blog postings mentioning the word Greg), a naive way to compute this would be to look at the list of webpages for the word Greg, and see which ones we have labeled as blog postings. If the blog postings mentioning Greg are rare compared to mentions of Greg, there may be no blog postings about Greg in the Greg list.

To give a better answer in this circumstance, a list for "Greg" is generated containing the top N webpages mentioning "Greg" and also having the property of being "/blog." Many of such lists are generated, one for each /operator to provide a better answer.

K. Database and Search Management

Visualization Tool

Figure 31:
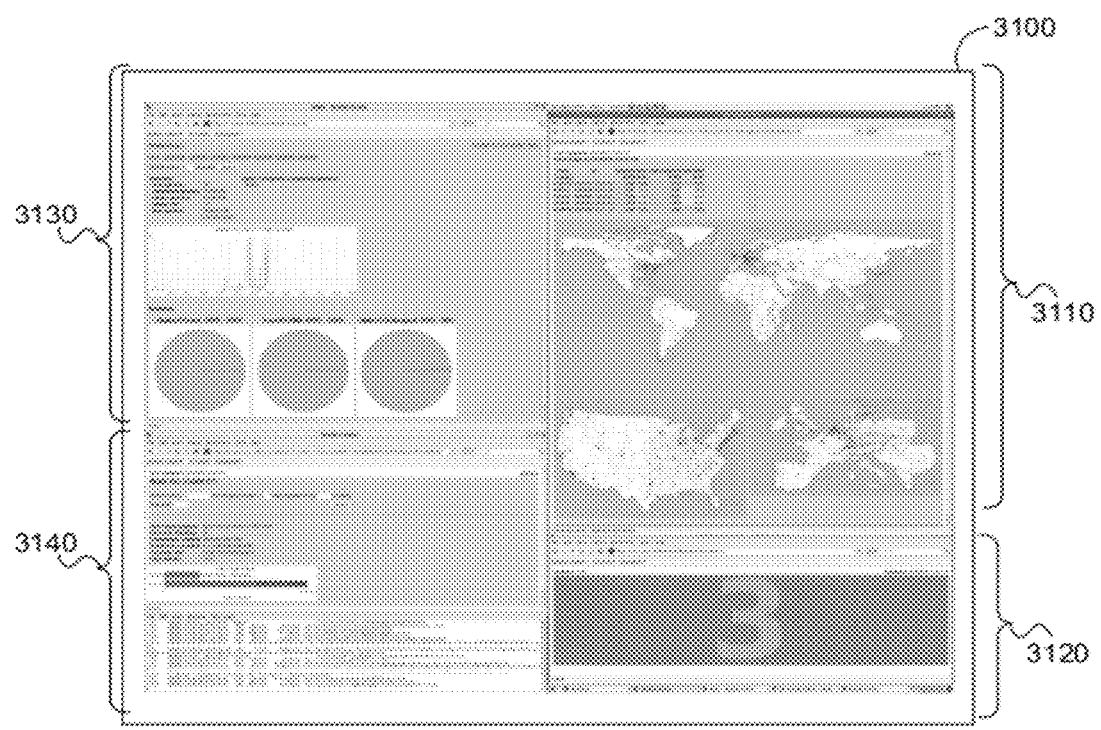
FIGS. 31 and 32 are examples of screen displays of a visualization tool for a search database system in accordance with some embodiments.
Figure 32:

FIGS. 31 & 32 are examples of screen displays 3100, 3200 of a visualization tool 3100, 3200 for the search database in accordance with some embodiments. Visualization tool 3100, 3200 provide visual representation of information about the database based on structure or behavior, measures system activities, collects software metric data to check on system condition, analyze operations, and check for system anomalies. Visualization tool 3100 includes a graph 3110 of a geographic area with dots represent GeoIP of crawled pages (in Europe, US, and world). A graphical representation 3120, 3220 of the replication level of every bucket in the system is also represented (color indicates R, 3=green, 0=black etc) with a superimposed integer indicating the replication level of the whole system. A webserver load 3130 is monitored and computed by using the add combinator to count the number of hits. Status of data stored in the special RAM cache is shown in window 3140. Also shown in window 3140 is a list of urls that are currently being crawled. This is generated using a publish/subscribe mechanism. Indication of the state of various measures of node health, such as swap space usage, disk space usage, dead disks, cpu usage, and so forth, may be monitored by the graphical data 3250. Graphs of global quantities 3260, such as global disk read and write bandwidth, global network bandwidth, the worst seek depth in the system (seek50, seek90, seek100) and so forth is monitored by data 3260.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A method comprising, at a swarm database system having a plurality of nodes each comprising one or more processors and memory, the memory of the plurality of nodes storing one or more programs to be executed by the one or more processors, where each of the plurality of nodes include a plurality of partitions mapped by a table stored within the node, the plurality of partitions creating a plurality of storage components within each of the nodes:

identifying data received or generated by one of the plurality of nodes;
replicating the data to a plurality of storage components, where each of the plurality of storage components is located within a unique node of the plurality of nodes;
receiving, at a first node of the plurality of nodes, a request for the data;
determining that a cache of the first node does not include the data;
identifying a second node of the plurality of nodes that has an identifier indicating that the data is stored in the second node, wherein the identifier includes at least one of a key-value pair and a row key;
requesting that the second node of the plurality of nodes service the request, in response to identifying that the second node has the identifier;
determining that the second node of the plurality of nodes has not responded to the request to service the request for the data within a predetermined time period;
identifying a third node of the plurality of nodes that has the identifier indicating that the data is stored in the third node;
requesting that the third node of the plurality of nodes service the request, in response to identifying that the third node has the read data identifier;
retrieving the response to the request; and
providing the data to the first node.

2. The method of claim 1, further comprising checking a cache storage associated with each respective node in the plurality of nodes before checking other storage allocations of the respective node.

3. The method of claim 2, further comprising managing one or more read operations by a reader daemon associated with each respective node in the plurality of nodes.

4. The method of claim 2, wherein the cache storage is one of a group consisting of RAM, a server storage, Flash storage on a solid-state drive and Flash on a peripheral component interconnect express card.

5. The method of claim 2, wherein the cache is managed by a cache daemon.

6. The method of claim 1, further comprising grouping the plurality of nodes into a plurality of groups based on a physical location of each of the plurality of nodes, where each of the plurality of storage components to which data is replicated is located within a unique group of the plurality of groups.

7. The method of claim 1, further comprising combining the plurality of groups into a plurality of zones based on one or more physical components that serve the plurality of zones, such that a subset of the plurality of zones that are served by a predetermined physical component are combined into a predetermined zone;
wherein each of the plurality of storage components to which data is replicated is located within a unique zone of the plurality of zones.

8. The method of claim 1, further comprising:
identifying a predetermined node of the plurality of nodes that includes a storage component to which the data is replicated;
determining that requests for the data are to be sent to the predetermined node first before other nodes of the plurality of nodes that include a storage component to which the data is replicated; and
storing the data in a random access memory (RAM) cache of the predetermined node, in response to the determining.

9. A system comprising:
a swarm database system having a plurality of nodes each comprising one or more processors and memory, the memory of the plurality of nodes storing one or more programs to be executed by the one or more processors, where each of the plurality of nodes include a plurality of partitions mapped by a table stored within the node, the plurality of partitions creating a plurality of storage components within each of the nodes, where the swarm database system is configured to:
identify data received or generated by one of the plurality of nodes;
replicate the data to a plurality of storage components, where each of the plurality of storage components is located within a unique node of the plurality of nodes;
receive, at a first node of the plurality of nodes, a request for the data;
determine that a cache of the first node does not include the data;
identify a second node of the plurality of nodes that has an identifier indicating that-the data is stored in the second node, wherein the identifier includes at least one of a key-value pair and a row key;
request that the second node of the plurality of nodes service the request, in response to identifying that the second node has the identifier;
determine that the second node of the plurality of nodes has not responded to the request to service the request for the data within a predetermined time period;
identify a third node of the plurality of nodes that has the identifier indicating that the data is stored in the third node;
request that the third node of the plurality of nodes service the request, in response to identifying that the third node has the read data identifier;
retrieve the response to the request; and
provide the data to the first node.

10. The system of claim 9, wherein the one or more nodes are further configured to,
check a cache storage associated with each respective node in the plurality of nodes before checking other storage allocations of the respective node.

11. The system of claim 10, further comprising, a reader daemon, associated with each respective node in the plurality of nodes, configured to manage one or more read operations.

12. The system of claim 10 wherein the cache storage is one of a group consisting of, RAM, a server storage, Flash storage on a solid-state drive and Flash on a peripheral component interconnect express card.

13. The system of claim 10 further comprising, a cache daemon, configured to manage the cache.

14. The system of claim 9 further comprising grouping the plurality of nodes into a plurality of groups based on a physical location of each of the plurality of nodes, where each of the plurality of storage components to which data is replicated is located within a unique group of the plurality of groups.

15. The system of claim 9, further comprising combining the plurality of groups into a plurality of zones based on one or more physical components that serve the plurality of zones, such that a subset of the plurality of zones that are served by a predetermined physical component are combined into a predetermined zone;
wherein each of the plurality of storage components to which data is replicated is located within a unique zone of the plurality of zones.

16. The system of claim 9, further comprising:
identifying a predetermined node of the plurality of nodes that includes a storage component to which the data is replicated;
determining that requests for the data are to be sent to the predetermined node first before other nodes of the plurality of nodes that include a storage component to which the data is replicated; and
storing the data in a random access memory (RAM) cache of the predetermined node, in response to the determining.

* * * * *